US012301774B2

(12) United States Patent
Irie et al.

(10) Patent No.: US 12,301,774 B2
(45) Date of Patent: May 13, 2025

(54) INFORMATION PROCESSING APPARATUS, INFORMATION PROCESSING METHOD, AND PROGRAM

(71) Applicant: FUJIFILM Corporation, Tokyo (JP)

(72) Inventors: Fuminori Irie, Saitama (JP); Takashi Aoki, Saitama (JP); Masahiko Miyata, Saitama (JP); Kazunori Tamura, Saitama (JP); Yasunori Murakami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 93 days.

(21) Appl. No.: 18/050,040

(22) Filed: Oct. 26, 2022

(65) Prior Publication Data

US 2023/0074282 A1  Mar. 9, 2023

Related U.S. Application Data

(63) Continuation of application No. PCT/JP2021/016072, filed on Apr. 20, 2021.

(30) Foreign Application Priority Data

Apr. 30, 2020  (JP) ................................ 2020-080785

(51) Int. Cl.
*H04N 13/117* (2018.01)
*G11B 27/031* (2006.01)
(Continued)

(52) U.S. Cl.
CPC ......... *H04N 13/117* (2018.05); *G11B 27/031* (2013.01); *G11B 27/06* (2013.01); *G11B 27/34* (2013.01)

(58) Field of Classification Search
CPC .... H04N 13/117; G11B 27/031; G11B 27/06; G11B 27/34
See application file for complete search history.

(56) References Cited

U.S. PATENT DOCUMENTS

2018/0130223 A1* 5/2018 Nadler .................. H04N 13/15
2019/0158801 A1  5/2019 Matsubayashi
(Continued)

FOREIGN PATENT DOCUMENTS

JP  2017212592  11/2017
JP  2018046448  3/2018
(Continued)

OTHER PUBLICATIONS

"Notice of Reasons for Refusal of Japan Counterpart Application", issued on Jul. 4, 2023, with English translation thereof, p. 1-p. 11.
(Continued)

*Primary Examiner* — Sunghyoun Park
(74) *Attorney, Agent, or Firm* — JCIPRNET

(57) ABSTRACT

An information processing apparatus generates a virtual viewpoint video based on a virtual viewpoint by using a motion picture obtained by imaging an imaging region with a plurality of imaging devices. The information processing apparatus displays, on a display, a standard image corresponding to the imaging region, a plurality of virtual viewpoint paths disposed in the standard image and representing a trajectory of movement of the virtual viewpoint, an indicator indicating a reproduction position of the virtual viewpoint video, and a reference image based on a virtual viewpoint image viewed from the virtual viewpoint corresponding to the reproduction position of the virtual viewpoint path among a plurality of virtual viewpoint images configuring the virtual viewpoint video.

18 Claims, 29 Drawing Sheets

(51) Int. Cl.
   *G11B 27/06*  (2006.01)
   *G11B 27/34*  (2006.01)

(56) References Cited

U.S. PATENT DOCUMENTS

| | | | |
|---|---|---|---|
| 2019/0174109 A1* | 6/2019 | Yoshikawa | H04N 13/243 |
| 2019/0213791 A1 | 7/2019 | Hanamoto et al. | |
| 2019/0228230 A1 | 7/2019 | Onuma | |
| 2019/0287302 A1 | 9/2019 | Bhuruth | |
| 2019/0311526 A1 | 10/2019 | Sugio et al. | |
| 2020/0045347 A1 | 2/2020 | Ishitani | |
| 2020/0128232 A1* | 4/2020 | Hwang | A61B 5/0022 |
| 2020/0322584 A1 | 10/2020 | Aizawa et al. | |
| 2021/0144358 A1 | 5/2021 | Kato | |
| 2021/0150223 A1 | 5/2021 | Onuma | |

FOREIGN PATENT DOCUMENTS

| | | |
|---|---|---|
| JP | 2018174376 | 11/2018 |
| JP | 2019096996 | 6/2019 |
| JP | 2019125303 | 7/2019 |
| JP | 2019160318 | 9/2019 |
| JP | 2020013470 | 1/2020 |
| WO | 2018030206 | 2/2018 |
| WO | 2018123801 | 7/2018 |

OTHER PUBLICATIONS

"Office Action of Japan Counterpart Application", issued on Mar. 14, 2023, with English translation thereof, p. 1-p. 9.
International Search Report (Form PCT/ISA/210) of PCT/JP2021/016072 mailed on Jun. 1, 2021, with English translation thereof, pp. 1-5.
"Written Opinion of the International Searching Authority (Form PCT/ISA/237) of PCT/JP2021/016072," mailed on Jun. 1, 2021, with English translation thereof, pp. 1-14.

* cited by examiner

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2021/016072, filed Apr. 20, 2021, the disclosure of which is incorporated herein by reference in its entirety. Further, this application claims priority under 35 USC 119 from Japanese Patent Application No. 2020-080785 filed Apr. 30, 2020, the disclosure of which is incorporated by reference herein.

BACKGROUND

1. Technical Field

The techniques of the present disclosure relate to an information processing apparatus, an information processing method, and a program.

2. Related Art

JP2018-046448A discloses an image processing apparatus that generates a free-viewpoint video which is a video viewed from a virtual camera from a multi-viewpoint video captured by using a plurality of cameras. The image processing apparatus disclosed in JP2018-046448A includes a user interface used for a user to designate a camera path indicating a movement trajectory of a virtual camera and a gaze point path indicating a movement trajectory of a gaze point to which the virtual camera gazes, and a generation unit that generates a free-viewpoint video on the basis of a camera path and a gaze point path designated via the user interface. In the image processing apparatus disclosed in JP2018-046448A, the user interface displays time-series changes of a subject in a time frame that is a generating target of a free-viewpoint video among multi-viewpoint videos on a UI screen using a two-dimensional image that captures an imaging scene of the multi-viewpoint video from a bird's-eye view, and the user draws a trajectory through an input operation position the two-dimensional image to designate the camera path above-described the gaze point path.

JP2017-212592A discloses a control device including a reception unit, an acquisition unit, and a display control unit. In the control device disclosed in JP2017-212592A, the reception unit receives an instruction from a user for designating a viewpoint related to generation of a virtual viewpoint image in a system in which the virtual viewpoint image is generated by an image generation device on the basis of image data based on imaging by a plurality of cameras that image a subject in a plurality of directions. The acquisition unit acquires information for specifying a restriction region in which designation of a viewpoint based on an instruction received by the reception unit is restricted and which changes according to at least one of an operation state of an apparatus included in the system and a parameter related to image data. The display control unit displays an image based on display control on a display unit according to the restriction region on the basis of the information acquired by the acquisition unit.

JP2019-096996A discloses an information processing apparatus including a storage unit, an image generation unit, a setting unit, and a list generation unit. In the information processing apparatus disclosed in JP2019-096996A, the storage unit stores a camera path of a virtual camera for projecting an object in a three-dimensional space onto a two-dimensional plane for each frame of a motion picture scene. The image generation unit generates a camera path image in which a trajectory of the virtual camera in the motion picture scene is overlooked from a predetermined point in the three-dimensional space based on the stored camera path. The setting unit sets a parameter for generating a camera path image on the basis of the stored camera path. The list generation unit displays a list of a plurality of camera path images generated by applying parameters to each of the plurality of camera paths.

JP2019-125303A discloses an information processing apparatus including an assistance information generation unit that generates assistance information for assisting with a user's operation performed for generating a virtual viewpoint video, and a provision unit that provides the assistance information generated by the assistance information generation unit to an operation unit in order to determine a position and a posture of a virtual viewpoint.

In the information processing apparatus disclosed in JP2019-125303A, the provision unit provides the assistance information to a display unit that displays information including candidates of the virtual viewpoint video on the basis of the assistance information. The position and the posture of the virtual viewpoint are determined on the basis of a virtual viewpoint video selected by a user among the candidates of the virtual viewpoint video displayed on the display unit. The assistance information includes virtual viewpoint information, and the display unit displays the candidates of the virtual viewpoint video as thumbnail images on the basis of the virtual viewpoint information, and displays a virtual viewpoint video selected by the user among the candidates of the virtual viewpoint video as an image having a resolution higher than that of the thumbnail image.

JP2020-013470A discloses an information processing apparatus including a path generation unit that generates camera path information that represents temporal changes in a position and a posture of a virtual viewpoint indicating a viewpoint of a virtual viewpoint video, and a provision unit that provides the camera path information generated by the path generation unit to another apparatus.

JP2019-160318A discloses an information processing apparatus that sets a virtual viewpoint related to generation of a virtual viewpoint image based on a captured image obtained by imaging an imaging region with a plurality of imaging devices from a plurality of directions. The information processing apparatus described in JP2019-160318A includes an acquisition unit, an extraction unit, a reception unit, and a setting unit.

In the information processing apparatus disclosed in JP2019-160318A, the acquisition unit acquires viewpoint information having a plurality of virtual viewpoint parameters indicating at least one of a position or an orientation of the virtual viewpoint and having a plurality of virtual viewpoint parameters corresponding to a plurality of time points included in imaging periods of the plurality of imaging devices. The extraction unit extracts one or more virtual viewpoint parameters specified in response to a predetermined event in the imaging region from the plurality of virtual viewpoint parameters included in the viewpoint information acquired by the acquisition unit. The reception unit receives an input corresponding to a user operation related to a change of the virtual viewpoint parameter extracted by the extraction unit. The setting unit sets a virtual viewpoint related to generation of the virtual viewpoint image on the basis of the virtual viewpoint parameters changed in response to the input received by the reception unit. The information processing apparatus disclosed in JP2019-160318A includes a display control unit that displays, on a display unit, an image showing that the virtual viewpoint parameter extracted by the extraction unit can be changed, an image showing a position of a virtual viewpoint corresponding to the virtual viewpoint parameter extracted by the extraction unit on a movement path of the virtual viewpoint, or an image showing a time point corresponding to the virtual viewpoint parameter extracted by the extraction unit on a timeline corresponding to the imaging period.

SUMMARY

An embodiment according to the technique of the present disclosure provides an information processing apparatus, an information processing method, and a program capable of comparing reference images at the same reproduction position in a plurality of virtual viewpoint paths.

A first aspect of the technique of the present disclosure is an information processing apparatus that generates a virtual viewpoint video based on a virtual viewpoint by using a motion picture obtained by imaging an imaging region with a plurality of imaging devices, the information processing apparatus including a processor; and a memory built in or connected to the processor, in which the processor displays, on a display, a standard image corresponding to the imaging region, a plurality of virtual viewpoint paths disposed in the standard image and representing a trajectory of movement of the virtual viewpoint, an indicator indicating a reproduction position of the virtual viewpoint video, and a reference image based on a virtual viewpoint image viewed from the virtual viewpoint corresponding to the reproduction position of the virtual viewpoint path among a plurality of virtual viewpoint images configuring the virtual viewpoint video.

A second aspect of the technique of the present disclosure is the information processing apparatus according to the first aspect in which the processor disposes at least one of the plurality of virtual viewpoint paths at an indicated position in the standard image.

A third aspect according to the technique of the present disclosure is the information processing apparatus according to the first aspect or the second aspect in which the processor changes the reproduction position indicated by the indicator in response to a given instruction.

A fourth aspect according to the technique of the present disclosure is the information processing apparatus according to any one of the first aspect to the third aspect in which, in a case where the reproduction position is changed, the processor displays the reference image corresponding to the reproduction position after being changed on the display.

A fifth aspect according to the technique of the present disclosure is the information processing apparatus according to the fourth aspect in which, in a case where the reproduction position is changed, the processor displays the reference image corresponding to the reproduction position after being changed at a position different from a position of the reference image corresponding to the reproduction position before being changed.

A sixth aspect according to the technique of the present disclosure is the information processing apparatus according to any one of the first aspect to the fifth aspect in which the processor displays only one reference image for one virtual viewpoint path.

A seventh aspect according to the technique of the present disclosure is the information processing apparatus according to any one of the first aspect to the sixth aspect in which the processor changes the reproduction position in response to an operation of moving the reference image on the standard image.

An eighth aspect according to the technique of the present disclosure is the information processing apparatus according to any one of the first aspect to the seventh aspect in which the processor displays two reference images for two adjacent virtual viewpoint paths according to relative positions of the two virtual viewpoint paths.

A ninth aspect according to the technique of the present disclosure is the information processing apparatus according to any one of the first aspect to the seventh aspect in which the processor changes at least one of a position, a length, or a shape of the virtual viewpoint path in response to a given instruction.

A tenth aspect according to the technique of the present disclosure is the information processing apparatus according to any one of the first aspect to the ninth aspect in which the processor displays at least one of the indicator or the virtual viewpoint path in different aspects before and after the reproduction position.

An eleventh aspect according to the technique of the present disclosure is the information processing apparatus according to any one of the first aspect to the tenth aspect in which the processor generates gaze point information representing a gaze point at which the virtual viewpoint included in the virtual viewpoint path gazes in response to a given instruction.

A twelfth aspect according to the technique of the present disclosure is the information processing apparatus according to the eleventh aspect in which the gaze point information is a gaze point path representing a trajectory of movement of the gaze point, and the processor disposes a plurality of the gaze point paths in the standard image in response to a given instruction.

A thirteenth aspect according to the technique of the present disclosure is the information processing apparatus according to the eleventh or twelfth aspect in which the processor selects one reference image from among a plurality of the reference images corresponding to the same reproduction position in response to a given instruction, sets the gaze point corresponding to the one selected reference image as a standard gaze point, and generates, as other reference images that are not selected, an image based on a virtual viewpoint image showing an aspect of a case of gazing at the standard gaze point from the virtual viewpoint path corresponding to the non-selected other reference images.

A fourteenth aspect according to the technique of the present disclosure is the information processing apparatus according to the thirteenth aspect in which the processor changes a display aspect of a section including the virtual viewpoint in which a virtual viewpoint image obtained by gazing at the standard gaze point is not generatable in the virtual viewpoint path.

A fifteenth aspect according to the technique of the present disclosure is the information processing apparatus according to any one of the first aspect to the fourteenth aspect in which the processor displays the plurality of virtual viewpoint paths and the reference image in the single standard image.

A sixteenth aspect according to the technique of the present disclosure is the information processing apparatus according to any one of the first aspect to the fourteenth aspect in which the processor displays the virtual viewpoint path and the reference image in a plurality of the standard images representing at least a part of the imaging region.

A seventeenth aspect according to the technique of the present disclosure is the information processing apparatus according to any one of the first aspect to the sixteenth aspect in which the processor displays the reference image corresponding to the virtual viewpoint along the virtual viewpoint path for the plurality of virtual viewpoint paths.

An eighteenth aspect according to the technique of the present disclosure is the information processing apparatus according to the first aspect to the seventeenth aspect in which the processor performs a selection combining process of cutting out parts of the plurality of virtual viewpoint paths and combining the cut-out parts in response to a given instruction, and generates the virtual viewpoint video on the basis of a path obtained by combining the cut-out parts in the selection combining process.

A nineteenth aspect according to the technique of the present disclosure is an information processing method of generating a virtual viewpoint video based on a virtual viewpoint by using a motion picture obtained by imaging an imaging region with a plurality of imaging devices, the information processing method including displaying, on a display, a standard image corresponding to the imaging region, a plurality of virtual viewpoint paths disposed in the standard image and representing a trajectory of movement of the virtual viewpoint, an indicator indicating a reproduction position of the virtual viewpoint video, and a reference image based on a virtual viewpoint image viewed from the virtual viewpoint corresponding to the reproduction position of the virtual viewpoint path among a plurality of virtual viewpoint images configuring the virtual viewpoint video.

A twentieth aspect according to the technique of the present disclosure is a program for causing a computer to execute information processing to generate a virtual viewpoint video based on a virtual viewpoint by using a motion picture obtained by imaging an imaging region with a plurality of imaging devices, the information processing including displaying, on a display, a standard image showing the imaging region, a plurality of virtual viewpoint paths disposed in the standard image and representing a trajectory of movement of the virtual viewpoint, an indicator indicating a reproduction position of the virtual viewpoint video, and a reference image based on a virtual viewpoint image viewed from the virtual viewpoint corresponding to the reproduction position of the virtual viewpoint path among a plurality of virtual viewpoint images configuring the virtual viewpoint video.

BRIEF DESCRIPTION OF THE DRAWINGS

Exemplary embodiments of the technology of the disclosure will be described in detail based on the following figures, wherein.

DETAILED DESCRIPTION

An example of an information processing apparatus, an information processing method, and a program according to embodiments of the technique of the present disclosure will be described with reference to the accompanying drawings.

First, the technical terms used in the following description will be described.

CPU stands for "Central Processing Unit". RAM stands for "Random Access Memory". SSD stands for "Solid State Drive". HDD stands for "Hard Disk Drive". EEPROM stands for "Electrically Erasable and Programmable Read Only Memory". I/F stands for "Interface". IC stands for "Integrated Circuit". ASIC stands for "Application Specific Integrated Circuit". PLD stands for "Programmable Logic Device". FPGA stands for "Field-Programmable Gate Array". SoC stands for "System-on-a-chip". CMOS stands for "Complementary Metal Oxide Semiconductor". CCD stands for "Charge Coupled Device". EL stands for "Electro-Luminescence". GPU stands for "Graphics Processing Unit". LAN stands for "Local Area Network". 3D stands for "3 Dimensions". USB stands for "Universal Serial Bus". "HMD" stands for "Head Mounted Display". GUI stands for "Graphical User Interface". LTE stands for "Long Term Evolution". 5G stands for "5th generation (wireless technology for digital cellular networks)". TDM stands for "Time-Division Multiplexing". In the following description, for convenience of description, a CPU is exemplified as an example of a "processor" according to the technique of the present disclosure, but the "processor" according to the technique of the present disclosure may be a combination of a plurality of processing devices such as a CPU and a GPU. In a case where a combination of a CPU and a GPU is applied as an example of the "processor" according to the technique of the present disclosure, the GPU operates under the control of the CPU and executes image processing.

In the following description, the term "match" refers to, in addition to perfect match, a meaning including an error generally allowed in the technical field to which the technique of the present disclosure belongs (a meaning including an error to the extent that the error does not contradict the concept of the technique of the present disclosure).

Figure 1:
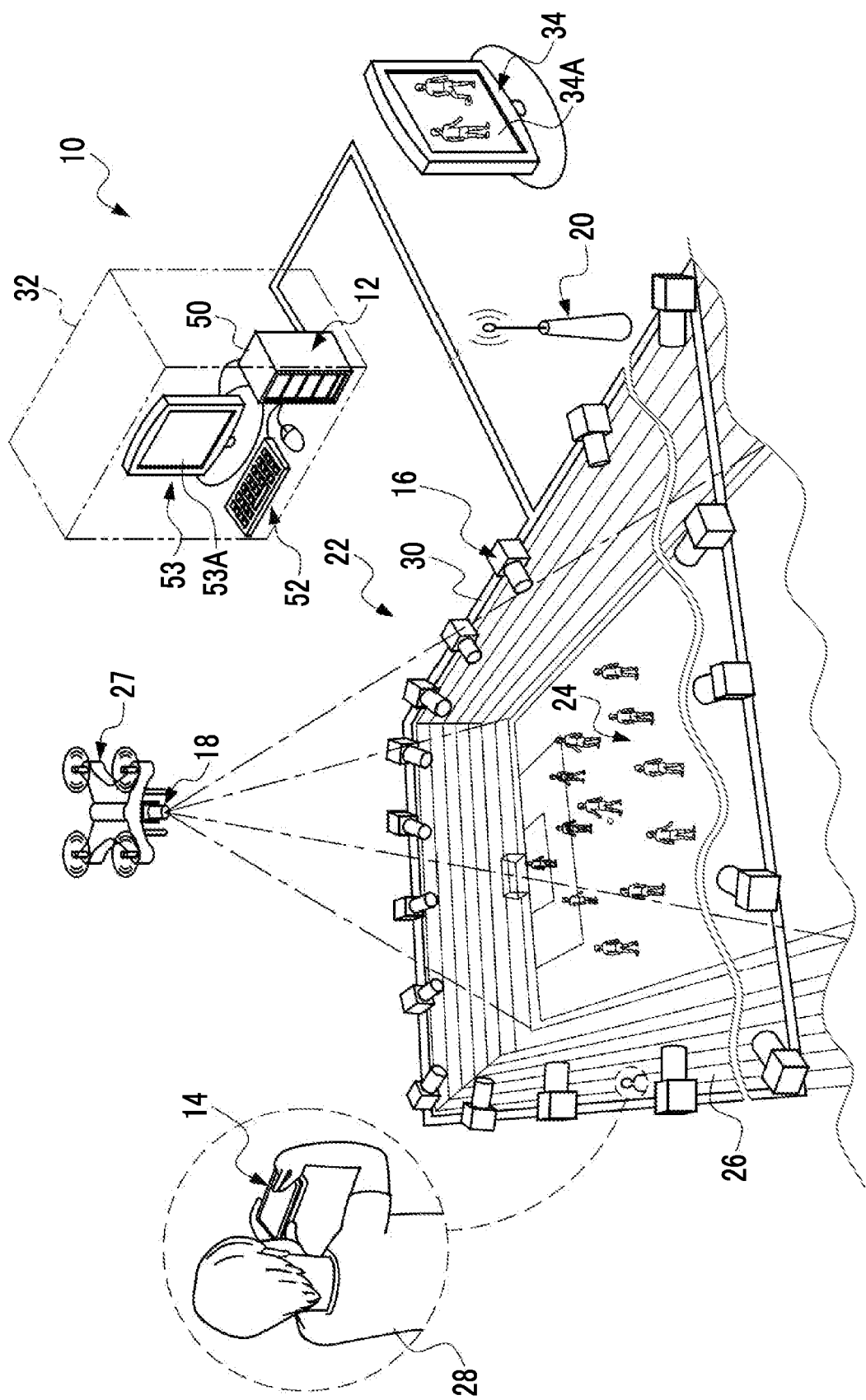
FIG. 1 is a schematic perspective view showing an example of an external configuration of an information processing system.

As an example, as shown in FIG. 1, an information processing system 10 includes an information processing apparatus 12, a user device 14, a plurality of imaging devices 16, an imaging device 18, a wireless communication base station (hereinafter, simply referred to as a "base station") 20, and a receiver 34.

In the present embodiment, a smartphone is applied as an example of the user device 14. However, the smartphone is only an example, and may be, for example, a personal computer, a tablet terminal, or a portable multifunctional terminal such as a head-mounted display.

In the present embodiment, the receiver 34 is exemplified, but the technique of the present disclosure is not limited to this, and an electronic device with a display (for example, a smart device) may be used. The number of base stations 20 is not limited to one, and there may be a plurality of base stations. The communication standards used in the base station 20 include a wireless communication standard including a 5G standard, an LTE standard, and the like, a wireless communication standard including a WiFi (802.11) standard and/or a Bluetooth (registered trademark) standard, a TDM standard and/or a wired communication standard including an Ethernet (registered trademark) standard.

The imaging device 16 is an imaging device having a CMOS image sensor, and has an optical zoom function and/or a digital zoom function. Instead of the CMOS image sensor, another type of image sensor such as a CCD image sensor may be employed.

The plurality of imaging devices 16 are installed in a soccer stadium 22. Each of the plurality of imaging devices 16 is disposed to surround a soccer field 24, and a region including the inside of the soccer stadium 22 is imaged as an imaging region. Here, a form example in which a plurality of imaging devices 16 are arranged to surround the soccer field 24 is described. However, the technique of the present disclosure is not limited to this, and the arrangement of the plurality of imaging devices 16 is determined according to a virtual viewpoint video requested to be generated by a viewer 28 and/or a user of the information processing apparatus 12. A plurality of imaging devices 16 may be arranged to surround the entire soccer field 24, or a plurality of imaging devices 16 may be arranged to surround a specific part of the soccer field 24.

The imaging device 18 is also installed in, for example, an unmanned aircraft (for example, a multi-rotary wing type unmanned aircraft) 27, and performs imaging in a state of a bird's-eye view from the sky with a region including the soccer field 24 as an imaging region. In the following description, in a case where it is not necessary to distinguish between the imaging device 16 and the imaging device 18, the imaging devices will also be referred to as a "physical camera" without reference numerals.

The imaging by the physical camera refers to, for example, imaging at an angle of view including an imaging region. Here, the concept of "imaging region" includes the concept of a region indicating a part of the soccer stadium 22 in addition to the concept of a region indicating the whole of the soccer stadium 22. The imaging region is changed according to an imaging position, an imaging direction, and an angle of view of a physical camera.

The information processing apparatus 12 is installed in a control room 32. As will be described in detail later, the information processing apparatus 12 includes a computer 50, a reception device 52, and a display 53. A motion picture editing screen 53A is displayed on the display 53. The plurality of imaging devices 16 and the information processing apparatus 12 are connected via a LAN cable 30, and the information processing apparatus 12 controls the plurality of imaging devices 16 and acquires an image obtained through imaging in each of the plurality of imaging devices 16. Although the connection using the wired communication method using the LAN cable 30 is exemplified here, the connection is not limited to this, and the connection using a wireless communication method may be used.

The soccer stadium 22 is provided with spectator seats 26 to surround the soccer field 24, and the viewer 28 is seated in the spectator seat 26. The viewer 28 possesses the user device 14, and the user device 14 is used by the viewer 28. Here, a form example in which the viewer 28 is present in the soccer stadium 22 is described, but the technique of the present disclosure is not limited to this, and the viewer 28 may be present outside the soccer stadium 22.

The base station 20 transmits and receives various types of information to and from the information processing apparatus 12 and the unmanned aircraft 27 via radio waves. That is, the information processing apparatus 12 is connected to the unmanned aircraft 27 via the base station 20 so as to be capable of wireless communication. The information processing apparatus 12 controls the unmanned aircraft 27 by performing wireless communication with the unmanned aircraft 27 via the base station 20 or acquires an image obtained by being captured by the imaging device 18 installed in the unmanned aircraft 27 from the unmanned aircraft 27.

The base station 20 transmits various types of information to the receiver 34 via wireless communication. The information processing apparatus 12 transmits various videos to the receiver 34 via the base station 20, and the receiver 34 receives various videos transmitted from the information processing apparatus 12, and displays the various received videos on a screen 34A. The receiver 34 is used for viewing by, for example, an unspecified number of spectators. A location where the receiver 34 is installed may be inside the soccer stadium 22 or outside the soccer stadium 22 (for example, a public viewing venue).

Although a form example in which the information processing apparatus 12 transmits various types of information to the receiver 34 via wireless communication is described here, the technique of the present disclosure is not limited to this, and for example, the information processing apparatus 12 may transmits various types of information to the receiver 34 via wired communication.

The information processing apparatus 12 is a device corresponding to a server, and the user device 14 is a device corresponding to a client terminal for the information processing apparatus 12. The information processing apparatus 12 and the user device 14 perform wireless communication with each other via the base station 20, so that the user device 14 requests the information processing apparatus 12 provides a service corresponding to a request from the user device 14 to the user device 14.

The information processing apparatus 12 is an apparatus that generates a virtual viewpoint video based on a virtual viewpoint by using a motion picture (hereinafter, also referred to as "motion picture") obtained by imaging an imaging region with a plurality of physical cameras. The virtual viewpoint video is a motion picture including a plurality of virtual viewpoint images (still images) based on the virtual viewpoint. A user of the information processing apparatus 12 (hereinafter, also simply referred to as a "user") may operate the reception device 52 while observing the motion picture editing screen 53A displayed on the display 53 to edit the virtual viewpoint video. Consequently, the information processing apparatus 12 edits the virtual viewpoint video and generates the edited result as a distribution video.

Figure 2:
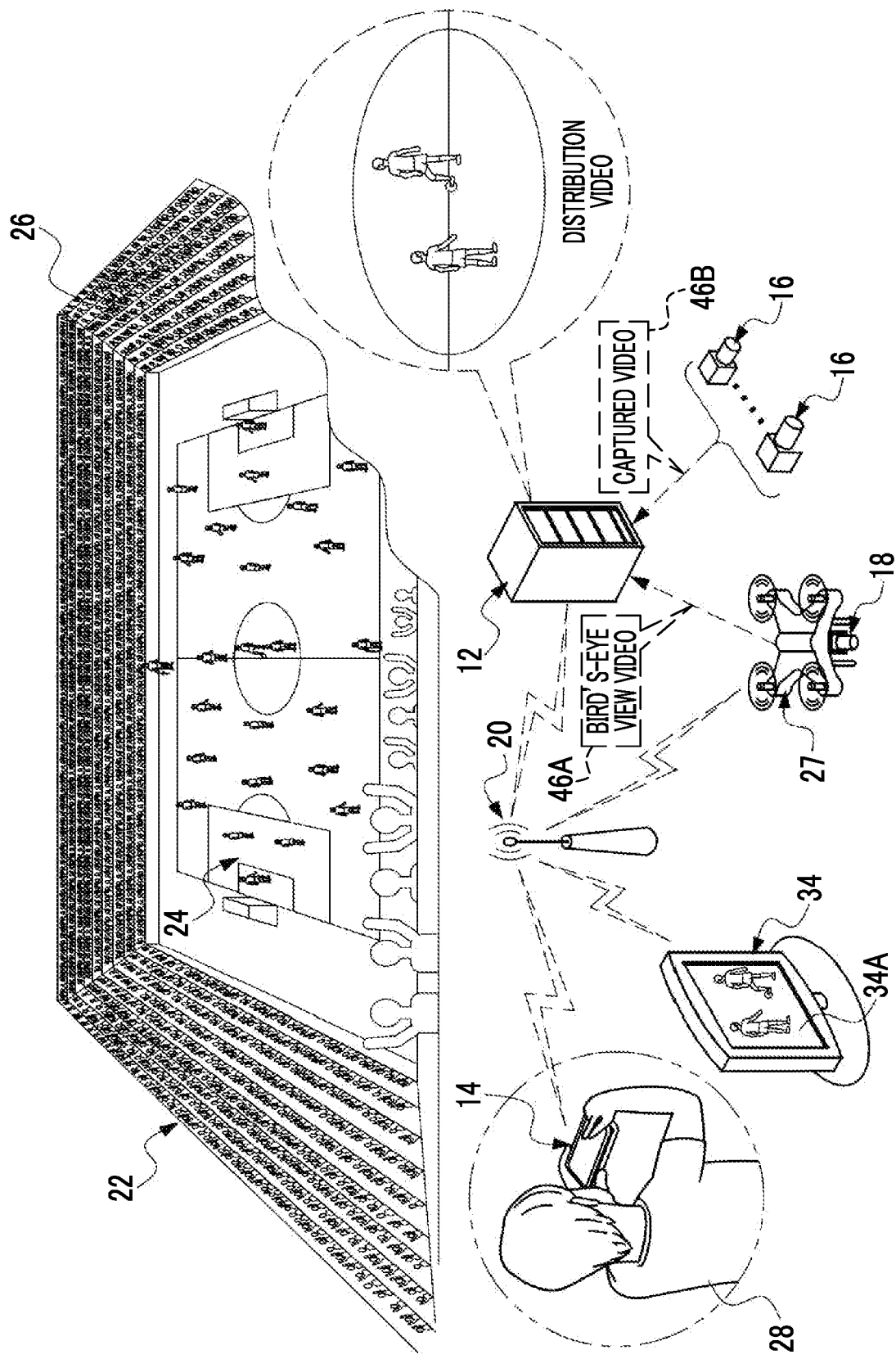
FIG. 2 is a conceptual diagram illustrating an example of a relationship between an information processing apparatus, a smart device, a receiver, an unmanned aircraft 27, and an imaging device included in the information processing system.

As shown in FIG. 2 as an example, the information processing apparatus 12 acquires a bird's-eye view video 46A showing a region including the soccer field 24 in a case of observing from the sky from the unmanned aircraft 27. The bird's-eye view video 46A is a motion picture including a plurality of captured images (still images) obtained by imaging a region including the soccer field 24 as an imaging region with the imaging device 18 of the unmanned aircraft 27 in a state of a bird's-eye view from the sky.

The information processing apparatus 12 acquires a captured video 46B showing the imaging region in a case of observing the imaging region from each position of the plurality of imaging devices 16 from each of the plurality of imaging devices 16. The captured video 46B is a motion picture including a plurality of captured images (still images) obtained by imaging the imaging region with the plurality of respective imaging devices 16.

In the following description, for convenience of the description, in a case where it is not necessary to distinguish between the bird's-eye view video 46A and the captured video 46B, the videos will be referred to as a "real video" without reference numerals.

Figure 3:
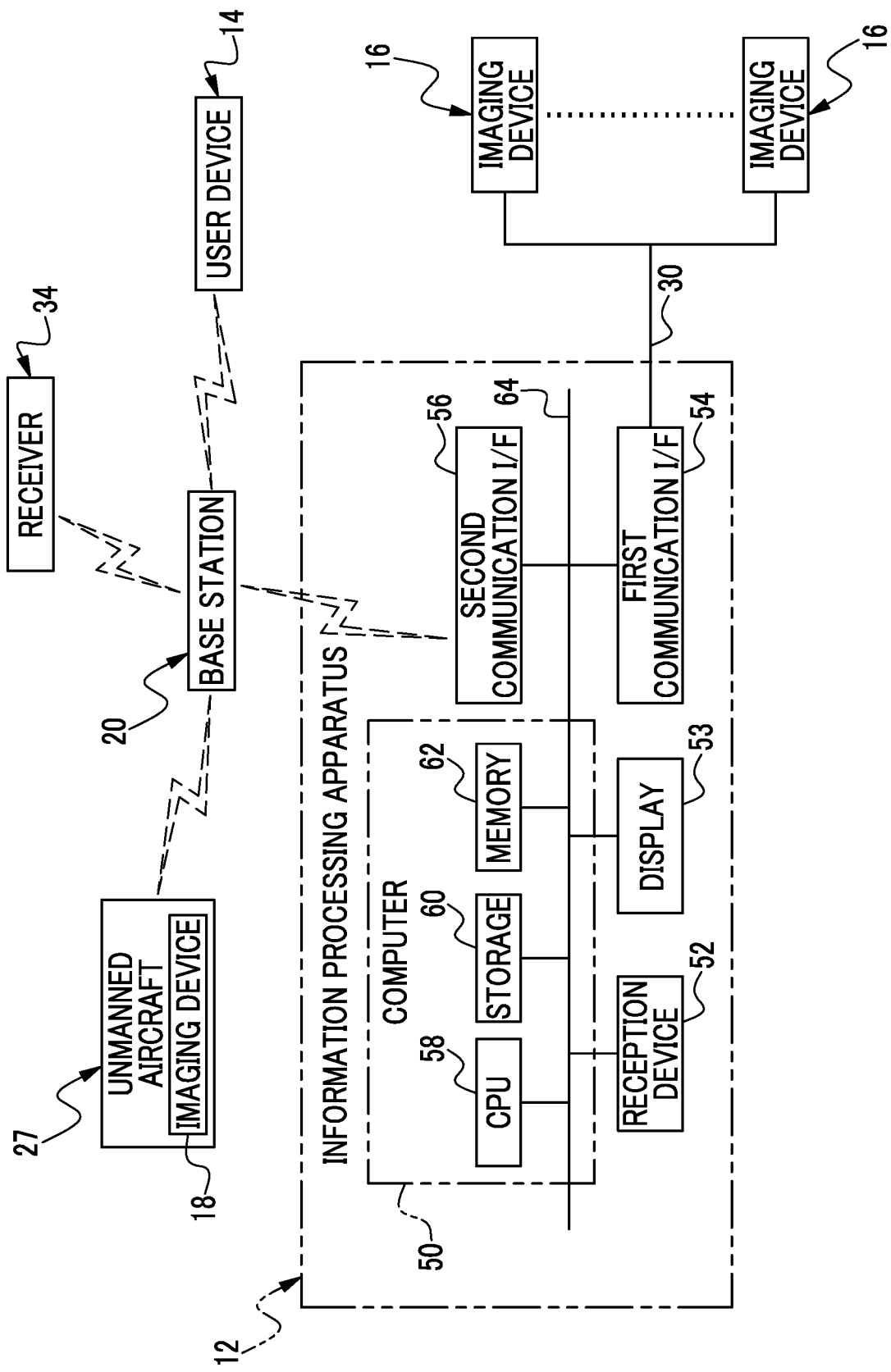
FIG. 3 is a block diagram showing an example of a hardware configuration of an electrical system of the information processing apparatus and an example of a relationship between the information processing apparatus and peripheral devices.

As shown in FIG. 3 as an example, the information processing apparatus 12 includes a computer 50, a reception device 52, a display 53, a first communication I/F 54, and a second communication I/F 56. The computer 50 includes a CPU 58, a storage 60, and a memory 62, and the CPU 58, the storage 60, and the memory 62 are connected via a bus 64. In the example shown in FIG. 3, one bus is shown as the bus 64 for convenience of illustration, but a plurality of buses may be used. The bus 64 may include a serial bus or a parallel bus configured with a data bus, an address bus, a control bus, and the like.

The CPU 58 controls the entire information processing apparatus 12. The storage 60 stores various parameters and various programs. The storage 60 is a non-volatile storage device. Here, an EEPROM, an SSD, and an HDD are employed as an example of the storage 60. However, the present disclosure is not limited to this, and the storage 60 may be an HDD, an SSD, an EEPROM, or the like, or may be a combination of a plurality of non-volatile storage devices. The memory 62 is a storage device. Various types of information is temporarily stored in the memory 62. The memory 62 is used as a work memory by the CPU 58. Here, a RAM is employed as an example of the memory 62, but the present disclosure is not limited to this, and other types of storage devices may be used. The CPU 58 is an example of a "processor" according to the technique of the present disclosure. The memory 62 is an example of a "memory" according to the technique of the present disclosure.

The reception device 52 receives an instruction from a user or the like. Examples of the reception device 52 include a touch panel, a hard key, and a mouse. The reception device 52 is connected to the bus 64 or the like, and the instruction received by the reception device 52 is acquired by the CPU 58.

The display 53 is an example of a "display" according to the technique of the present disclosure. The display 53 is connected to the bus 64 and displays various types of information under the control of the CPU 58. An example of the display 53 is a liquid crystal display. In addition to the liquid crystal display, another type of display such as an EL display (for example, an organic EL display or an inorganic EL display) may be employed as the display 53.

The first communication I/F 54 is connected to the LAN cable 30. The first communication I/F 54 is realized by, for example, a device having an FPGA. The first communication I/F 54 is connected to the bus 64 and controls the exchange of various types of information between the CPU 58 and the plurality of imaging devices 16. For example, the first communication I/F 54 controls the plurality of imaging devices 16 according to a request from the CPU 58. The first communication I/F 54 outputs the captured video 46B (refer to FIG. 2) obtained by imaging by each of the plurality of imaging devices 16 to the CPU 58. The first communication I/F 54 is exemplified as a wired communication I/F here, but may be a wireless communication I/F such as a high-speed wireless LAN.

The second communication I/F 56 is wirelessly communicatively connected to the base station 20. The second communication I/F 56 is realized by, for example, a device having an FPGA. The second communication I/F 56 is connected to the bus 64. The second communication I/F 56 manages the exchange of various types of information between the CPU 58 and the unmanned aircraft 27 in a wireless communication system via the base station 20. The second communication I/F 56 controls the exchange of various types of information between the CPU 58 and the user device 14 in a wireless communication method via the base station 20. The second communication I/F 56 controls transmission of various videos to the receiver 34 by the CPU 58 in a wireless communication method via the base station 20. At least one of the first communication I/F 54 or the second communication I/F 56 may be configured with a fixed circuit instead of the FPGA. At least one of the first communication I/F 54 or the second communication I/F 56 may be a circuit configured with an ASIC, an FPGA, and/or a PLD.

Figure 4:
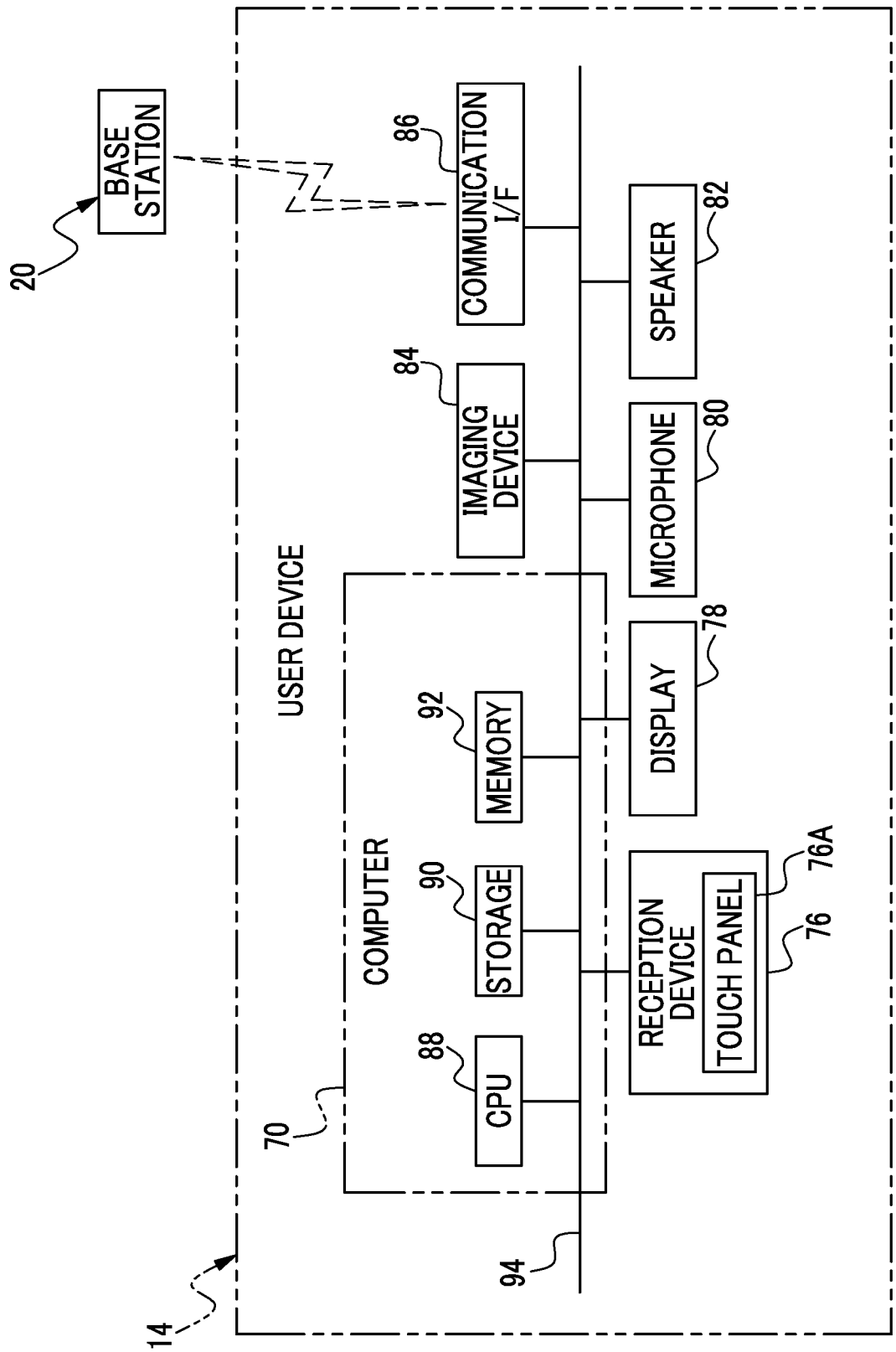
FIG. 4 is a block diagram showing an example of a hardware configuration of an electrical system of a user device.

As shown in FIG. 4 as an example, the user device 14 includes a computer 70, a reception device 76, a display 78, a microphone 80, a speaker 82, an imaging device 84, and a communication I/F 86. The computer 70 includes a CPU 88, a storage 90, and a memory 92, and the CPU 88, the storage 90, and the memory 92 are connected via a bus 94. In the example shown in FIG. 4, one bus is shown as the bus 94 for convenience of illustration, but a plurality of buses 94 may be used. The bus 94 may be a serial bus or a parallel bus including a data bus, an address bus, a control bus, and the like.

The CPU 88 controls the entire user device 14. The storage 90 stores various parameters and various programs. The storage 90 is a non-volatile storage device. Here, a flash memory is employed as an example of the storage 90. The flash memory is only an example, and examples of the storage 90 include various non-volatile memories such as a magnetic resistance memory and/or a ferroelectric memory instead of the flash memory or in combination with the flash memory. The non-volatile storage device may be an EEPROM, an HDD, and/or an SSD. The memory 92 temporarily stores various types of information and is used as a work memory by the CPU 88. An example of the memory 92 is a RAM, but the memory 92 is not limited to this, and other types of storage devices may be used.

The reception device 76 receives an instruction from the viewer 28 or the like. Examples of the reception device 76 include a touch panel 76A and a hard key. The reception device 76 is connected to the bus 94, and the instruction received by the reception device 76 is acquired by the CPU 88.

The display 78 is connected to the bus 94 and displays various types of information under the control of the CPU 88. An example of the display 78 is a liquid crystal display. In addition to the liquid crystal display, another type of display such as an EL display (for example, an organic EL display or an inorganic EL display) may be employed as the display 78.

The user device 14 includes a touch panel display, and the touch panel display is implemented by the touch panel 76A and the display 78. That is, the touch panel display is formed by overlapping the touch panel 76A on a display region of the display 78, or by incorporating a touch panel function ("in-cell" type) inside the display 78. The "in-cell" type touch panel display is only an example, and an "out-cell" type or "on-cell" type touch panel display may be used.

The microphone 80 converts collected sound into an electrical signal. The microphone 80 is connected to the bus 94. The electrical signal obtained by converting the sound collected by the microphone 80 is acquired by the CPU 88 via the bus 94.

The speaker 82 converts an electrical signal into sound. The speaker 82 is connected to the bus 94. The speaker 82 receives the electrical signal output from the CPU 88 via the bus 94, converts the received electrical signal into sound, and outputs the sound obtained by converting the electrical signal to the outside of the user device 14.

The imaging device 84 acquires an image showing a subject by imaging the subject. The imaging device 84 is connected to the bus 94. The image obtained by imaging the subject with the imaging device 84 is acquired by the CPU 88 via the bus 94. For example, in a case where the viewer 28 uses the imaging device 84 to image the inside of the soccer stadium 22 (for example, a region on the soccer field 24), an image obtained by being by the imaging device 84 may also be used together with the captured video 46B to generate a virtual viewpoint image.

The communication I/F 86 is wirelessly communicatively connected to the base station 20. The communication I/F 86 is realized by, for example, a device configured with circuits (for example, an ASIC, an FPGA, and/or a PLD). The communication I/F 86 is connected to the bus 94. The communication I/F 86 controls the exchange of various types of information between the CPU 88 and an external device in a wireless communication method via the base station 20. Here, examples of an "external device" include the information processing apparatus 12.

Figure 5:
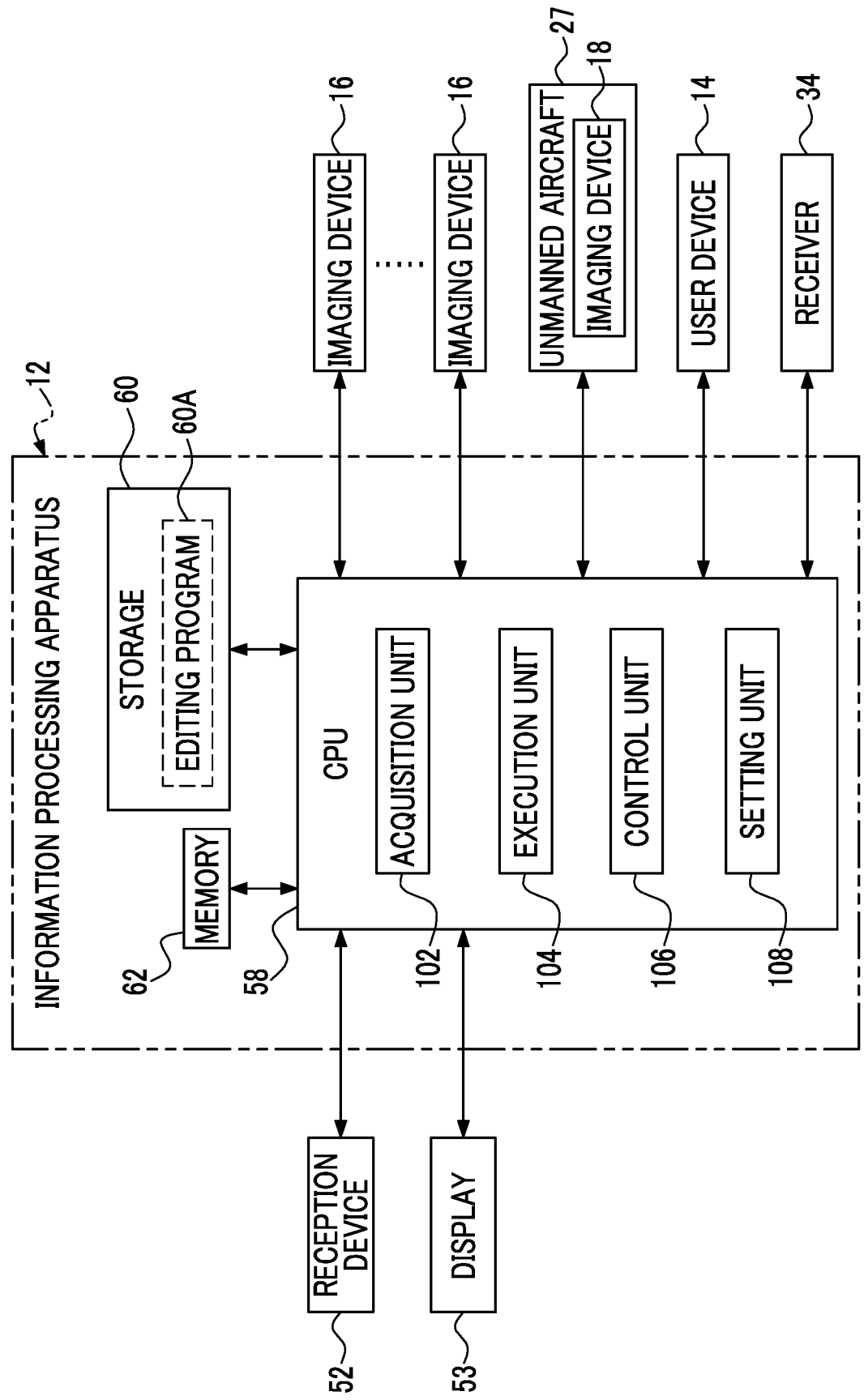
FIG. 5 is a block diagram showing an example of a main function of the information processing apparatus.

As shown in FIG. 5 as an example, in the information processing apparatus 12, an editing program 60A is stored in the storage 60. The CPU 58 reads the editing program 60A from the storage 60 and executes the read editing program 60A on the memory 62. The CPU 58 exchanges various types of information between the user device 14, the imaging device 16, and the unmanned aircraft 27 according to the editing program 60A executed on the memory 62, and transmits various videos to the receiver 34. The editing program 60A is a program for causing the computer 50 to execute a process, and is an example of a "program" according to the technique of the present disclosure. The computer 50 is an example of a "computer" according to the technique of the present disclosure.

The CPU 58 reads the editing program 60A from the storage 60 and executes the read editing program 60A on the memory 62. The CPU 58 operates as an acquisition unit 102, an execution unit 104, a control unit 106, and a setting unit 108 according to the editing program 60A executed on the memory 62, and thus executes a virtual viewpoint designation process, a virtual viewpoint video generation process, a thumbnail image display process, and an editing process, which will be described later. In the following description, for convenience of the description, in a case where it is not necessary to distinguish between the virtual viewpoint designation process, the virtual viewpoint video generation process, the thumbnail image display process, and the editing process, the processes will be referred to as "information processing".

The CPU 58 performs information processing to display, on the display 53, a standard image corresponding to the imaging region, a plurality of virtual viewpoint paths disposed in the standard image and representing a movement trajectory of a virtual viewpoint, an indicator imaging a reproduction position of a virtual viewpoint video, and a reference image based on a virtual viewpoint image viewed from a virtual viewpoint corresponding to each reproduction position of the virtual viewpoint path among the plurality of virtual viewpoint images configuring the virtual viewpoint video.

Here, the virtual viewpoint path can be said to be a set in which a plurality of virtual viewpoints are linearly connected. The virtual viewpoint refers to a viewpoint of a virtual person. The virtual viewpoint image is an image showing an aspect of the imaging region observed from the virtual viewpoint. A virtual person may be replaced with a virtual camera. A physical camera is a camera that actually exists as an object and is visually recognized, whereas a virtual camera does not actually exist as an object and is not visually recognized. Therefore, the virtual viewpoint can be rephrased as a position of the virtual camera. In this case, the virtual viewpoint image can be said to be an image obtained by being captured by the virtual camera.

The reference image is an image that is referred to in a case where a virtual viewpoint video is edited. Examples of the reference image include a thumbnail image generated on the basis of the virtual viewpoint image included in the virtual viewpoint video. In the present embodiment, a thumbnail image will be described as an example. However, the reference image is not limited to the thumbnail image and may be an image corresponding to a virtual viewpoint image, and is preferably an image obtained by reducing a size of the virtual viewpoint image, such as a thumbnail image.

Figure 6:
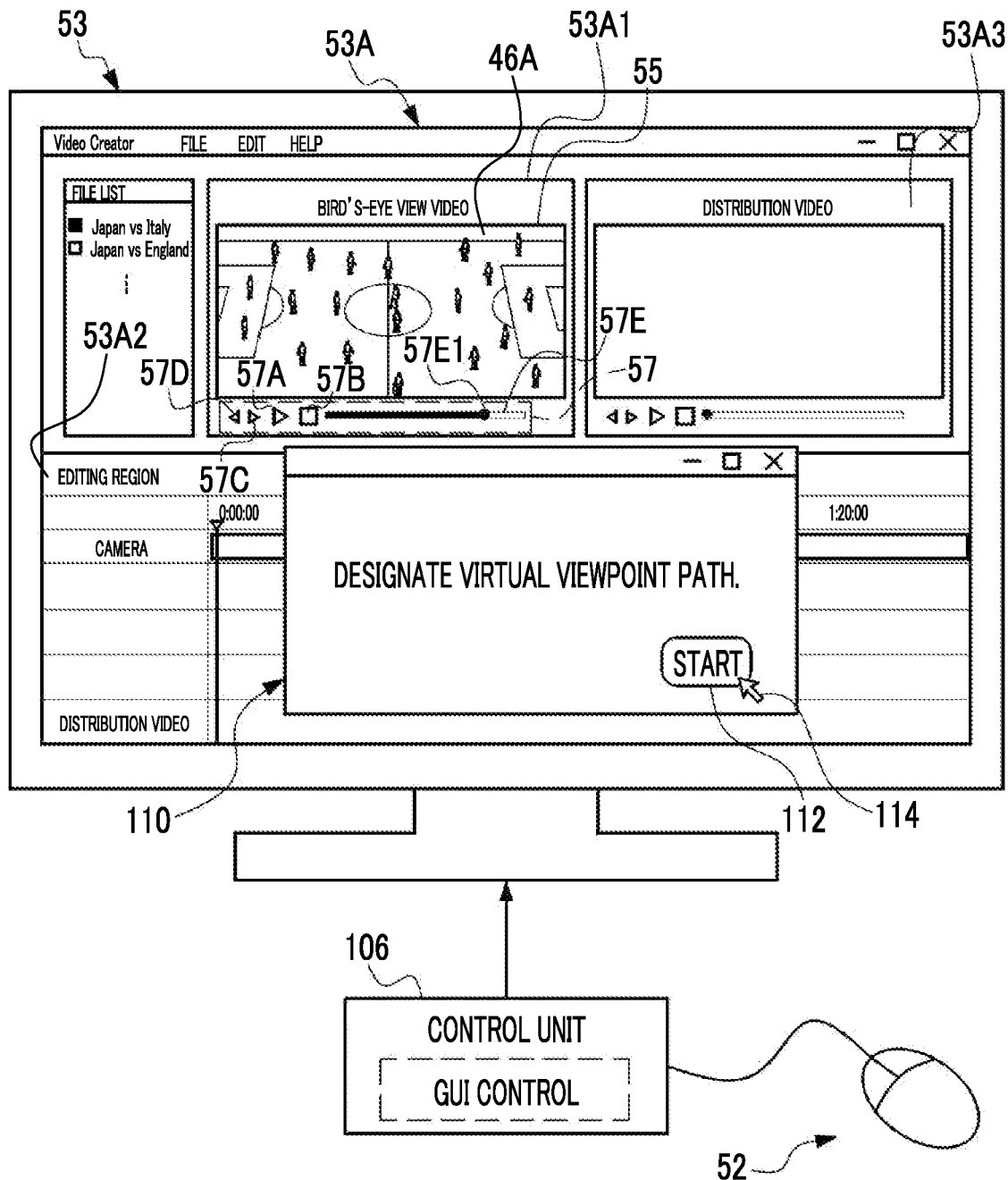
FIG. 6 is a conceptual diagram showing an example of a screen displayed at the time of starting motion picture editing.

As shown in FIG. 6 as an example, in the information processing apparatus 12, the control unit 106 performs GUI control. By performing the GUI control, the control unit 106 executes a process corresponding to an instruction received by the reception device 52, or displays various types of information on the display 53 according to an instruction received by the reception device 52. Specifically, the control unit 106 displays a motion picture editing screen 53A on the display 53 in response to an instruction received by the reception device 52. The control unit 106 controls the information processing apparatus 12 such that the information processing apparatus 12 executes various processes related to motion picture editing by a user operating the reception device 52 (for example, a mouse).

The motion picture editing screen 53A includes a plurality of display regions. The plurality of display regions include a reference region 53A1, an editing region 53A2, and a distribution video region 53A3.

The editing region 53A2 is a work area for editing a plurality of videos (for example, a plurality of virtual viewpoint videos). In the distribution video region 53A3, a distribution video obtained through editing in the editing region 53A2 is displayed.

The reference region 53A1 is a region that is referred to in a case where a plurality of videos are edited in the editing region 53A2. The reference region 53A1 includes a reference video display region 55 and an operation panel 57. The bird's-eye view video 46A and the reference image are displayed in the reference video display region 55. In the example shown in FIG. 6, the bird's-eye view video 46A is displayed in the reference video display region 55, but the reference image is not displayed. Here, the bird's-eye view video 46A is an example of a "standard image" according to the technique of the present disclosure. Although the bird's-eye view video 46A is exemplified here, this is only an example, and an image obtained by being captured by any one of the plurality of imaging devices 16 may be used, and a standard image may be a standard virtual viewpoint video defined as a virtual viewpoint video used as a standard among a plurality of virtual viewpoint videos.

The "standard image" is not limited to a realistic video, and may be a simple display image such as displaying only a contour filled with a person. In FIG. 6, the bird's-eye view video 46A of the soccer field 24 viewed from obliquely above is displayed, but the "standard image" is not limited to this. For example, the "standard image" may be a video in which the soccer field 24 is viewed vertically downward from the sky, or a video in which the soccer field 24 is viewed from the side in parallel with the ground. The "standard image" is not limited to one, and for example, both of a video in which the soccer field 24 is viewed vertically downward from the sky and a video in which the soccer field 24 is viewed from the side in parallel with the ground may be displayed. In this case, it is desirable that in a case where a virtual viewpoint path is designated for one video, the designated virtual viewpoint path is also reflected in the other video.

The operation panel 57 includes a play key 57A, a stop key 57B, a fast forward key 57C, a fast rewind key 57D, and a seek bar 57E. In the present embodiment, reproduction means a process of displaying an actual video itself stored in a storage device such as the storage 60 and/or an image based on the real video stored in a storage device such as the storage 60 on the display 53. An example of reproduction of an image based on a real video stored in a storage device such as the storage 60 is reproduction of a reference image (for example, a thumbnail image).

The play key 57A is a soft key that receives an instruction for starting reproduction of a video (for example, the bird's-eye view video 46A or the captured video 46B, and the reference image) displayed in the reference region 53A1. By turning on the play key 57A, a plurality of images (still images) included in the video are reproduced in a time series according to a predetermined reproduction frame rate (for example, 30 frames/sec). The stop key 57B is a soft key that receives an instruction for stopping reproduction of the video. By turning on the stop key 57B in a state where the video is being reproduced, the reproduction of the video is stopped. The fast forward key 57C is a soft key that receives an instruction for fast-forwarding the video that is being reproduced. By turning on the fast forward key 57C, the video that is being reproduced is fast-forwarded. The fast rewind key 57D is a soft key that receives an instruction for fast-rewinding the video that is being reproduced. By turning on the fast rewind key 57D, the video that is being reproduced is fast-rewinded.

The seek bar 57E is an example of an "indicator" according to the technique of the present disclosure, and is a bar indicating a reproduction position of a video (for example, a reproduction position of the bird's-eye view video 46A and a reproduction position of a plurality of time-series reference images). The reproduction position refers to a position on the time axis indicating a total reproduction time for reproducing the video. More specifically, the reproduction position is a position that can specify, for a frame image that is currently being reproduced, a corresponding time point of the frame image in a time series of a plurality of frame images configuring the video on a time axis (for example, the seek bar 57E).

The seek bar 57E has a slider 57E1, and the slider 57E1 moves from one end of the seek bar 57E, which is a reproduction start position, to the other end, which is a reproduction end position of the seek bar 57E, as the reproduction of the virtual viewpoint video progresses (in the example shown in 6, from the left end to the right end). In a case where a reproduction position is indicated by clicking any position on the seek bar 57E with the cursor 114 or the like, the slider 57E1 moves to the indicated reproduction position. A frame image corresponding to the indicated reproduction position is displayed on the display 53.

Although the seek bar 57E is exemplified here, the present disclosure is not limited to this, and an indicator of another shape (for example, a semi-annular shape) having a slider or the like capable of indicating a reproduction position may be used as in the slider 57E1. Any indicator may be used as long as the indicator has the same function as that of the seek bar 57E.

In a case of starting motion picture editing, the control unit 106 displays, for example, a dialog 110 in the motion picture editing screen 53A. The dialog 110 is a screen that prompts the user to designate a virtual viewpoint path for generating a virtual viewpoint video. In the example shown in FIG. 6, a message "designate the virtual viewpoint path" and a start button 112 for starting designation of a virtual viewpoint are displayed in the dialog 110. The user can start the designation of the virtual viewpoint by performing a click operation in a state in which the cursor 114 displayed on the motion picture editing screen 53A is located on the start button 112 by operating the mouse. Although a mouse operation is exemplified here, the present disclosure is not limited to this, and a device such as a keyboard and/or a touch panel may be used instead of or together with the mouse.

Figure 7:
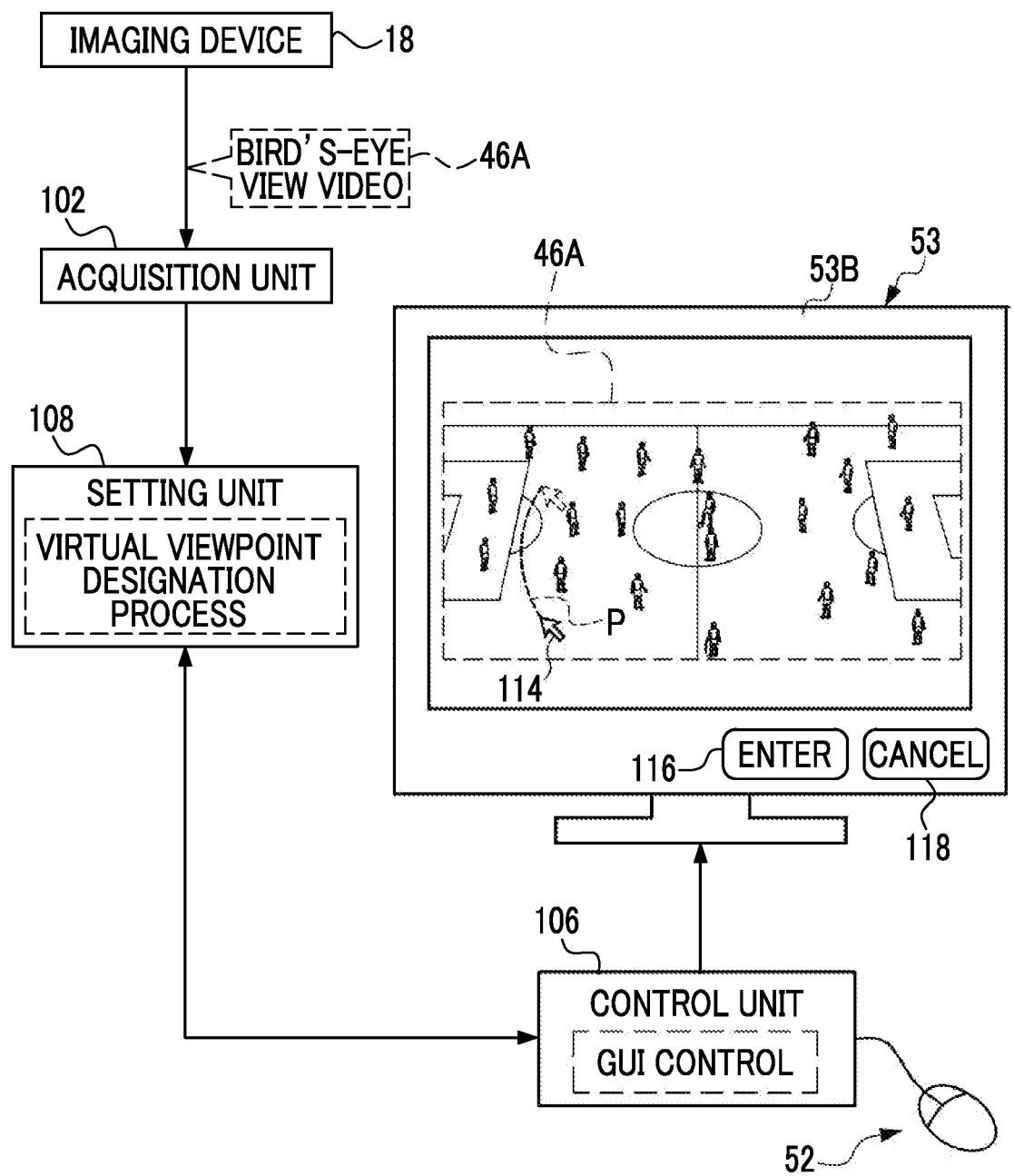
FIG. 7 is a conceptual diagram used to describe an example of processing details of a virtual viewpoint designation process.

As shown in FIG. 7 as an example, the acquisition unit 102 acquires the bird's-eye view video 46A from the imaging device 16. The setting unit 108 performs a virtual viewpoint designation process for enabling the user to designate a virtual viewpoint. Specifically, the setting unit 108 causes the control unit 106 to perform GUI control, and thus a virtual viewpoint designation screen 53B is displayed on the display 53 via the control unit 106. The setting unit 108 displays the bird's-eye view video 46A acquired by the acquisition unit 102 on the virtual viewpoint designation screen 53B. On the virtual viewpoint designation screen 53B, an enter key 116 and a cancel key 118 are displayed as soft keys in a region different from the display region of the bird's-eye view video 46A. The user may determine or cancel a position of the virtual viewpoint by performing a click operation in a state in which the cursor 114 is moved onto the enter key 116 or the cancel key 118 by operating the mouse.

The user may designate a virtual viewpoint (here, a position and a line-of-sight direction are designated as an example) by operating the mouse as an example of the reception device 52 while referring to the bird's-eye view video 46A. The designation of the virtual viewpoint may include designation of an angle of view of the virtual viewpoint, but in the following description, for convenience of description, the angle of view is set to a predetermined angle of view (for example, 90 degrees).

The setting unit 108 disposes a virtual viewpoint path P on the bird's-eye view video 46A according to an instruction received by the reception device 52. A start point and an end point of the virtual viewpoint path P are designated through a click operation on the mouse. A shape of the virtual viewpoint path P is determined by a spline curve drawn through an operation on the mouse or the like between the time at which the start point of the virtual viewpoint path P is designated and the time at which the end point is designated.

A length and a shape of the spline curve of the virtual viewpoint path P are changed by the setting unit 108 by operating the mouse or the like even after the start point and the end point of the virtual viewpoint path P are designated. Even after the start point and the end point of the virtual viewpoint path P are designated, a position of the virtual viewpoint path P is also changed by the setting unit 108 by operating the mouse or the like. That is, a position, a length, and a shape of the virtual viewpoint path P are changed by the setting unit 108 in response to a given instruction.

Although a form example in which a position, a length, and a shape of the virtual viewpoint path P are changed is described here, the technique of the present disclosure is not limited to this, and one or two of a position, a length, or a shape of the virtual viewpoint path P may be changed by the setting unit 108 in response to a given instruction.

A position, a length, and a shape of the virtual viewpoint path P are determined by turning on the enter key 116. In a state in which the cancel key 118 is turned on in a state in which the virtual viewpoint path P is selected by performing a click operation or the like on the mouse, the virtual viewpoint path P in the selected state is deleted from the virtual viewpoint designation screen 53B.

The setting unit 108 disposes a plurality of virtual viewpoint paths P at positions designated from the outside in the bird's-eye view video 46A. In the example shown in FIG. 8, virtual viewpoint paths P1, P2, and P3 are disposed in the bird's-eye view video 46A on the virtual viewpoint designation screen 53B. Here, three virtual viewpoint paths such as the virtual viewpoint paths P1, P2, and P3 are exemplified. However, the technique of the present disclosure is not limited to this, and a plurality of virtual viewpoint paths may be used. In the following description, in a case where it is not necessary to distinguish between the virtual viewpoint paths P1, P2, and P3, the virtual viewpoint paths P1, P2, and P3 will also be referred to as a "virtual viewpoint path P".

Figure 8:
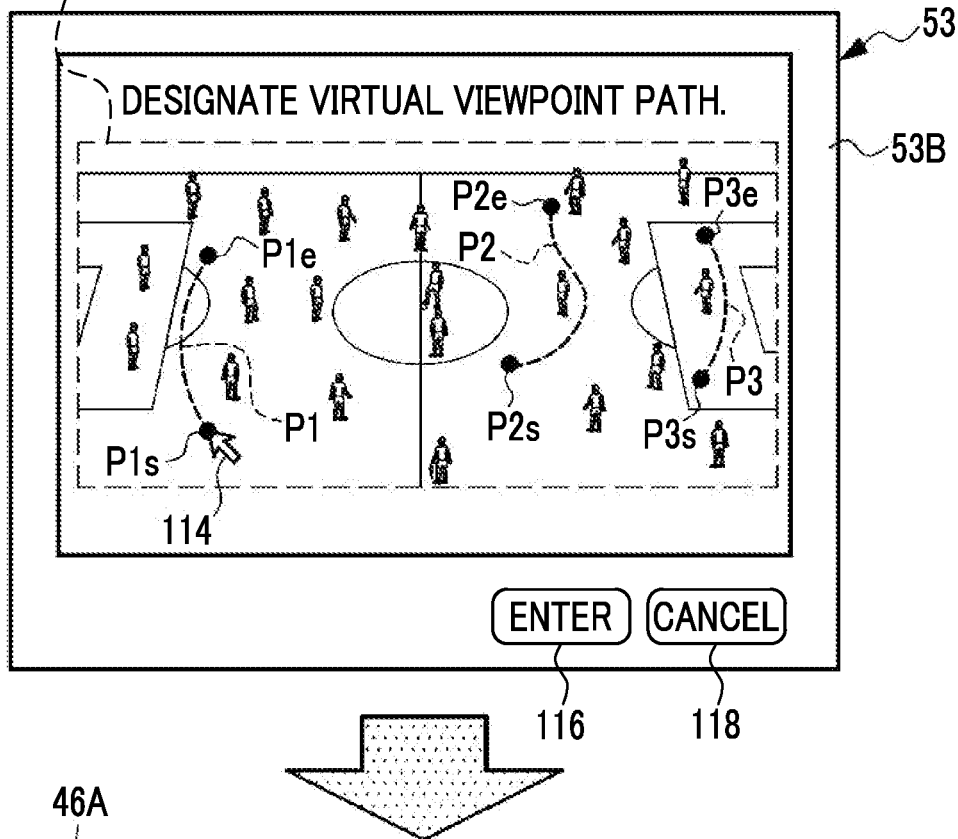
FIG. 8 is a conceptual diagram used to describe an example of a screen transition in the virtual viewpoint designation process.
Figure 8:
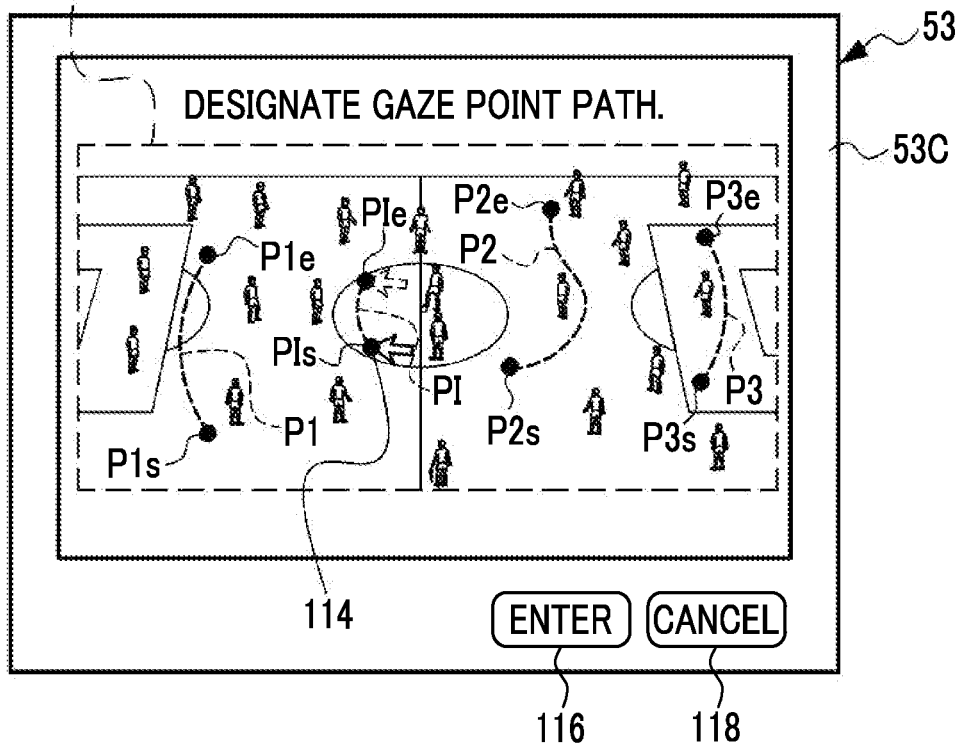

As shown in FIG. 8 as an example, the virtual viewpoint paths P1, P2, and P3 are disposed at different positions in the bird's-eye view video 46A, and lengths and shapes thereof are also different from each other. The virtual viewpoint path P1 has a start point P1$s$ and an end point P1$e$. The virtual viewpoint path P1 is formed by a spline curve drawn from the start point P1$s$ to the end point P1$e$ on the virtual viewpoint designation screen 53B. The virtual viewpoint path P2 has a start point P2$s$ and an end point P2$e$. The virtual viewpoint path P2 is formed by a spline curve drawn in the bird's-eye view video 46A from the start point P2$s$ to the end point P2$e$ on the virtual viewpoint designation screen 53B. The virtual viewpoint path P3 has a start point P3$s$ and an end point P3$e$. The virtual viewpoint path P3 is formed by a spline curve drawn in the bird's-eye view video 46A from the start point P3$s$ to the end point P3$e$ on the virtual viewpoint designation screen 53B. In the example shown in FIG. 8, the virtual viewpoint paths P1, P2, and P3 are represented by the same dashed line, but may be displayed in different aspects. For example, the virtual viewpoint paths P1, P2, and P3 may be displayed in different colors.

As described above, in a case where the virtual viewpoint paths P1, P2, and P3 are drawn in the bird's-eye view video 46A and the enter key 116 is turned on, the setting unit 108 determines the virtual viewpoint paths P1, P2, and P3, and then displays a gaze point designation screen 53C on the display 53.

The gaze point designation screen 53C is a screen for designating a gaze point. The gaze point is a point where a virtual viewpoint gazes. Therefore, a direction from the virtual viewpoint to the gaze point is a line-of-sight direction. Since the virtual viewpoint path P includes a plurality of virtual viewpoints, each of a plurality of directions from the respective virtual viewpoints included in the virtual viewpoint path P to the gaze point is a line-of-sight direction.

The bird's-eye view video 46A is displayed on the gaze point designation screen 53C, and the virtual viewpoint paths P1, P2, and P3 determined by the setting unit 108 are displayed in a state of being superimposed on the bird's-eye view video 46A. On the gaze point designation screen 53C as well, the enter key 116 and the cancel key 118 are displayed as soft keys in a region different from the display region of the bird's-eye view video 46A, similarly to the virtual viewpoint designation screen 53B. The user may determine or cancel a position of the gaze point by performing a click operation in a state in which the cursor 114 is moved onto the enter key 116 or the cancel key 118 by operating the mouse.

The gaze point is determined by a gaze point path PI. The gaze point path PI is an example of "gaze point information" according to the technique of the present disclosure, and represents a trajectory of movement of the gaze point. The gaze point path PI can also be said to be a set in which a plurality of gaze points are linearly connected. The setting unit 108 generates the gaze point path PI according to an instruction received by the reception device 52, and disposes the generated gaze point path PI in the bird's-eye view video 46A. The gaze point path PI has a start point PIs and an end point Pie. The start point Pis and the end point Pie are designated, for example, through a click operation on the mouse. A shape of the gaze point path PI is determined by a spline curve drawn by operating the mouse or the like between the time at which the start point Pis is designated and the time at which the end point Pie is designated. A length and a shape of the spline curve of the gaze point path PI can be changed by operating the mouse or the like even after the start point Pis and the end point Pie are designated.

A position, a length, and a shape of the gaze point path PI are determined by turning on the enter key 116. In a state in which the gaze point path PI is selected by a click operation of a mouse or the like and the cancel key 118 is turned on, the gaze point path PI in the selected state is deleted from the gaze point designation screen 53C.

As described above, in a case where the gaze point path PI is drawn in the bird's-eye view video 46 and the enter key 116 is turned on, the setting unit 108 determines the gaze point path PI, and the virtual viewpoint paths P1, P2, and P3, and then displays a reproduction time designation screen 53D (refer to FIG. 9) on the display 53. Although only one gaze point path is provided here, a plurality of gaze point paths may be provided. For example, one gaze point path may be provided for each of the virtual viewpoint paths P1, P2, and P3.

Figure 9:
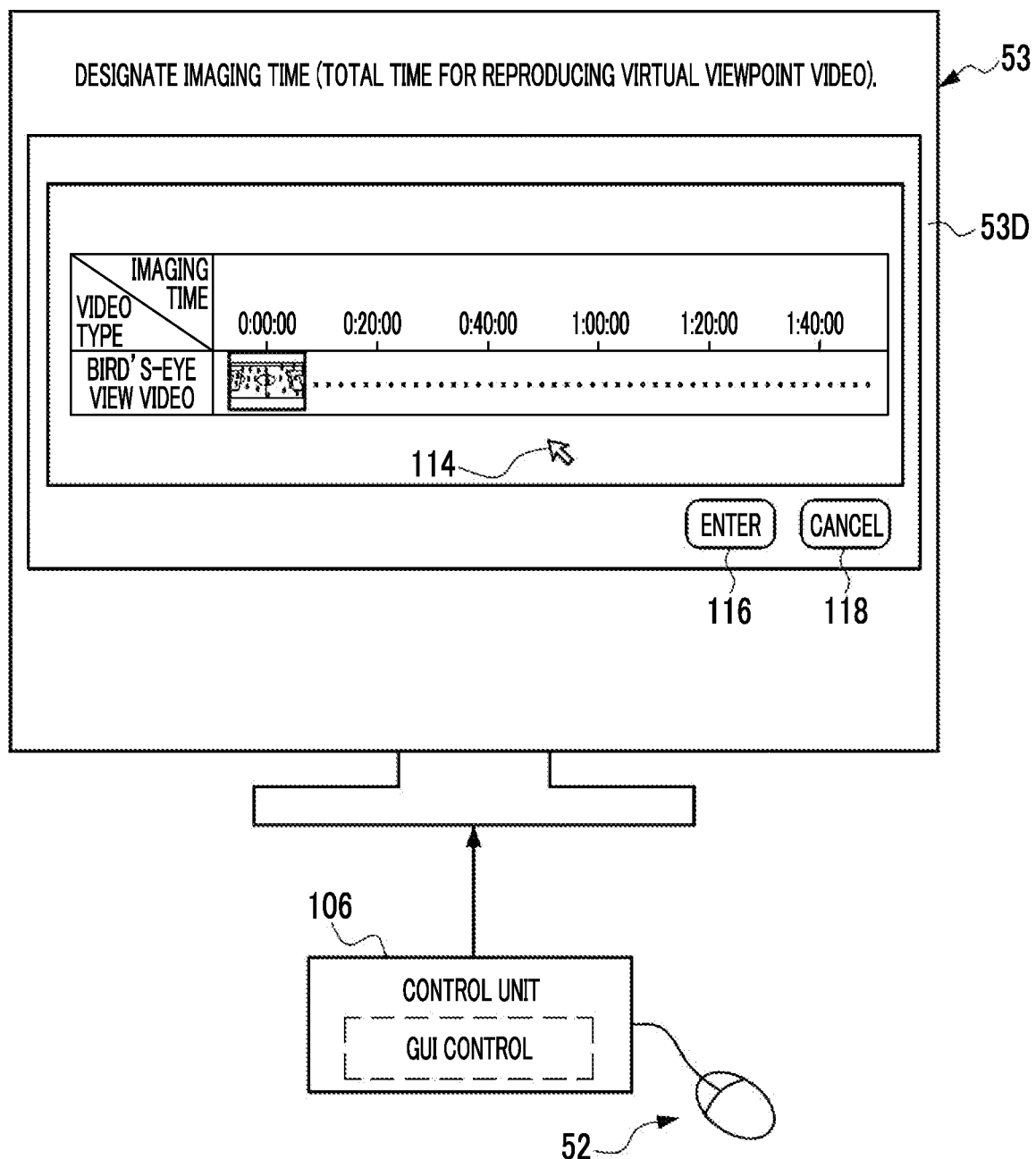
FIG. 9 is a conceptual diagram showing an example of a screen displayed when a total reproduction time is designated.

As shown in FIG. 9 as an example, a message prompting the user to designate a total time (hereinafter, also referred to as a "total reproduction time") for reproducing the virtual viewpoint video is displayed on the reproduction time designation screen 53D. Here, the meaning of reproducing the virtual viewpoint video also includes the meaning of reproducing a reference image, that is, reproducing an image (for example, a thumbnail image) based on the virtual viewpoint video.

In the example shown in FIG. 9, the message "designate the imaging time (total time for reproducing the virtual viewpoint video)" is shown. A standard video-based thumbnail image sequence is displayed on the reproduction time designation screen 53D. The standard video-based thumbnail image sequence is a set in which a plurality of thumbnail images obtained by reducing a plurality of captured images configuring the bird's-eye view video 46A, which is an example of a standard video, are arranged linearly in a time series. A plurality of thumbnail images included in the standard video-based thumbnail image sequence are displayed in parallel with the imaging time. Here, the imaging time is a time during which imaging for obtaining a captured image corresponding to a thumbnail image is performed.

Figure 10:
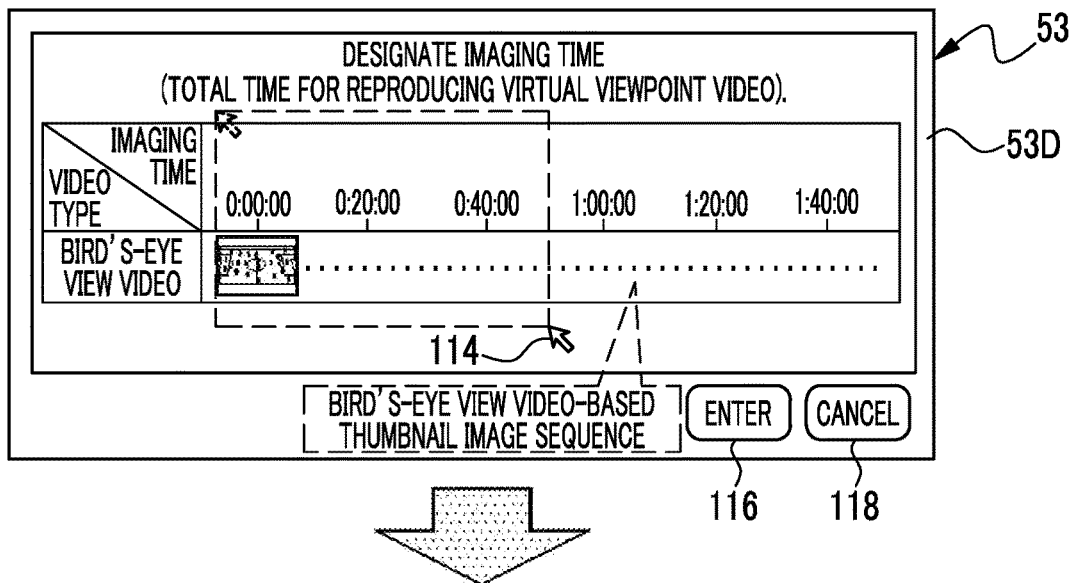
FIG. 10 is a conceptual diagram used to describe an example of processing details for generating viewpoint information.
Figure 10:
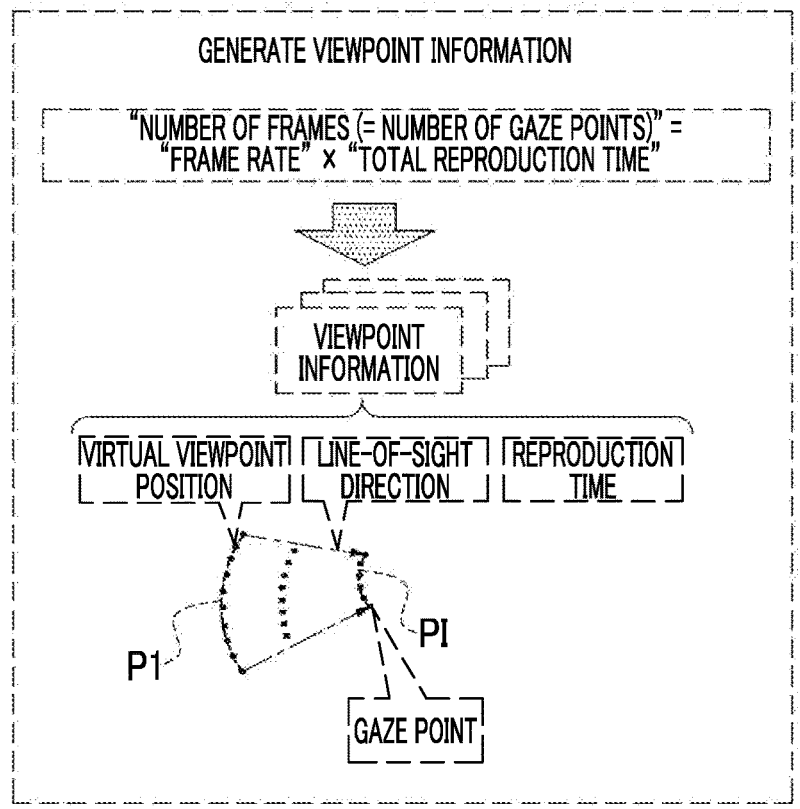
Figure 10:
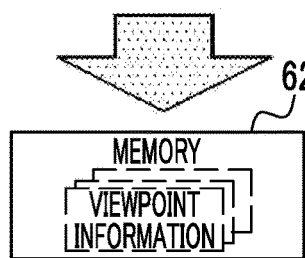

As shown in FIG. 10 as an example, the user operates the mouse or the like to cut out the imaging time and the standard video-based thumbnail image sequence with the cursor 114 and to select a window. The window selected state is canceled by turning on the cancel key 118.

In a case where the enter key 116 is turned on in a state in which the imaging time and the standard video-based thumbnail image sequence are window-selected, the setting unit 108 determines the imaging time window-selected as a total reproduction time.

In a case where the total reproduction time is determined, the setting unit 108 generates viewpoint information including the position of the virtual viewpoint (hereinafter, also referred to as a "virtual viewpoint position"), the line-of-sight direction, and the reproduction time for each virtual viewpoint path P, and stores the generated viewpoint information in the memory 62 for each virtual viewpoint path P.

The viewpoint information is determined for each frame included in the virtual viewpoint video in a time series. The number of frames included in the virtual viewpoint video (hereinafter, also referred to as "the number of virtual viewpoint image frames") corresponds to the number of gaze points used to generate the virtual viewpoint image among a plurality of gaze points included in the gaze point path PI. Here, the gaze point used to generate the virtual viewpoint image refers to a gaze point that determines a line-of-sight direction used to generate the virtual viewpoint image. The number of gaze points used to generate the virtual viewpoint image, that is, the number of virtual viewpoint image frames increases as the total reproduction time increases. The number of virtual viewpoint image frames is determined according to a real video frame rate (here, for example, a frame rate of the bird's-eye view video 46A) and the total reproduction time. Specifically, the number of virtual viewpoint image frames is determined by multiplying the real video frame rate by the total reproduction time.

Figure 11:
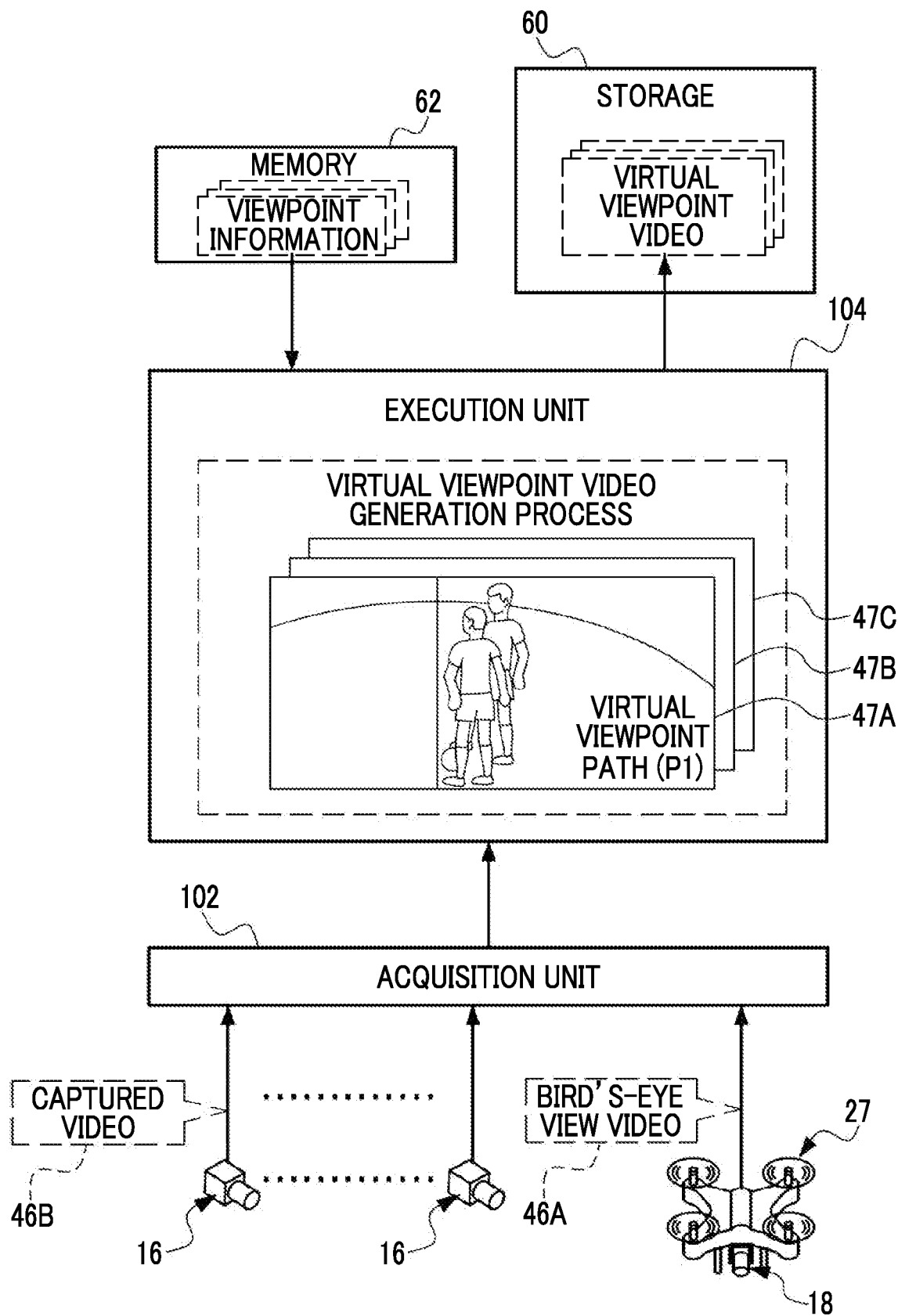
FIG. 11 is a conceptual diagram used to describe an example of processing details of a virtual viewpoint video generation process.

As shown in FIG. 11 as an example, in the information processing apparatus 12, the execution unit 104 performs A virtual viewpoint video generation process. The virtual viewpoint video generation process is a process of generating a virtual viewpoint video with reference to the viewpoint information. The acquisition unit 102 acquires a plurality of real videos from the plurality of physical cameras. The execution unit 104 acquires the viewpoint information generated through the virtual viewpoint designation process from the memory 62. The execution unit 104 generates a virtual viewpoint video on the basis of a plurality of real videos acquired by the acquisition unit 102 with reference to the acquired viewpoint information. Specifically, the execution unit 104 generates a virtual viewpoint video representing a visual field range determined by the viewpoint information by generating 3D polygons on the basis of a plurality of pieces of motion picture data. The virtual viewpoint video is a virtual video in a case where the imaging region is observed in the line-of-sight direction from the virtual viewpoint position.

In a case where the viewpoint information for each of the plurality of virtual viewpoint paths P is stored in the memory 62, the execution unit 104 generates a virtual viewpoint image for each virtual viewpoint position included in the viewpoint information for each of the virtual viewpoint paths P and thus generates a virtual viewpoint video for each virtual viewpoint path P.

In the example shown in FIG. 11, a virtual viewpoint video 47A corresponding to the virtual viewpoint path P1, a virtual viewpoint video 47B corresponding to the virtual viewpoint path P2, and a virtual viewpoint video 47C corresponding to the virtual viewpoint path P3 are shown. The virtual viewpoint video 47A is a video configured with a plurality of virtual viewpoint images generated in a time series for each virtual viewpoint position included in the viewpoint information for the virtual viewpoint path P1. The virtual viewpoint video 47B is a video configured with a plurality of virtual viewpoint images generated in a time series for each virtual viewpoint position included in the viewpoint information for the virtual viewpoint path P2. The virtual viewpoint video 47C is a video configured with a plurality of virtual viewpoint images generated in a time series for each virtual viewpoint position included in the viewpoint information for the virtual viewpoint path P3.

The execution unit 104 stores the virtual viewpoint video generated for each virtual viewpoint path P through the virtual viewpoint video generation process in the storage 60 for each virtual viewpoint path P. In this case, the execution unit 104 adds the viewpoint information to each of the plurality of virtual viewpoint images configuring the virtual viewpoint video. That is, the storage 60 stores the virtual viewpoint video for each virtual viewpoint path P, and the viewpoint information is added to each of the plurality of virtual viewpoint images configuring the virtual viewpoint video.

Figure 12:
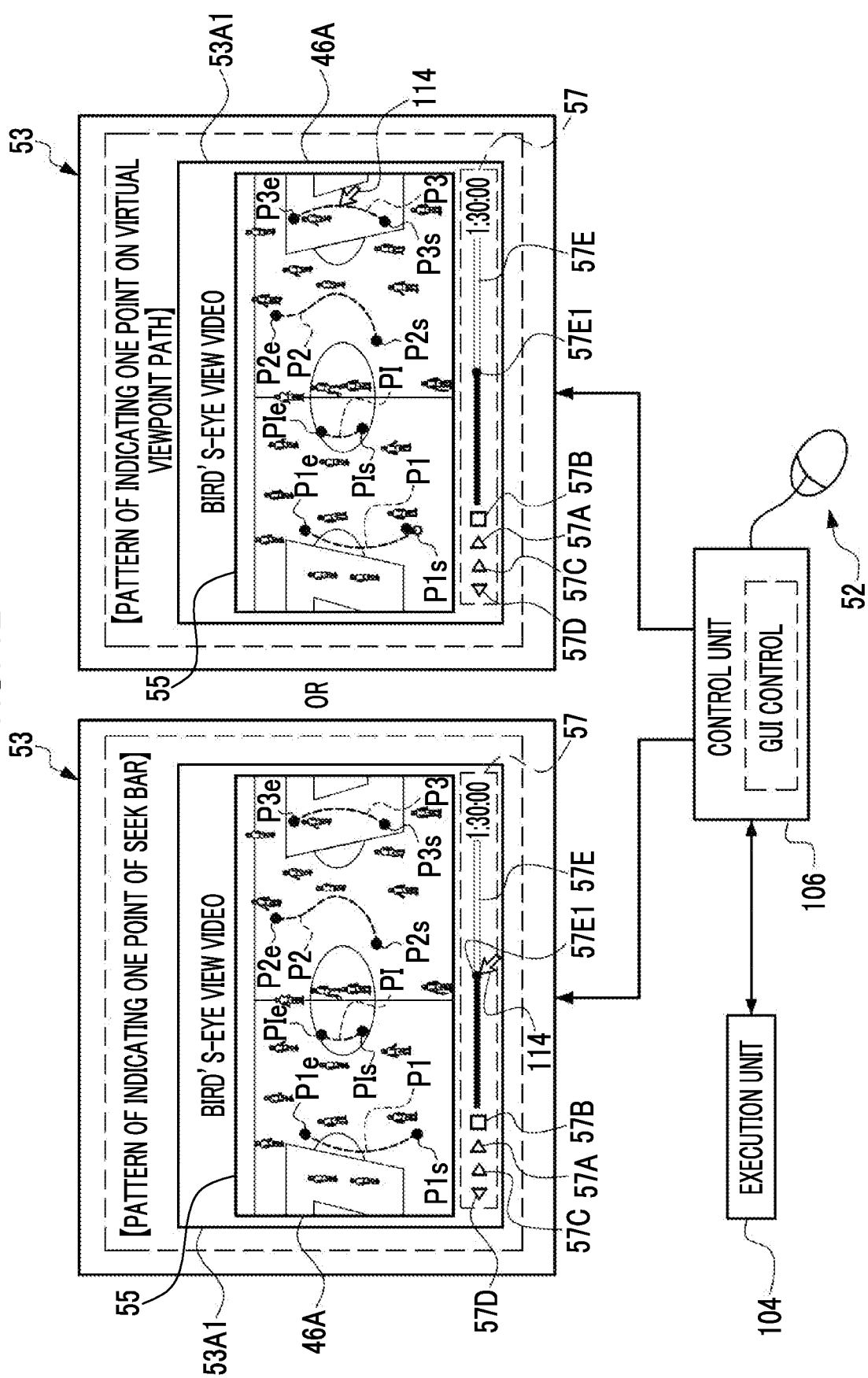
FIG. 12 is a conceptual diagram used to describe an example of a pattern in which one point of a seek bar is indicated as a reproduction position and an example of a pattern in which one point on a virtual viewpoint path is indicated as a reproduction position.

As shown in FIG. 12 as an example, the control unit 106 performs GUI control to superimpose and display the virtual viewpoint paths P1, P2, and P3 and the gaze point path PI on the bird's-eye view video 46A in the reference video display region 55. Here, the virtual viewpoint paths P1, P2, and P3 superimposed on the bird's-eye view video 46A are virtual viewpoint paths P1, P2, and P3 determined on the virtual viewpoint designation screen 53B, and the gaze point superimposed on the bird's-eye view video 46A is the gaze point path PI determined on the gaze point designation screen 53C. The control unit 106 performs the GUI control to move the slider 57E1 in the seek bar 57E in accordance with the total reproduction time determined on the reproduction time designation screen 53D in association with the reproduction of the virtual viewpoint video. A movement speed of the slider 57E1 is determined according to the real video frame rate and the total reproduction time. The control unit 106 performs the GUI control to display the total reproduction time numerically next to the seek bar 57E. The numerical value indicating the total reproduction time is counted up or down in association with the reproduction of the virtual viewpoint video.

The user operates the mouse or the like to indicate a reproduction position of the virtual viewpoint video (hereinafter, also simply referred to as a "reproduction position"). Examples of a pattern of a method of indicating the reproduction position include a pattern of indicating one point of the seek bar 57E (hereinafter, also referred to as a "first indication pattern") and a pattern of indicating one point on any one of the virtual viewpoint paths P (hereinafter, also referred to as a "second indication pattern").

In the first indication pattern, for example, a reproduction position is indicated by performing a click operation on the mouse in a state in which the cursor 114 is placed on one point on the seek bar 57E. By shifting the position of the slider 57E1, a position to which the slider 57E1 has been shifted may be indicated as the reproduction position.

In a case where one point on the seek bar 57E is indicated by performing a click operation on the mouse, among a plurality of virtual viewpoint images configuring each virtual viewpoint video associated with each of the virtual viewpoint paths P1, P2, and P3, a virtual viewpoint image specified from viewpoint information including a reproduction time corresponding to one point indicated on the seek bar 57E is designated as a reproduction target by the execution unit 104.

In the second indication pattern, the reproduction position is indicated by performing a click operation on the mouse in a state in which the cursor 114 is placed on one point on the virtual viewpoint path P displayed in the reference video display region 55. As described above, in a case where one point on the virtual viewpoint path P is indicated as the reproduction position, a virtual viewpoint image specified from viewpoint information including a virtual viewpoint position corresponding to the indicated one point (for example, a virtual viewpoint position closest to the indicated one point) is designated as a reproduction target by the execution unit 104.

In the example shown in FIG. 12, a state in which the cursor 114 is placed on one point on the virtual viewpoint path P3 is shown. In this state, by performing a click operation on the mouse, the one point on the virtual viewpoint path P3 is indicated as the reproduction position. Consequently, among the plurality of virtual viewpoint images configuring the virtual viewpoint video associated with the virtual viewpoint path P3, a virtual viewpoint image specified from viewpoint information including a virtual viewpoint position corresponding to one point indicated on the virtual viewpoint path P3 is designated as a reproduction target by the execution unit 104.

As described above, in a case where one point on the virtual viewpoint path P3 is indicated as the reproduction position, one point on the virtual viewpoint path P1 and one point on the virtual viewpoint path P2 are also indicated as reproduction positions. Here, the reproduction positions indicated on the virtual viewpoint paths P1 and P2 correspond to viewpoint information including the same reproduction time as the reproduction time included in viewpoint information including a virtual viewpoint position corresponding to the reproduction position indicated on the virtual viewpoint path P3.

For the virtual viewpoint paths P1 and P2, in the same manner as in the virtual viewpoint path P3, a virtual viewpoint image specified from viewpoint information including a virtual viewpoint position corresponding to the indicated one point is designated as a reproduction target by the execution unit 104. That is, among the plurality of virtual viewpoint images configuring the virtual viewpoint video associated with the virtual viewpoint path P1, a virtual viewpoint image specified from viewpoint information including a virtual viewpoint position corresponding to one point indicated on the virtual viewpoint path P1 is designated as a reproduction target by the execution unit 104. Among the plurality of virtual viewpoint images configuring the virtual viewpoint video associated with the virtual viewpoint path P2, a virtual viewpoint image specified from viewpoint information including a virtual viewpoint position corresponding to one point indicated on the virtual viewpoint path P2 is designated as a reproduction target by the execution unit 104.

Figure 13:
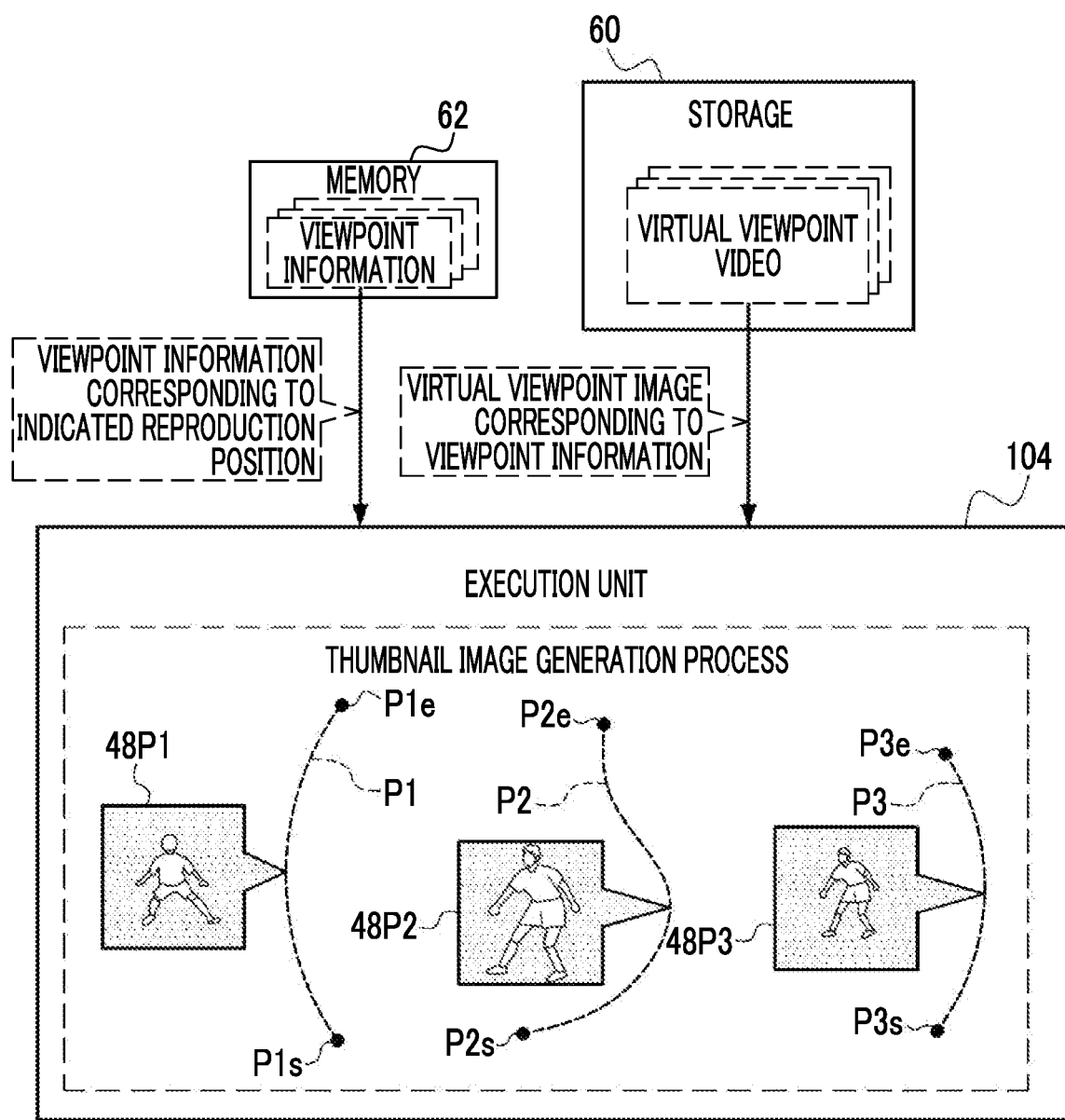
FIG. 13 is a conceptual diagram used to describe an example of processing details of a thumbnail image generation process.

As shown in FIG. 13 as an example, the execution unit 104 acquires viewpoint information corresponding to the reproduction position indicated by the user from the memory 62 for each virtual viewpoint path P, and acquires a virtual viewpoint image corresponding to the acquired viewpoint information from the storage 60 for each virtual viewpoint path P.

The execution unit 104 generates a thumbnail image 48P1 by reducing the virtual viewpoint image acquired from the storage 60 for the virtual viewpoint path P1. The thumbnail image 48P1 is associated with a virtual viewpoint position included in the viewpoint information acquired from the memory 62 among a plurality of virtual viewpoint positions included in the virtual viewpoint path P1. In the example shown in FIG. 13, an aspect is shown in which, among the plurality of virtual viewpoint positions included in the virtual viewpoint path P1, the thumbnail image 48P1 is popped up from the virtual viewpoint position included in the viewpoint information acquired from the memory 62.

The execution unit 104 generates a thumbnail image 48P2 by reducing the virtual viewpoint image acquired from the storage 60 for the virtual viewpoint path P2. The thumbnail image 48P2 is associated with a virtual viewpoint position included in the viewpoint information acquired from the memory 62 among a plurality of virtual viewpoint positions included in the virtual viewpoint path P2. In the example shown in FIG. 13, an aspect is shown in which, among the plurality of virtual viewpoint positions included in the virtual viewpoint path P2, the thumbnail image 48P2 is popped up from the virtual viewpoint position included in the viewpoint information acquired from the memory 62.

The execution unit 104 generates a thumbnail image 48P3 by reducing the virtual viewpoint image acquired from the storage 60 for the virtual viewpoint path P3. The thumbnail image 48P3 is associated with a virtual viewpoint position included in the viewpoint information acquired from the memory 62 among a plurality of virtual viewpoint positions included in the virtual viewpoint path P3. In the example shown in FIG. 13, an aspect is shown in which, among the plurality of virtual viewpoint positions included in the virtual viewpoint path P3, the thumbnail image 48P3 is popped up from the virtual viewpoint position included in the viewpoint information acquired from the memory 62.

Figure 14:
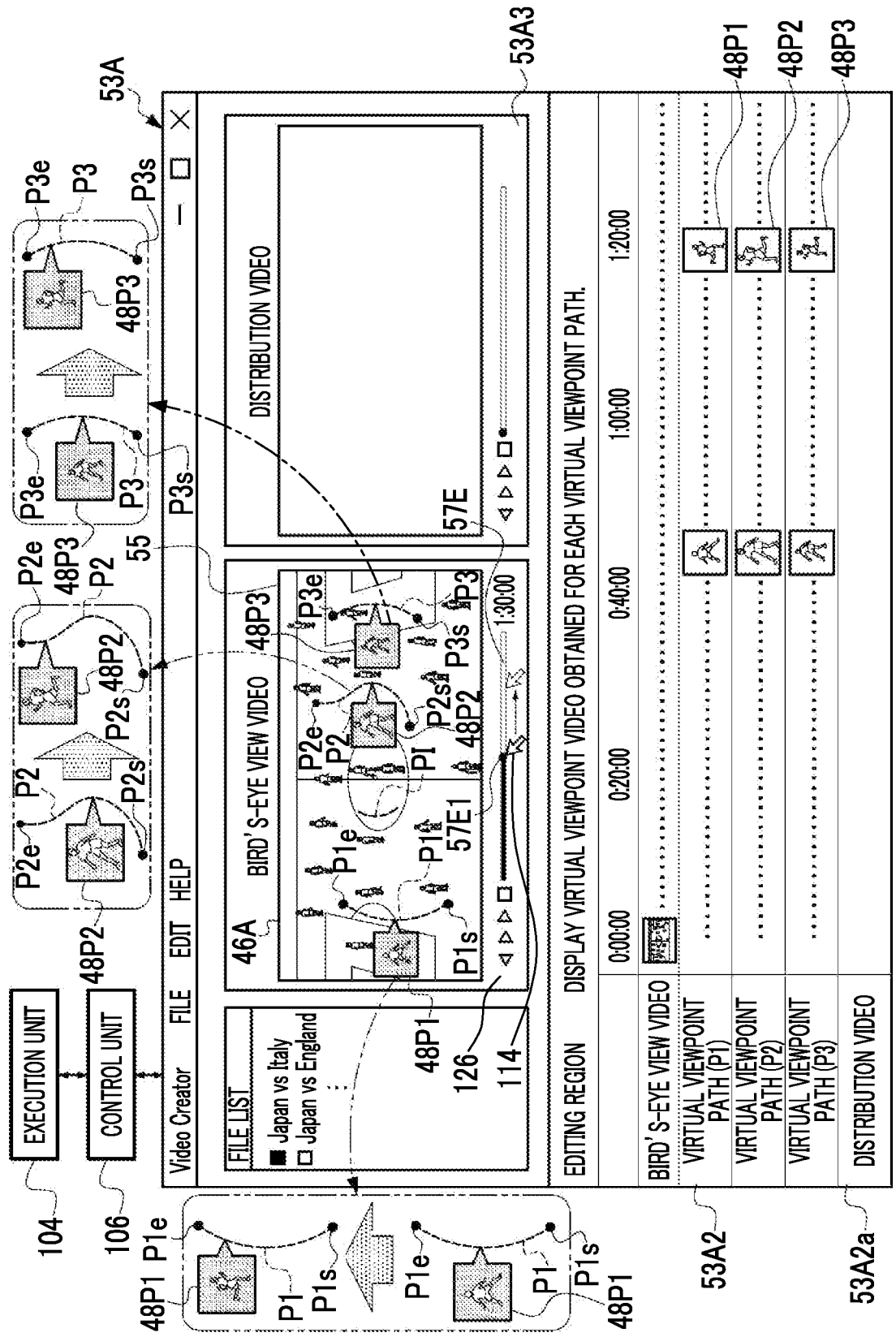
FIG. 14 is a conceptual diagram showing an example of display details of a motion picture editing screen.

As shown in FIG. 14 as an example, the control unit 106 performs the GUI control to display the bird's-eye view video 46A, the virtual viewpoint paths P1, P2, and P3, and the thumbnail images 48P1, 48P2, and 48P3 generated by the execution unit 104 in the reference video display region 55. The control unit 106 performs the GUI control to display the virtual viewpoint paths P1, P2, and P3, and the thumbnail images 48P1, 48P2, and 48P3 generated by the execution unit 104 in the bird's-eye view video 46A.

In the example shown in FIG. 14, the thumbnail image 48P1 is displayed to be popped up in a balloon format from a virtual viewpoint position corresponding to a reproduction position indicated by the slider 57E1 on the seek bar 57E among the plurality of virtual viewpoint positions included in the virtual viewpoint path P1. In the example shown in FIG. 14, the thumbnail image 48P2 is displayed to be popped up in a balloon format from a virtual viewpoint position corresponding to a reproduction position indicated by the slider 57E1 on the seek bar 57E among the plurality of virtual viewpoint positions included in the virtual viewpoint path P2. In the example shown in FIG. 14, the thumbnail image 48P3 is displayed to be popped up in a balloon format from a virtual viewpoint position corresponding to a reproduction position indicated by the slider 57E1 on the seek bar 57E among the plurality of virtual viewpoint positions included in the virtual viewpoint path P3.

The control unit 106 performs the GUI control to display the seek bar 57E in different aspects before and after the reproduction position in the reference video display region 55. In the example shown in FIG. 14, the seek bar 57E is displayed in a different manner before and after the slider 57E1. Specifically, a region indicating the reproduction position temporally before the position of the slider 57E1 is filled, whereas a region indicating the reproduction position temporally after the position of the slider 57E1 is not filled.

The control unit 106 performs the GUI control to change the reproduction position indicated by the seek bar 57E in response to a given instruction. For example, in a case where the user changes the position of the slider 57E1 on the seek bar 57E by operating the mouse or the like, the reproduction position indicated by the seek bar 57E is changed. Along with this, the execution unit 104 generates the thumbnail images 48P1, 48P2, and 48P3 on the basis of a virtual viewpoint image specified from viewpoint information corresponding to the reproduction position after being changed. In the following description, for convenience of the description, a thumbnail image generated on the basis of a virtual viewpoint image specified from viewpoint information corresponding to a reproduction position will also be referred to as a "thumbnail image corresponding to a reproduction position".

The control unit 106 performs the GUI control to change the reproduction position in response to an operation of moving the thumbnail image 48P1, 48P2, or 48P3 on the bird's-eye view video 46A. That is, in a case in which any one of the thumbnail image 48P1, 48P2, or 48P3 is moved through a drag operation or the like, the reproduction position indicated by the seek bar 57E is changed by the control unit 106. The execution unit 104 generates the thumbnail images 48P1, 48P2, and 48P3 on the basis of virtual viewpoint image specified from viewpoint information corresponding to the reproduction position after being changed. Here, the movement of the thumbnail image 48P1 refers to movement of the thumbnail image 48P1 on the virtual viewpoint path P1, the movement of the thumbnail image 48P2 refers to movement of the thumbnail image 48P2 on the virtual viewpoint path P2, and the movement of the thumbnail image 48P3 refers to movement of the thumbnail image 48P3 on the virtual viewpoint path P3.

In a case where the reproduction position indicated by the seek bar 57E is changed, the control unit 106 displays the thumbnail images 48P1, 48P2, and 48P3 corresponding to the reproduction position after being changed in the reference video display region 55.

In a case where the reproduction position indicated by the seek bar 57E is changed, the control unit 106 displays the thumbnail image 48P1 corresponding to the reproduction position after being changed at a position different from that of the thumbnail image 48P1 corresponding to the reproduction position before being changed. In a case where the reproduction position indicated by the seek bar 57E is changed, the control unit 106 displays the thumbnail image 48P2 corresponding to the reproduction position after being changed at a position different from that of the thumbnail image 48P2 corresponding to the reproduction position before being changed. In a case where the reproduction position indicated by the seek bar 57E is changed, the control unit 106 displays the thumbnail image 48P3 corresponding to the reproduction position after being changed at a position different from that of the thumbnail image 48P3 corresponding to the reproduction position before being changed.

The control unit 106 displays only one thumbnail image 48P1 for the virtual viewpoint path P1, displays only one thumbnail image 48P2 for the virtual viewpoint path P2, and displays only one thumbnail image 48P3 for the virtual viewpoint path P2.

In a case where the thumbnail image 48P1 corresponding to the reproduction position after being changed is generated by the execution unit 104, the execution unit 104 cancels the association state between the thumbnail image 48P1 before the reproduction position is changed and the virtual viewpoint path P1. The execution unit 104 associates the thumbnail image 48P1 corresponding to the reproduction position after being changed with a virtual viewpoint position included in the viewpoint information corresponding to the reproduction position after being changed among the plurality of virtual viewpoint positions included in the virtual viewpoint path P1. The control unit 106 deletes the thumbnail image 48P1 before the reproduction position is changed from the reference video display region 55 by performing the GUI control. By performing the GUI control, the control unit 106 displays the thumbnail image 48P1 corresponding to the reproduction position after being changed to be popped up in a balloon format from the virtual viewpoint position corresponding to the reproduction position indicated by the slider 57E1 on the seek bar 57E among the plurality of virtual viewpoint positions included in the virtual viewpoint path P1. That is, the control unit 106 displays the thumbnail image 48P1 along the virtual viewpoint path P1.

In a case where the thumbnail image 48P2 corresponding to the reproduction position after being changed is generated by the execution unit 104, the execution unit 104 cancels the association state between the thumbnail image 48P2 before the reproduction position is changed and the virtual viewpoint path P2. The execution unit 104 associates the thumbnail image 48P2 corresponding to the reproduction position after being changed with a virtual viewpoint position included in the viewpoint information corresponding to the reproduction position after being changed among the plurality of virtual viewpoint positions included in the virtual viewpoint path P2. The control unit 106 deletes the thumbnail image 48P2 before the reproduction position is changed from the reference video display region 55 by performing the GUI control. By performing the GUI control, the control unit 106 displays the thumbnail image 48P2 corresponding to the reproduction position after being changed to be popped up in a balloon format from the virtual viewpoint position corresponding to the reproduction position indicated by the slider 57E1 on the seek bar 57E among the plurality of virtual viewpoint positions included in the virtual viewpoint path P2. That is, the control unit 106 displays the thumbnail image 48P2 along the virtual viewpoint path P2.

In a case where the thumbnail image 48P3 corresponding to the reproduction position after being changed is generated by the execution unit 104, the execution unit 104 cancels the association state between the thumbnail image 48P3 before the reproduction position is changed and the virtual viewpoint path P3. The execution unit 104 associates the thumbnail image 48P3 corresponding to the reproduction position after being changed with a virtual viewpoint position included in the viewpoint information corresponding to the reproduction position after being changed among the plurality of virtual viewpoint positions included in the virtual viewpoint path P3. The control unit 106 deletes the thumbnail image 48P3 before the reproduction position is changed from the reference video display region 55 by performing the GUI control. By performing the GUI control, the control unit 106 displays the thumbnail image 48P3 corresponding to the reproduction position after being changed to be popped up in a balloon format from the virtual viewpoint position corresponding to the reproduction position indicated by the slider 57E1 on the seek bar 57E among the plurality of virtual viewpoint positions included in the virtual viewpoint path P3. That is, the control unit 106 displays the thumbnail image 48P3 along the virtual viewpoint path P3.

By performing the GUI control, the control unit 106 displays the standard video-based thumbnail image sequence and the virtual viewpoint video-based thumbnail image sequence in the editing region 53A2 to be comparable to the total reproduction time. The virtual viewpoint video-based thumbnail image sequence is a set in which a plurality of thumbnail images obtained by reducing a plurality of virtual viewpoint images configuring the virtual viewpoint video are arranged linearly in a time series.

In the example shown in FIG. 14, a message "the virtual viewpoint video obtained for each virtual viewpoint path is displayed" is displayed in the editing region 53A2, and the standard video-based thumbnail image sequence and a plurality of virtual viewpoint video-based thumbnail image sequences are displayed to be comparable to the total reproduction time below this message. In the example shown in FIG. 14, three virtual viewpoint video-based thumbnail image sequences are shown, but this is only an example, and virtual viewpoint video-based thumbnail image sequences of the same number as the number of virtual viewpoint paths P displayed in the reference video display region 55 may be displayed in the editing region 53A2.

A plurality of thumbnail images included in the standard video-based thumbnail image sequence and a plurality of thumbnail images included in the virtual viewpoint video-based thumbnail image sequence are disposed in a time series and are displayed to be arranged and to be comparable to each other for each reproduction time. In the example shown in FIG. 14, as an example of a plurality of thumbnail images included in the virtual viewpoint video-based thumbnail image sequence, the plurality of thumbnail images 48P1 corresponding to the virtual viewpoint video generated on the basis of the virtual viewpoint path P1, the plurality of thumbnail images 48P2 corresponding to the virtual viewpoint video generated on the basis of the virtual viewpoint path P2, and the plurality of thumbnail images 48P3 corresponding to the virtual viewpoint video generated on the basis of the virtual viewpoint path P3 are shown.

Figure 15:
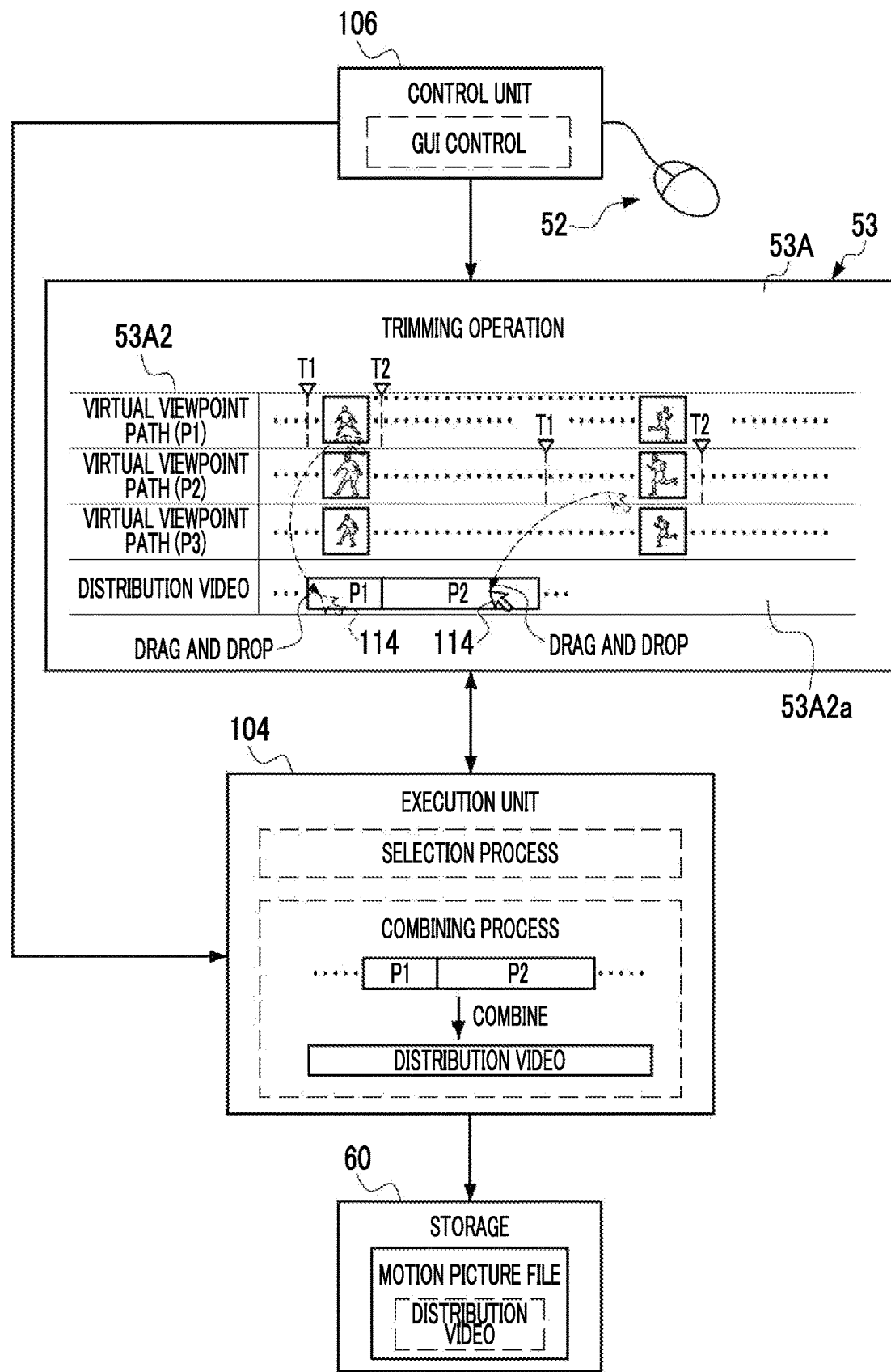
FIG. 15 is a conceptual diagram used to describe an example of details of a selection process and a combining process executed by an execution unit.

As shown in FIG. 15 as an example, by performing the GUI control, the control unit 106 displays trim markers T1 and T2 in response to the user's trimming operation on the virtual viewpoint video-based thumbnail image sequence displayed in the editing region 53A2. The trim marker T1 represents a trim start position. The trim marker T2 represents a trim end position. The user can extract a portion intended by the user by dragging and dropping a portion defined by the trim markers T1 and T2 in the virtual viewpoint video-based thumbnail image sequence the with respect to a distribution video creation region 15A2a.

The execution unit 104 executes a selection process in response to the trimming operation and executes a combining process in response to the drag and drop operation. The selection process is a process in which a plurality of virtual viewpoint images corresponding to a plurality of thumbnail images cut out from the virtual viewpoint video-based thumbnail image sequence by performing a trimming operation on the virtual viewpoint video-based thumbnail image sequence are selected from a plurality of virtual viewpoint videos in the storage 60. The combining process is a process of generating a distribution video by combining the plurality of virtual viewpoint images selected through the selection process in a time series. The execution unit 104 generates a motion picture file on the basis of the distribution video, and stores the generated motion picture file in the storage 60. The motion picture file in the storage 60 is provided to the user device 14, the receiver 34, and the like by the execution unit 104.

Figure 16:
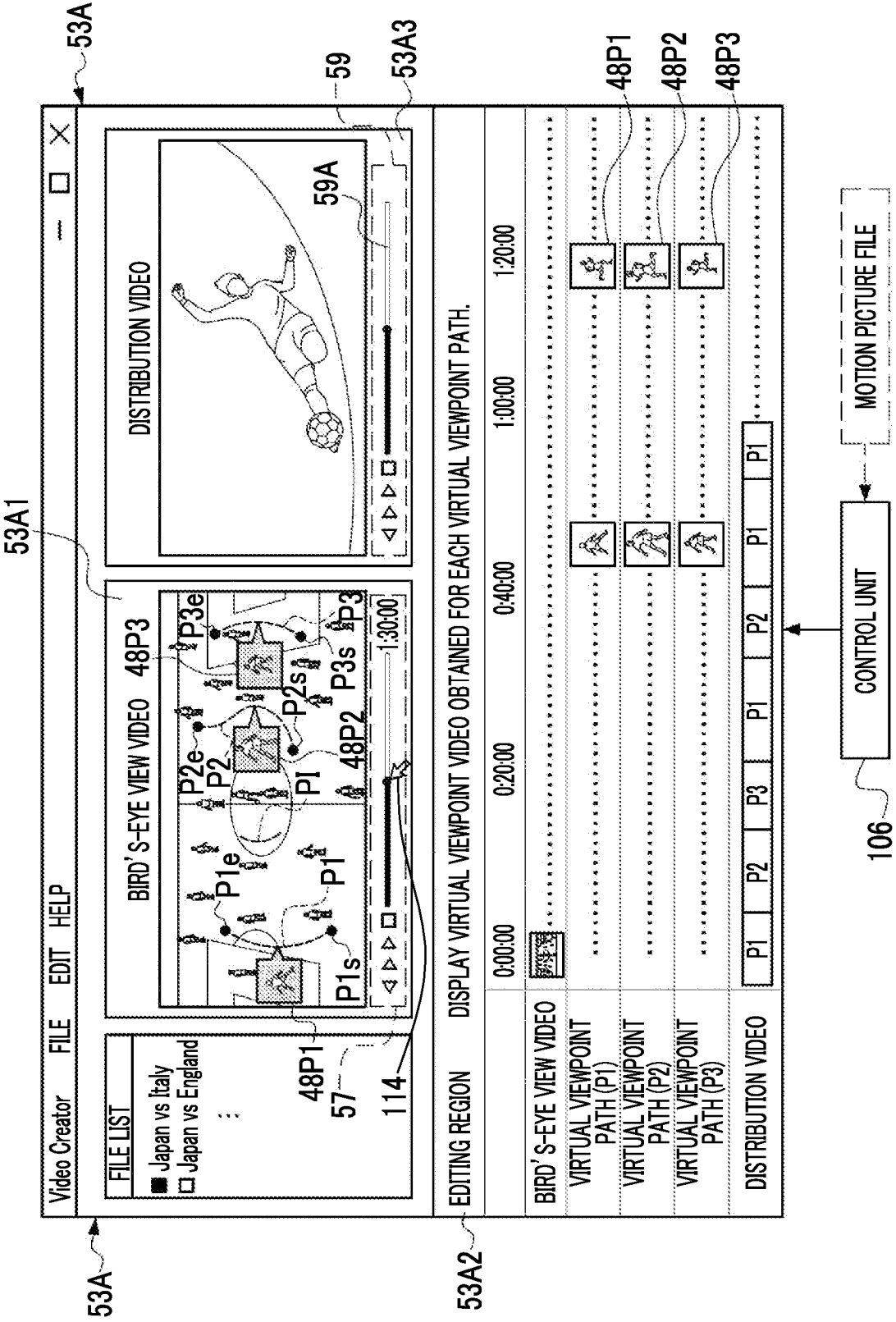
FIG. 16 is a conceptual diagram showing an example of a motion picture editing screen on which a distribution video is displayed.

As shown in FIG. 16 as an example, the control unit 106 performs the GUI control to display the distribution video in a distribution video region 53A3 on the basis of the motion picture file in the storage 60. In the example shown in FIG. 16, an operation panel 59 is provided in the distribution video region 53A3, similarly to the operation panel 57 in the reference region 53A1. The operation panel 57 is used for a video displayed in the reference region 53A1, whereas the operation panel 59 is used for a distribution video displayed in the distribution video region 53A3. The operation panel 59 includes a seek bar 59A or the like that is applied to the distribution video displayed in the distribution video region 53A3.

Next, an operation of the information processing system 10 will be described.

First, an example of a flow of a virtual viewpoint designation process executed by the CPU 58 of the information processing apparatus 12 will be described with reference to FIG. 17.

Figure 17:
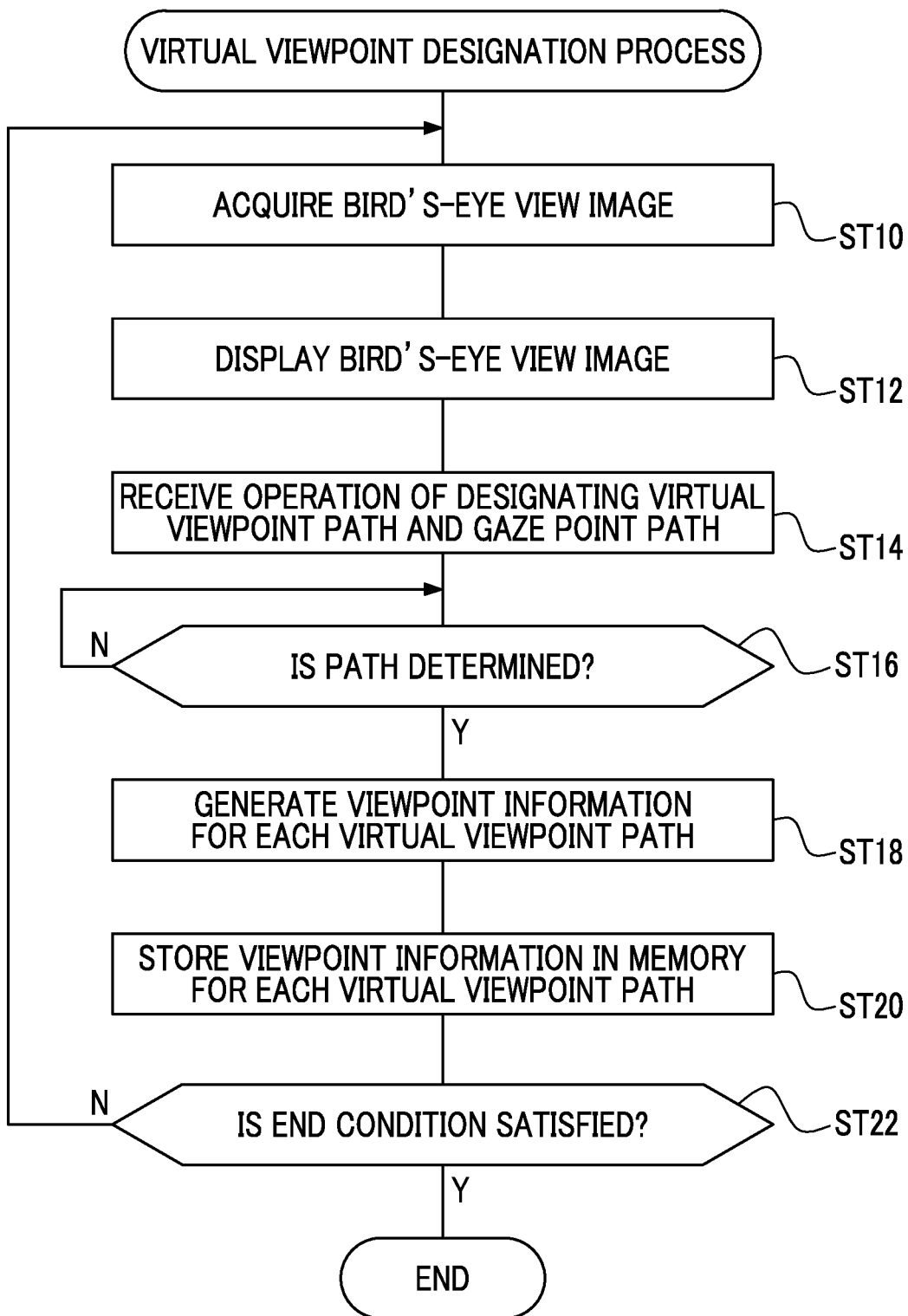
FIG. 17 is a flowchart showing an example of a flow of a virtual viewpoint designation process.

In the virtual viewpoint designation process shown in FIG. 17, in step ST10, the acquisition unit 102 acquires the bird's-eye view video 46A, and then the virtual viewpoint designation process proceeds to step ST12.

In step ST12, the control unit 106 displays the bird's-eye view video 46A acquired in step ST10 on the display 53, and then the virtual viewpoint designation process proceeds to step ST14.

In step ST14, the setting unit 108 receives an operation of designating the virtual viewpoint path P and the gaze point path PI from the user or the like, and then the virtual viewpoint designation process proceeds to step ST16.

In step ST16, the setting unit 108 determines whether or not the virtual viewpoint path P and the gaze point path PI are determined by turning on the enter key 116. In step ST16, in a case in which the virtual viewpoint path P and the gaze point path PI are not determined, a determination result is negative, and the determination in step ST16 is performed again. In a case in which the virtual viewpoint path P and the gaze point path PI are determined in step ST16, a determination result is positive, and the virtual viewpoint designation process proceeds to step ST18.

In step ST18, the setting unit 108 generates viewpoint information for each virtual viewpoint path P determined in step ST16, and then the virtual viewpoint designation process proceeds to step ST20.

In step ST20, the setting unit 108 stores the viewpoint information generated in step ST18 in the memory 62 for each virtual viewpoint path P, and then the virtual viewpoint designation process proceeds to step ST22.

In step ST22, the setting unit 108 determines whether or not a condition for ending the virtual viewpoint designation process (hereinafter, also referred to as a "virtual viewpoint designation process end condition") is satisfied. An example of the virtual viewpoint designation process end condition is a condition that an instruction for ending the virtual viewpoint designation process is given to the information processing apparatus 12. The instruction for ending the virtual viewpoint designation process is received by, for example, the reception device 52. In step ST22, in a case where the virtual viewpoint designation process end condition is not satisfied, a determination result is negative, and the virtual viewpoint designation process proceeds to step ST10. In step ST22, in a case in which the virtual viewpoint designation process end condition is satisfied, a determination result is positive, and the virtual viewpoint designation process is ended.

Next, an example of a flow of a virtual viewpoint video generation process executed by the CPU 58 of the information processing apparatus 12 will be described with reference to FIG. 18.

Figure 18:
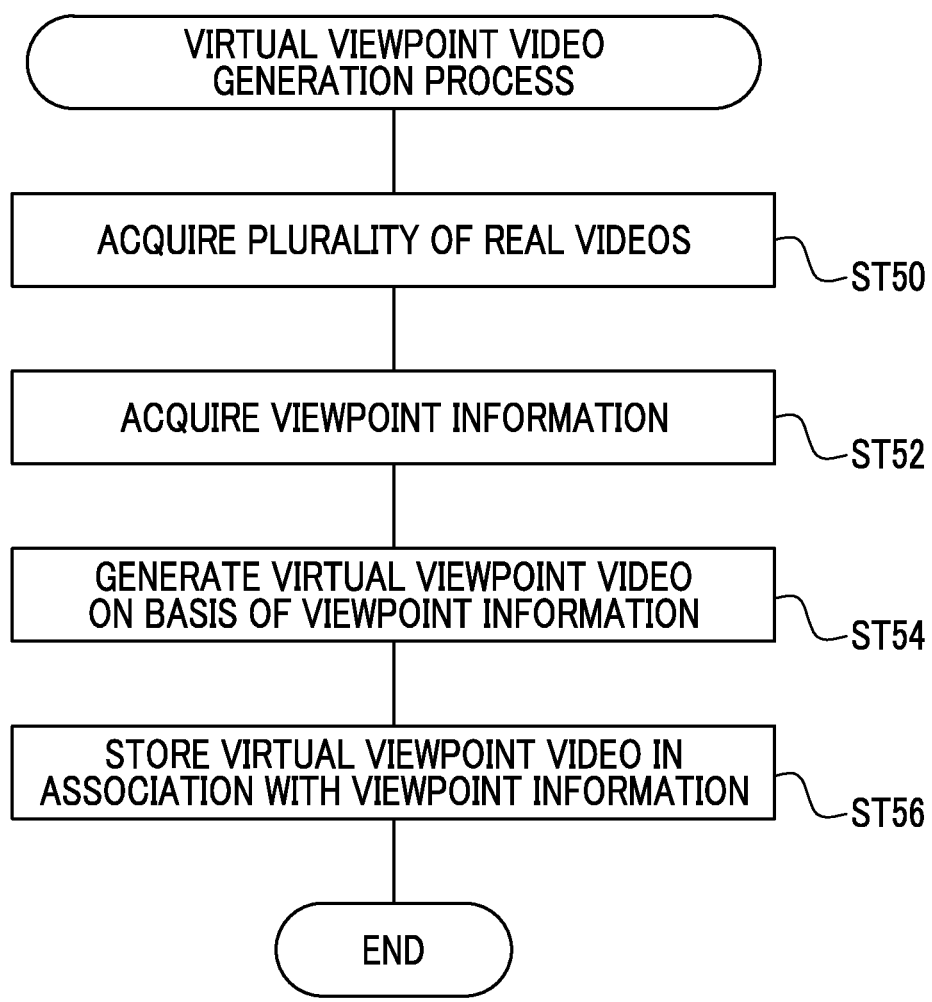
FIG. 18 is a flowchart showing an example of a flow of a virtual viewpoint video generation process.

In the virtual viewpoint video generation process shown in FIG. 18, first, in step ST50, the acquisition unit 102 acquires a plurality of real videos from the plurality of physical cameras, and then the virtual viewpoint video generation process proceeds to step ST52.

In step ST52, the execution unit 104 acquires viewpoint information for each virtual viewpoint path P from the memory 62, and then the virtual viewpoint video generation process proceeds to step ST54.

In step ST54, the execution unit 104 generates a virtual viewpoint video for each virtual viewpoint path P on the basis of the viewpoint information acquired in step ST52, and then the virtual viewpoint video generation process proceeds to step ST56.

In step ST56, the execution unit 104 stores the virtual viewpoint video generated for each virtual viewpoint path P in step ST54 in the storage 60 for each virtual viewpoint path P. The execution unit 104 adds the viewpoint information to each of the plurality of virtual viewpoint images configuring the virtual viewpoint video. After the process in step ST56 is executed, the virtual viewpoint video generation process is ended.

Next, an example of a flow of a thumbnail image display process executed by the CPU 58 of the information processing apparatus 12 will be described with reference to FIG. 19.

Figure 19:
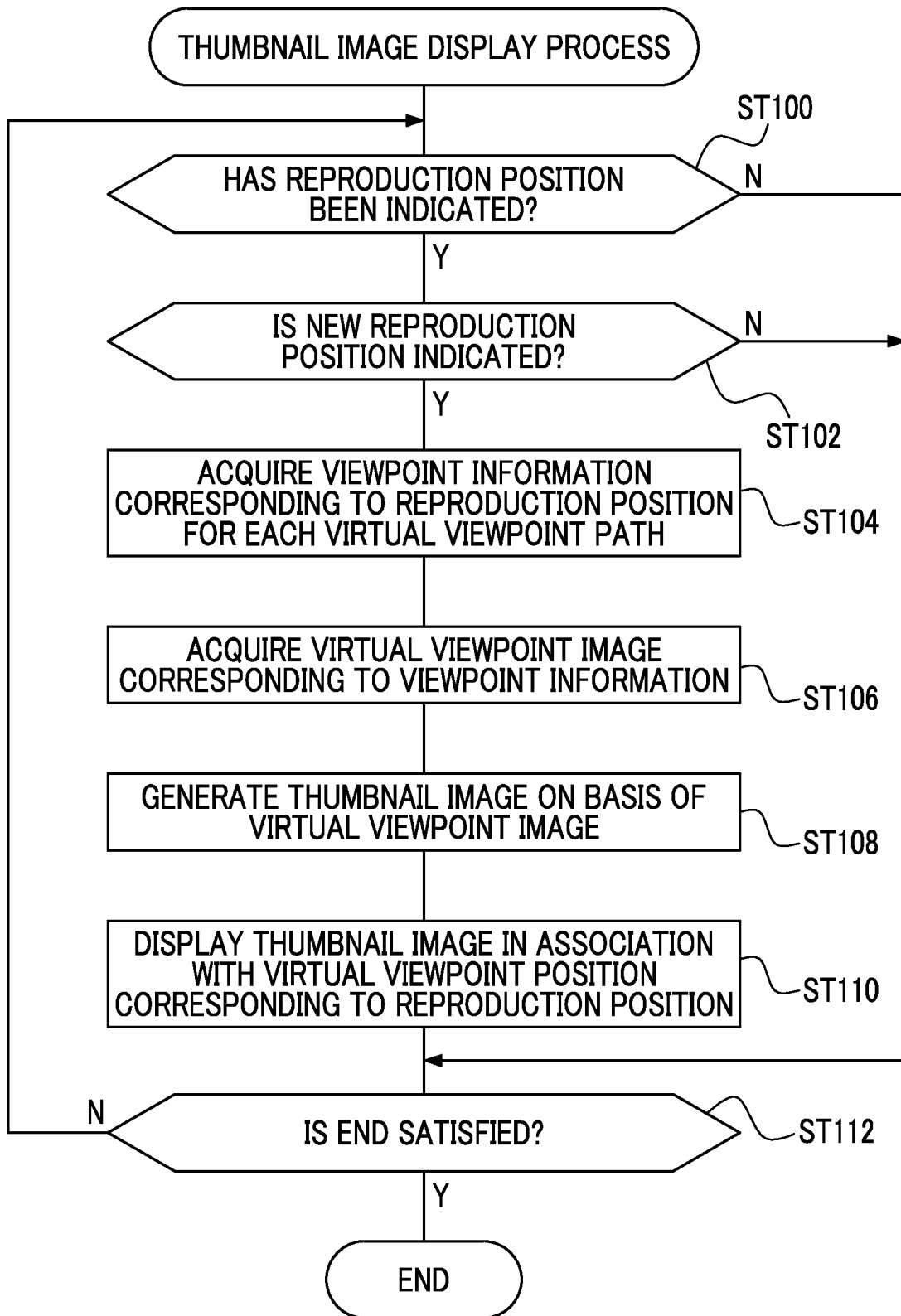
FIG. 19 is a flowchart showing an example of a flow of a thumbnail image display process.

In the thumbnail image display process shown in FIG. 19, first, in step ST100, the execution unit 104 determines whether or not a reproduction position of the virtual viewpoint video has been indicated through a click operation or the like on one point on the seek bar 57E or one point on the virtual viewpoint path P. In step ST100, in a case in which the reproduction position of the virtual viewpoint video has not been indicated, a determination result is negative, and the thumbnail image display process proceeds to step ST112. In step ST100, in a case where the reproduction position of the virtual viewpoint video has been indicated, a determination result is positive, and the thumbnail image display process proceeds to step ST102.

In step ST102, the execution unit 104 determines whether or not the reproduction position indicated in step ST100 is an indicated new reproduction position. In step ST102, in a case in which the reproduction position indicated in step ST100 is not an indicated new reproduction position, a determination result is negative, and the thumbnail image display process proceeds to step ST112. In step ST102, in a case where the reproduction position designated in step ST100 is a newly designated reproduction position, a determination result is positive, and the thumbnail image display process proceeds to step ST104.

In step ST104, the execution unit 104 acquires viewpoint information corresponding to the reproduction position indicated in step T100 from the memory 62 for each virtual viewpoint path P, and then the thumbnail image display process proceeds to step ST106.

In step ST106, the execution unit 104 acquires a virtual viewpoint image corresponding to the viewpoint information acquired in step ST104 from the storage 60 for each virtual viewpoint path P, and then the thumbnail image display process proceeds to step ST108.

In step ST108, the execution unit 104 generates a thumbnail image based on the virtual viewpoint image acquired in step ST106 for each virtual viewpoint path P, and then the thumbnail image display process proceeds to step ST110.

In step ST110, the control unit 106 displays the virtual viewpoint path P in the reference video display region 55, and displays a thumbnail image in association with a virtual viewpoint position corresponding to the reproduction position indicated in step ST100 among a plurality of virtual viewpoint positions included in the virtual viewpoint path P, and then the thumbnail image display process proceeds to step ST112.

In step ST112, the control unit 106 determines whether or not a condition for ending the thumbnail image display process (hereinafter, also referred to as a "thumbnail image display process end condition") is satisfied. An example of the thumbnail image display process end condition is a condition that an instruction for ending the thumbnail image display process is given to the information processing apparatus 12. The instruction for ending the thumbnail image display process is received by, for example, the reception device 52. In step ST112, in a case where the condition for ending the thumbnail image display process is not satisfied, a determination result is negative, and the thumbnail image display process proceeds to step ST100. In step ST112, in a case where the condition for ending the thumbnail image display process is satisfied, a determination result is positive, and the thumbnail image display process is ended.

Next, an example of a flow of an editing process executed by the CPU 58 of the information processing apparatus 12 will be described with reference to FIG. 20.

Figure 20:
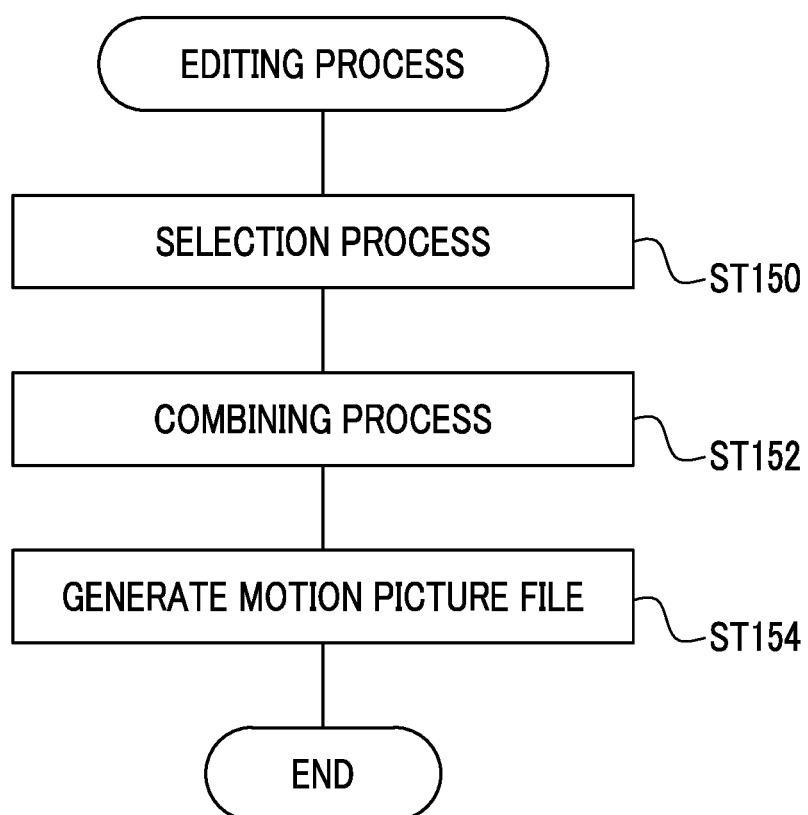
FIG. 20 is a flowchart showing an example of a flow of an editing process.

In the editing process shown in FIG. 20, first, in step ST150, the execution unit 104 executes a selection process. That is, the execution unit 104 selects a plurality of virtual viewpoint images corresponding to a plurality of thumbnail images cut out from the virtual viewpoint video-based thumbnail image sequence from among the plurality of virtual viewpoint videos in the storage 60 by performing a trimming operation on the virtual viewpoint video-based thumbnail image sequence. After the process in step ST150 is executed, the editing process proceeds to step ST152.

In step ST152, the execution unit 104 executes a combining process. That is, the execution unit 104 generates a distribution video by combining the plurality of virtual viewpoint images selected in step ST150 in a time series. After the process in step ST152 is executed, the editing process proceeds to step ST154.

In step ST154, the execution unit 104 generates a motion picture file on the basis of the distribution video generated in step ST152, and stores the generated motion picture file in the storage 60. After the process in step ST154 is executed, the editing process is ended. In a case where the motion picture file is stored in the storage 60 by executing the process in step ST154, the control unit 106 reads the motion picture file from the storage 60 and displays the distribution video in the distribution video region 53A3 on the basis of the read motion picture file.

As described above, the information processing apparatus 12 displays, on the display 53, the bird's-eye view video 46A, the plurality of virtual viewpoint paths P disposed in the bird's-eye view video 46A, the seek bar 57E indicating a reproduction position of a virtual viewpoint video, and a thumbnail image based on a virtual viewpoint image viewed from a virtual viewpoint corresponding to each reproduction position of the virtual viewpoint path P among a plurality of virtual viewpoint images configuring the virtual viewpoint video. Therefore, according to the present configuration, thumbnail images at the same reproduction position in the plurality of virtual viewpoint paths P can be compared.

There is no limitation to the configuration in which the bird's-eye view video 46A, the plurality of virtual viewpoint paths P disposed in the bird's-eye view video 46A, the seek bar 57E indicating a reproduction position of a virtual viewpoint video, and a thumbnail image based on a virtual viewpoint image viewed from a virtual viewpoint corresponding to each reproduction position of the virtual viewpoint path P among a plurality of virtual viewpoint images configuring the virtual viewpoint video are displayed on the display 53. Configurations other than this configuration may be deleted or added as necessary.

In the information processing apparatus 12, a plurality of virtual viewpoint paths P are disposed at indicated positions in the bird's-eye view video 46A. Therefore, according to the present configuration, the plurality of virtual viewpoint paths P can be disposed at positions intended by the user. The technique of the present disclosure is not limited to this, and the plurality of virtual viewpoint paths P do not have to be disposed at indicated positions. For example, there may be a configuration in which at least one virtual viewpoint path P is disposed at an indicated position, and the remaining virtual viewpoint paths P are not disposed at indicated positions.

In the information processing apparatus 12, a reproduction position indicated by the seek bar 57E is changed in response to a given instruction. Therefore, according to the present configuration, a user can compare the thumbnail images of the plurality of virtual viewpoint paths P while changing the reproduction position.

In the information processing apparatus 12, in a case where the reproduction position is changed, a thumbnail image corresponding to the reproduction position after being changed is displayed on the display 53. Therefore, according to the present configuration, even in a case where the reproduction position is changed, the user can ascertain a positional relationship between the reproduction position and the thumbnail image.

In the information processing apparatus 12, in a case where the reproduction position is changed, the thumbnail image corresponding to the reproduction position after being changed is displayed at a position different from that of the thumbnail image corresponding to the reproduction position before being changed. Therefore, according to the present configuration, the user can visually recognize a positional relationship between the thumbnail images before and after the reproduction position is changed.

In the information processing apparatus 12, only one thumbnail image is displayed for each of the plurality of virtual viewpoint paths P. Therefore, according to the present configuration, it is possible to easily ascertain which thumbnail image corresponds to which virtual viewpoint path P compared with a case where a plurality of thumbnail images are displayed for each of the plurality of virtual viewpoint paths P.

In the information processing apparatus 12, the reproduction position is changed in response to an operation of moving the thumbnail image on the bird's-eye view video 46A. Therefore, according to the present configuration, a correspondence relationship between the thumbnail image and the reproduction position can be maintained even in a case where the thumbnail image is moved.

In the information processing apparatus 12, at least one of the position, the length, or the shape of the virtual viewpoint path P is changed in response to a given instruction. Therefore, according to the present configuration, it is possible to create the virtual viewpoint path P that reflects the intention of the user.

In the information processing apparatus 12, the seek bar 57E is displayed in different aspects before and after the reproduction position. Therefore, according to the present configuration, the reproduction position on the seek bar 57E can be visually ascertained. Although a form example in which the seek bar 57E is displayed in different aspects before and after the reproduction position has been described here, the technique of the present disclosure is not limited to this. For example, the control unit 106 may perform the GUI control to display the virtual viewpoint path P in different aspects before and after the reproduction position (for example, the virtual viewpoint position with which the thumbnail image is associated). For example, an area before the reproduction position is indicated by a thick line, and a region after the reproduction position is indicated by a thin line. Consequently, the reproduction position in the virtual viewpoint path P can be visually ascertained. The control unit 106 may display the seek bar 57E and the virtual viewpoint path P in different aspects before and after the reproduction position. Consequently, the reproduction position in the seek bar 57E and the virtual viewpoint path P can be visually ascertained.

The information processing apparatus 12 generates the gaze point path PI representing a gaze point at which each of the virtual viewpoints included in each of the plurality of virtual viewpoint paths P gazes in response to a given instruction. Therefore, according to the present configuration, it is possible to set a common gaze point for the plurality of virtual viewpoint paths P at a location intended by the user.

In the information processing apparatus 12, the plurality of virtual viewpoint paths P and the thumbnail images are displayed in one bird's-eye view video 46A. Therefore, according to the present configuration, it is possible to ascertain a positional relationship between the plurality of virtual viewpoint paths P and the thumbnail images in the bird's-eye view video 46A.

In the information processing apparatus 12, for each of the plurality of virtual viewpoint paths P, a thumbnail image corresponding to a virtual viewpoint is displayed along the virtual viewpoint path P. Therefore, according to the present configuration, it is possible to visually ascertain which virtual position of the plurality of virtual viewpoint paths P the thumbnail image corresponds to.

In the above embodiment, a form example has been described in which a plurality of virtual viewpoint images corresponding to a plurality of thumbnail images cut out from the virtual viewpoint video-based thumbnail image sequence by performing a trimming operation on the virtual viewpoint video-based thumbnail image sequence are combined through a combining process, but the technique of the present disclosure is not limited to this. For example, the CPU 58 may cut out a part of each of the plurality of virtual viewpoint paths P and combine the parts in response to a given instruction, and generate a virtual viewpoint video on the basis of a path obtained through the combination.

Figure 21:
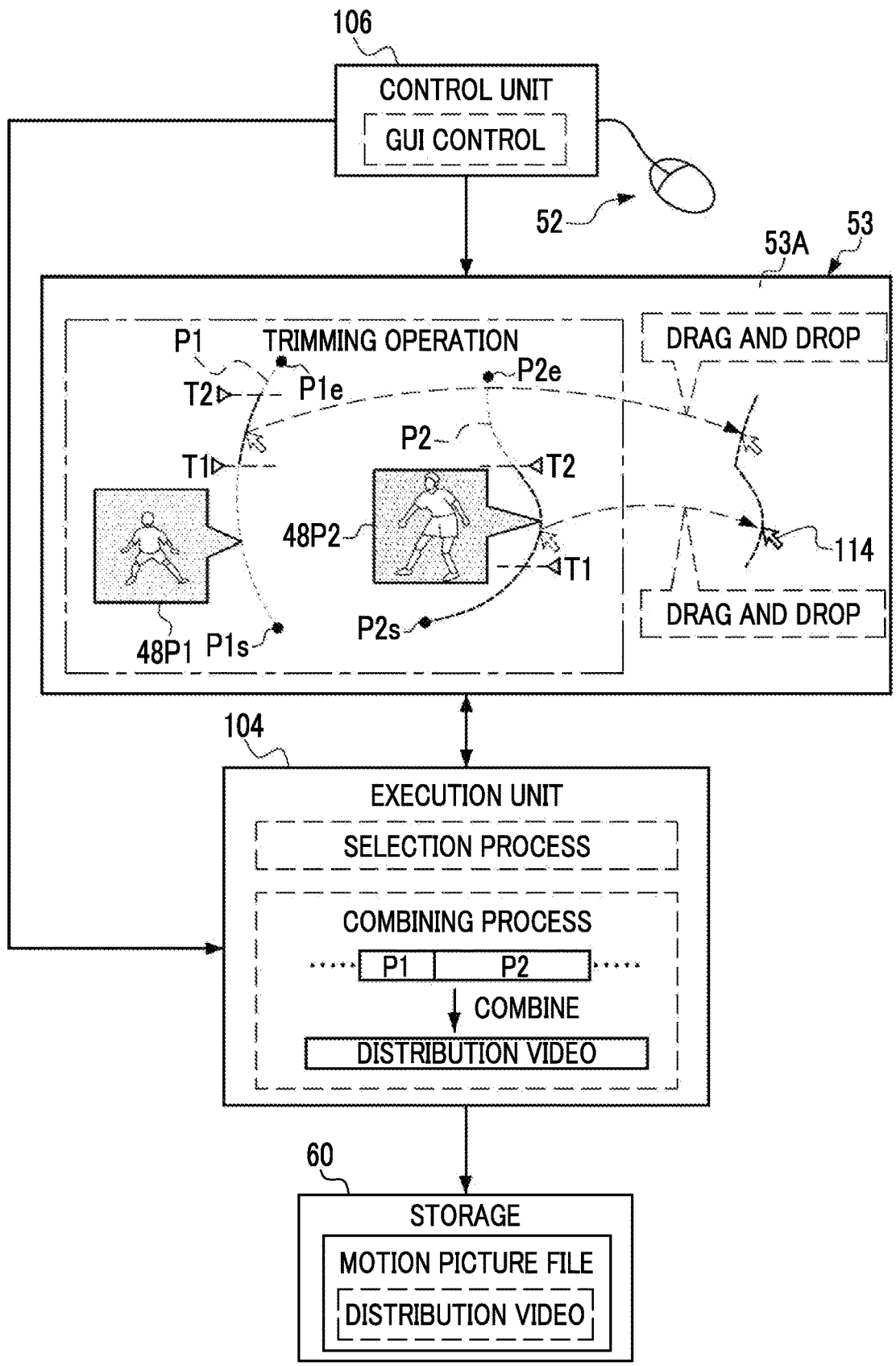
FIG. 21 is a conceptual diagram used to describe modification examples of the selection process and the combining process.

In this case, for example, as shown in FIG. 21, the control unit 106 displays the trim markers T1 and T2 described in the above embodiment in response to the user's trimming operation on the virtual viewpoint path P1 and the virtual viewpoint path P2. The user can extract portions intended by the user by dragging and dropping portions of the virtual viewpoint path P1 and the virtual viewpoint path P2 defined by the trim markers T1 and T2, for example, with respect to a distribution video creation region.

The execution unit 104 executes a selection process in response to the trimming operation and executes a combining process in response to the drag and drop operation. In the example shown in FIG. 21, the selection process is a process in which a plurality of virtual viewpoint images corresponding to a fragment of the virtual viewpoint path P1 and a fragment of the virtual viewpoint path P2 cut out from the virtual viewpoint path P1 and the virtual viewpoint path P2 by performing a trimming operation on the virtual viewpoint path P1 and the virtual viewpoint path P2 are selected from among a plurality of virtual viewpoint videos in the storage 60. In the example shown in FIG. 21, the combining process is a process of generating a distribution video by combining the plurality of virtual viewpoint images selected through the selection process in a time series. The selection process and the combining process shown in FIG. 21 are an example of a "selection combining process" according to the technique of the present disclosure. According to the configuration example shown in FIG. 21, the distribution video can be generated by using the virtual viewpoint path intended by the user.

Also in this case, the virtual viewpoint path P1 and the virtual viewpoint path P2 may be displayed in different aspects. For example, the virtual viewpoint path P1 and the virtual viewpoint path P2 are displayed in different colors. As described above, even in a case where the fragment of the virtual viewpoint path P1 and the fragment of the virtual viewpoint path P2 are combined, it is possible to visually ascertain a path from which each fragment is cut out.

Figure 22:
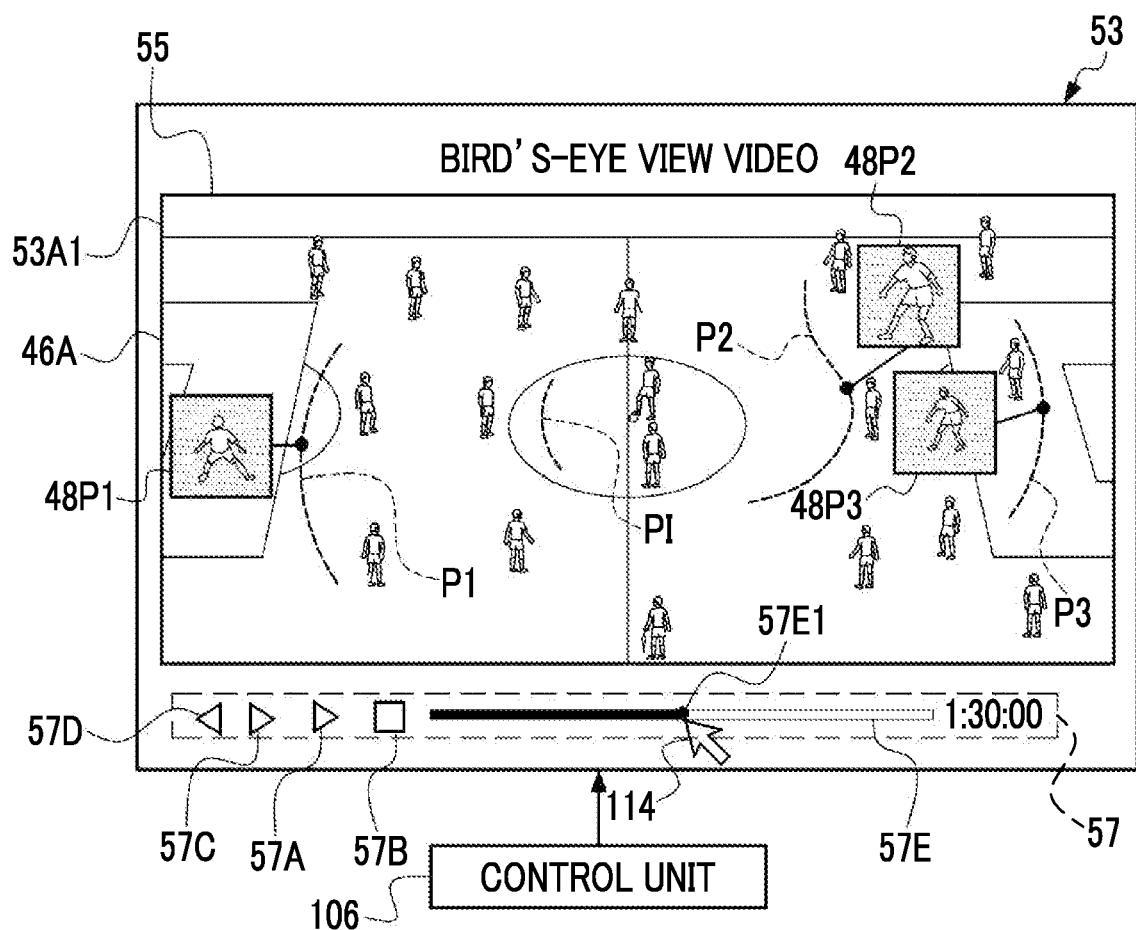
FIG. 22 is a conceptual diagram showing a first modification example of association between a virtual viewpoint path and a thumbnail image.

In the above embodiment, a form example has been described in which, among a plurality of virtual viewpoint positions included in the virtual viewpoint path P, the thumbnail image 48P1 is displayed to be popped up in a balloon format from a virtual viewpoint position included in viewpoint information acquired from the memory 62, the technique of the present disclosure is not limited thereto. For example, as shown in FIG. 22, a positional relationship between a virtual viewpoint position included in the virtual viewpoint path P and a thumbnail image may be clarified by connecting the virtual viewpoint position included in the viewpoint information acquired from the memory 62 and the thumbnail image via a line among a plurality of virtual viewpoint positions included in the virtual viewpoint path P, and attaching a connection mark (a circular mark in the example shown in FIG. 22) to the connected portion in the virtual viewpoint path P. In the example shown in FIG. 22, the line connecting the virtual viewpoint position and the thumbnail image is a straight line, but the line connecting the virtual viewpoint position and the thumbnail image may be a curved line.

In the example shown in FIG. 22, the thumbnail image 48P2 is disposed not on the virtual viewpoint path P1 side but on the virtual viewpoint path P3 side. Therefore, even in a case where the thumbnail image 48P2 is connected to the virtual viewpoint path P2 via a line and the thumbnail image 48P3 is connected to the virtual viewpoint path P3 via a line, it may be erroneously recognized that the thumbnail image 48P2 corresponds to the virtual viewpoint path P3 and the thumbnail image 48P3 corresponds to the virtual viewpoint path P2 depending on a state of the bird's-eye view video 46A and/or a user's viewpoint.

Therefore, the control unit 106 may display the two thumbnail images 48P2 for the two adjacent virtual viewpoint paths P according to relative positions of the two adjacent virtual viewpoint paths P (hereinafter, also simply referred to as "relative positions"). In this case, for example, the control unit 106 may determine a display position of a thumbnail image for each virtual viewpoint path P on the basis of the number of virtual viewpoint paths P, a distance between the adjacent virtual viewpoint paths P, a section in which a thumbnail image corresponding to one of two adjacent virtual viewpoint paths P and a thumbnail image corresponding to the other virtual viewpoint path run in parallel, an orientation of each virtual viewpoint path P, and a relative position determined according to a size of the thumbnail image or the like, and display the thumbnail image at the determined display position.

Figure 23:
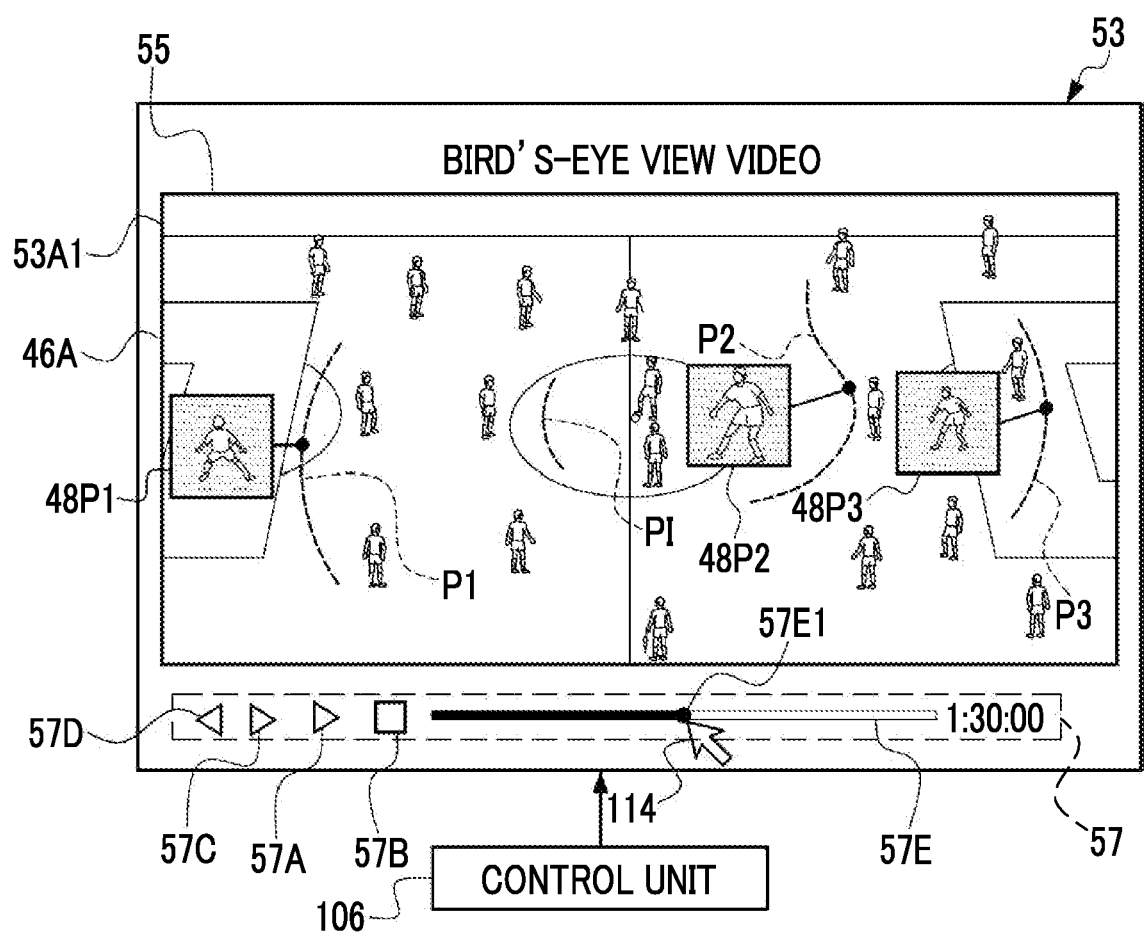
FIG. 23 is a conceptual diagram showing a second modification example of the association between the virtual viewpoint path and the thumbnail image.

For example, as shown in FIG. 22, in a case where, in a section in which the thumbnail images 48P2 and 48P3 run in parallel between the virtual viewpoint path P2 and the virtual viewpoint path P3, the thumbnail image 48P2 is located on the virtual viewpoint path P3 side, the thumbnail image 48P3 is located on the virtual viewpoint path P2 side such that thumbnail image 48P2 and the thumbnail image 48P3 interfere with each other, as shown in FIG. 23 as an example, the control unit 106 displays the thumbnail image 48P2 on the virtual viewpoint path P1 side. Consequently, even in a case where the thumbnail image is associated with each of the plurality of virtual viewpoint paths, it is possible to ascertain which thumbnail image corresponds to any of the virtual viewpoint paths.

In the above embodiment, a form example in which a plurality of virtual viewpoint paths P and thumbnail images are displayed in one bird's-eye view video 46A has been described, but the technique of the present disclosure is not limited thereto. For example, the control unit 106 may display the virtual viewpoint path P and the thumbnail image in each of a plurality of standard images showing at least a part of the imaging region.

Figure 24A:
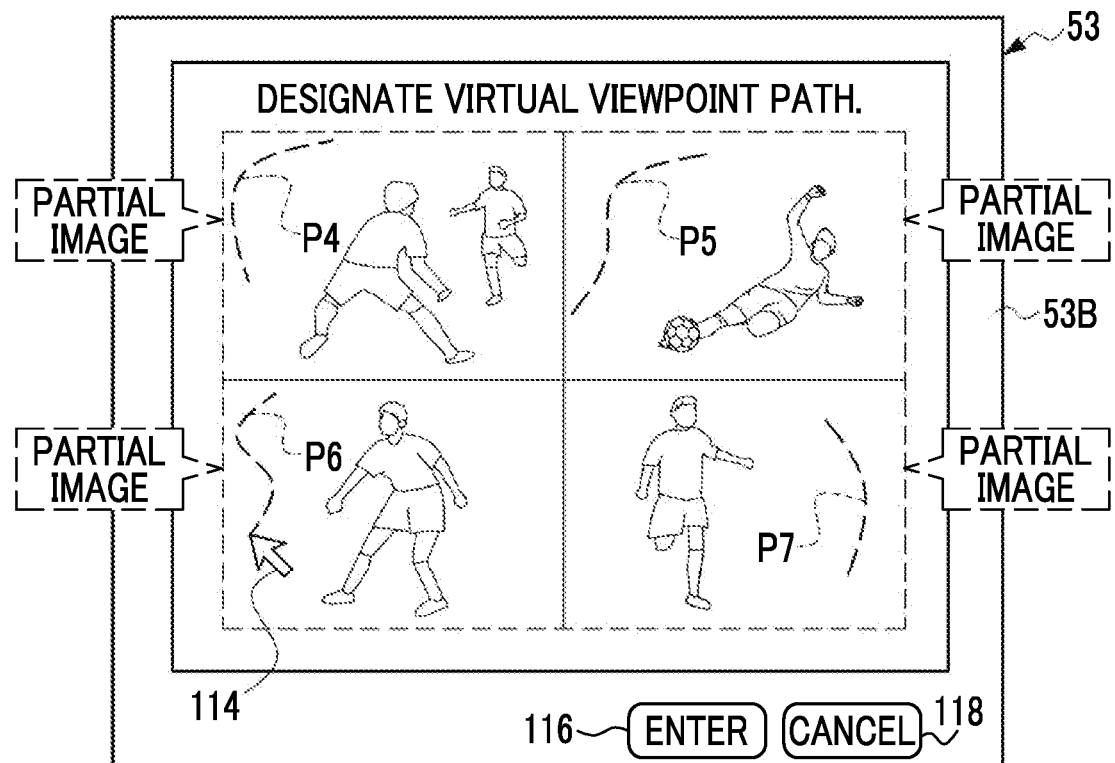
FIG. 24A is a conceptual diagram used to describe a first example of a method of setting a virtual viewpoint path and a gaze point path.
Figure 24A:
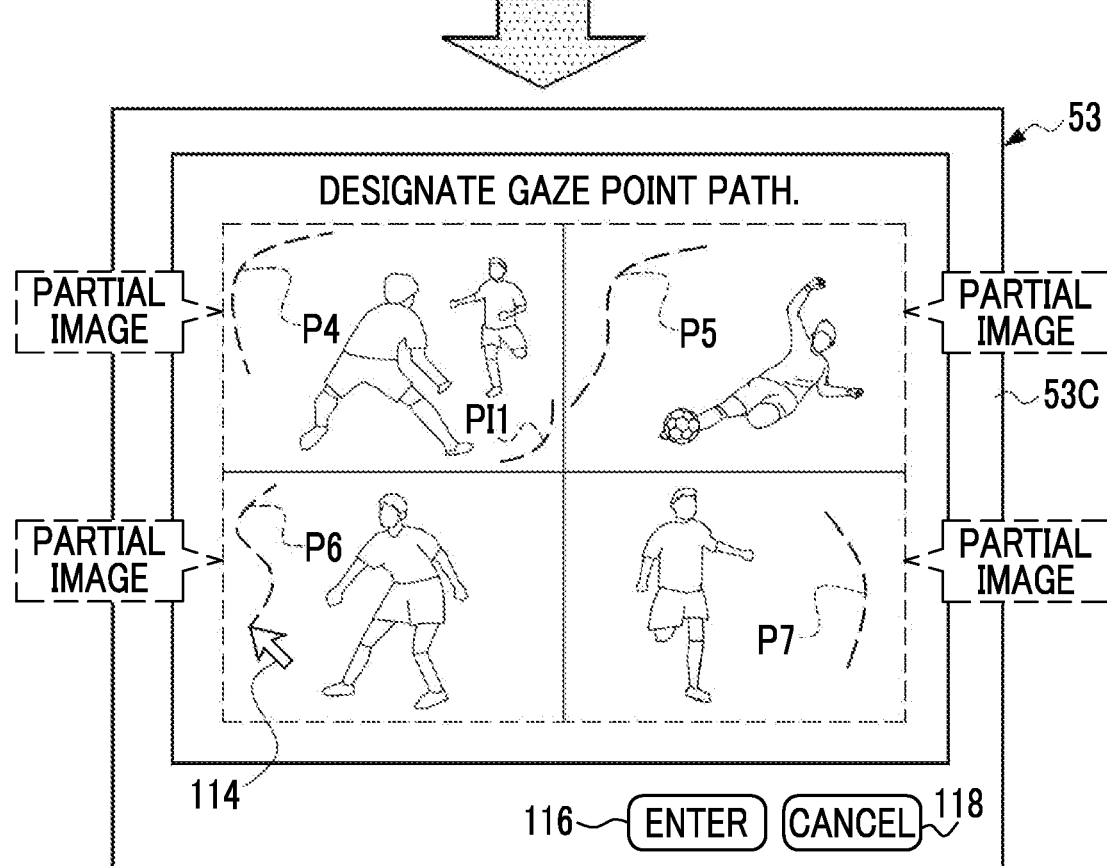
Figure 24B:
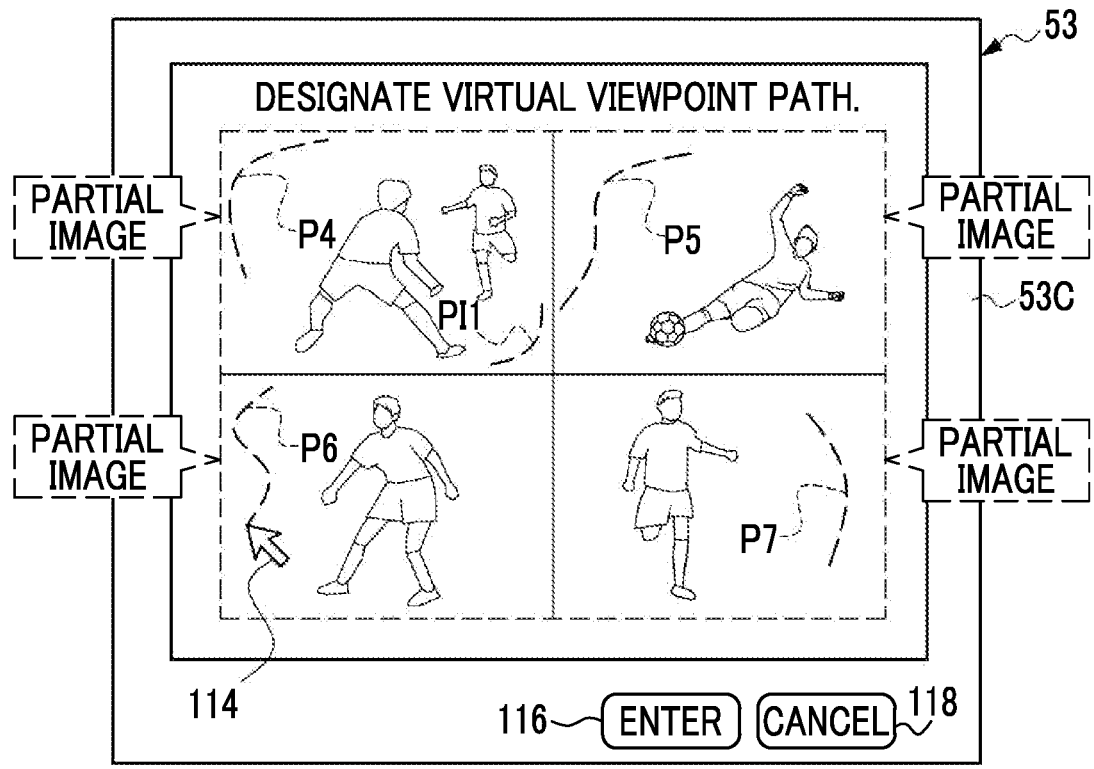
FIG. 24B is a screen view showing an example of a screen on which a thumbnail image generated on the basis of the virtual viewpoint path and the gaze point path shown in FIG. 24A is displayed.
Figure 24B:
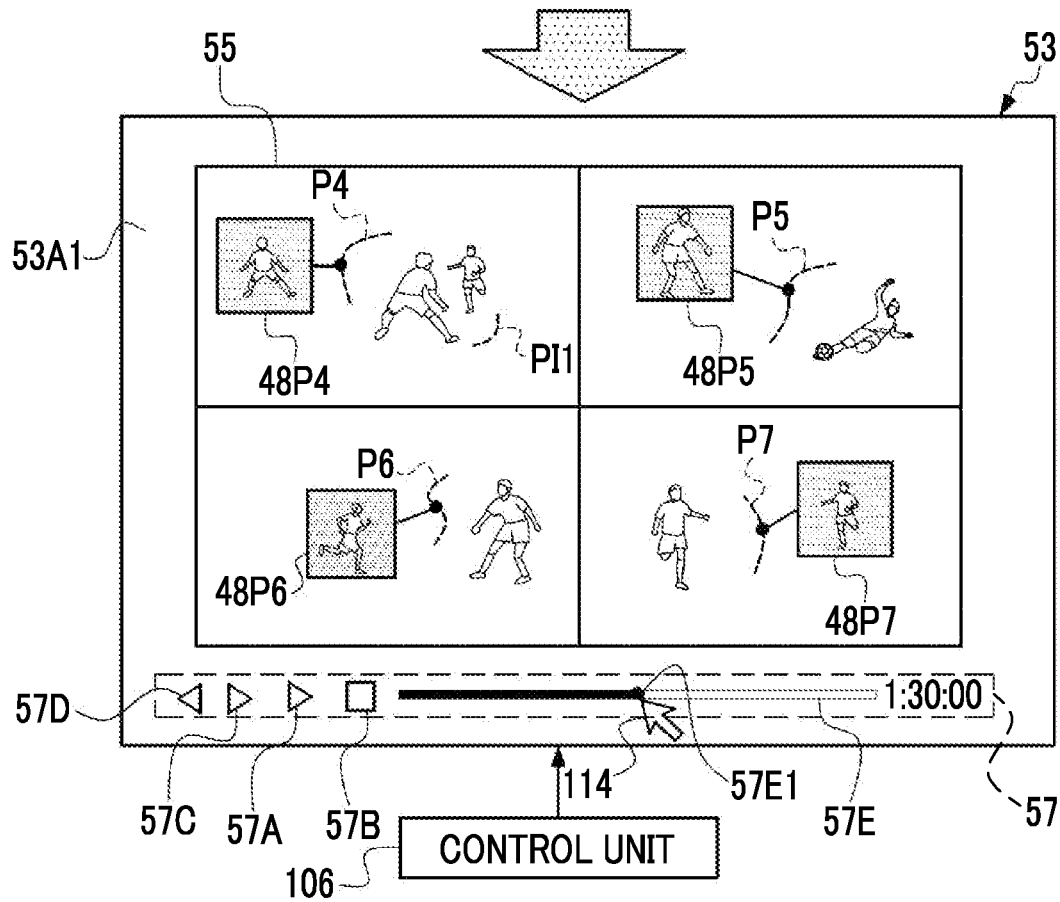

For example, as shown in FIG. 24A, a plurality of partial images showing different portions (for example, different portions on the soccer field 24) in the imaging region are displayed on the virtual viewpoint designation screen 53B. In the example shown in FIG. 24A, different partial images are respectively displayed on four divided screens obtained by dividing the virtual viewpoint designation screen 53B into four parts. The four partial images displayed on the four divided screens are an example of "a plurality of standard images" according to the technique of the present disclosure. The setting unit 108 sets a virtual viewpoint path on the partial image in each divided screen in response to a given instruction. The set virtual viewpoint path is displayed on the partial image by the control unit 106. Similarly to the above embodiment, the control unit 106 displays a thumbnail image corresponding to the virtual viewpoint path, as shown in FIG. 24B as an example. In the example shown in FIG. 24B, the partial image is displayed in the reference video display region 55. However, the present disclosure is not limited to this, and the bird's-eye view video 46A may be displayed in the reference video display region 55 in the same manner as in the above embodiment.

In the example shown in FIG. 24A, a virtual viewpoint path P4 is set by the setting unit 108 on the partial image displayed on the upper left in front view of the virtual viewpoint designation screen 53B. The virtual viewpoint path P4 set by the setting unit 108 is displayed by the control unit 106 in the reference video display region 55 together with a thumbnail image 48P4 corresponding to the virtual viewpoint path P4, as shown in FIG. 24B as an example.

In the example shown in FIG. 24A, a virtual viewpoint path P5 is set by the setting unit 108 on the partial image displayed on the upper right in front view of the virtual viewpoint designation screen 53B. The virtual viewpoint path P5 set by the setting unit 108 is displayed by the control unit 106 in the reference video display region 55 together with a thumbnail image 48P5 corresponding to the virtual viewpoint path P5, as shown in FIG. 24B as an example.

In the example shown in FIG. 24A, a virtual viewpoint path P6 is set by the setting unit 108 on the partial image displayed on the lower left in front view of the virtual viewpoint designation screen 53B. The virtual viewpoint path P6 set by the setting unit 108 is displayed by the control unit 106 in the reference video display region 55 together with a thumbnail image 48P6 corresponding to the virtual viewpoint path P6, as shown in FIG. 24B as an example.

In the example shown in FIG. 24A, a virtual viewpoint path P7 is set by the setting unit 108 on the partial image displayed on the lower right in front view of the virtual viewpoint designation screen 53B. The virtual viewpoint path P7 set by the setting unit 108 is displayed by the control unit 106 in the reference video display region 55 together with a thumbnail image 48P7 corresponding to the virtual viewpoint path P7, as shown in FIG. 24B as an example.

Figure 24C:
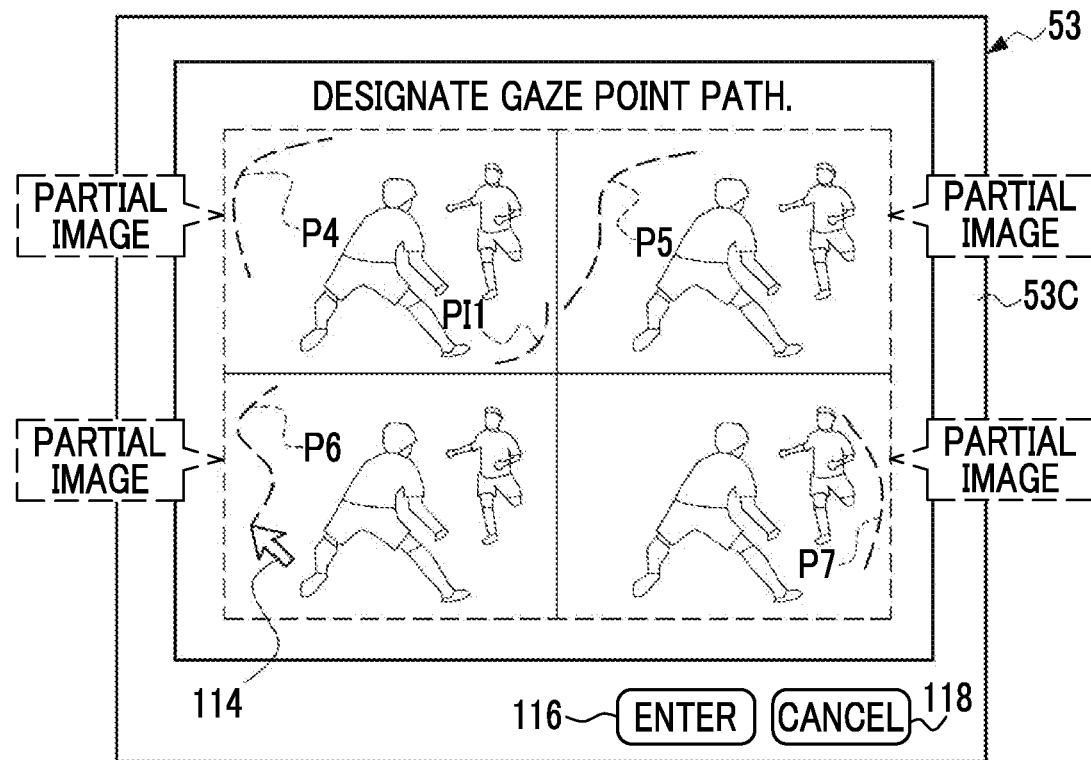
FIG. 24C is a screen view showing a modification example of a screen on which a thumbnail image generated on the basis of the virtual viewpoint path and the gaze point path shown in FIG. 24B is displayed.
Figure 24C:
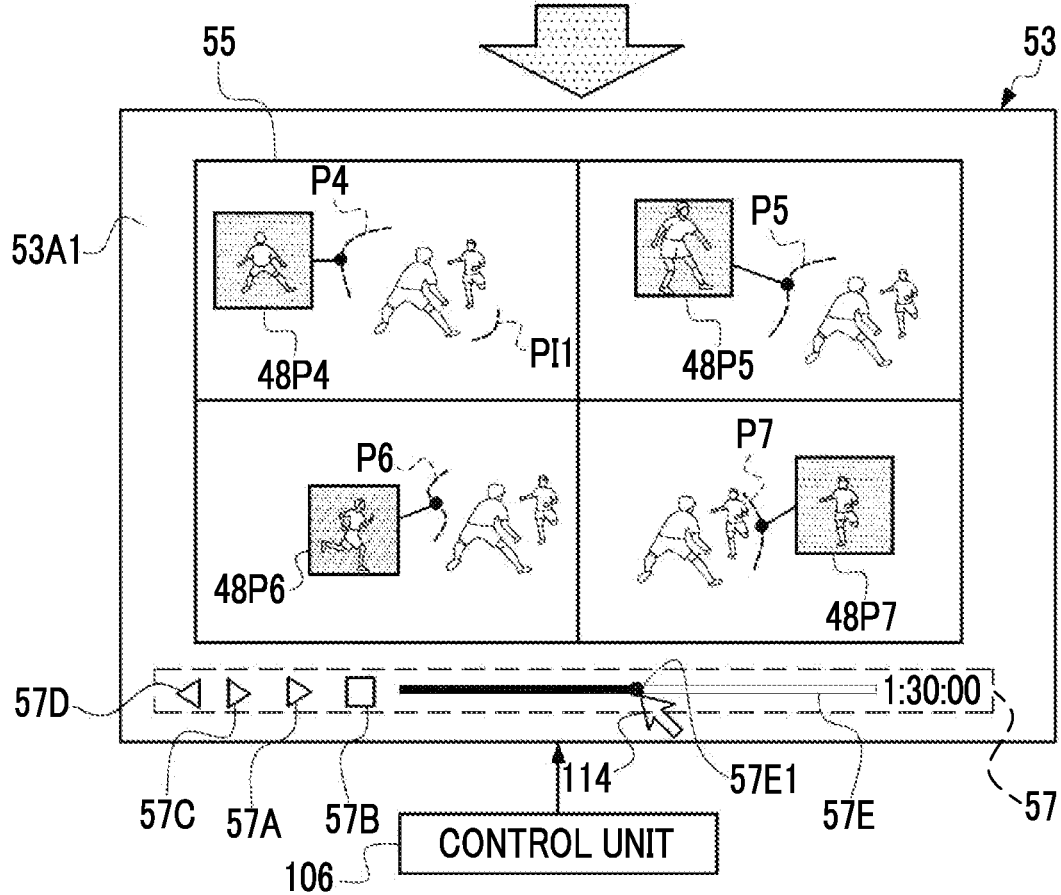

As described above, by superimposing and displaying the virtual viewpoint path P and the thumbnail image on each of the plurality of partial images, it is possible to visually ascertain the virtual viewpoint path P and the thumbnail image associated with the partial image. Although a plurality of partial images are exemplified here, this is only an example, and at least one of the plurality of partial images may be the bird's-eye view video 46A. In the examples shown in FIGS. 24A and 24B, the four partial images displayed on the four divided screens are different images, but some of the partial images may be the same image, or all of the partial images may be the same image are shown in FIG. 24C as an example. The images (the bird's-eye view video 46A (refer to FIGS. 12, 14, 16, 22, and 23), the partial images, the virtual viewpoint path P, the gaze point path IP1, and/or gaze point paths PI2, PI3, and PI4 (refer to FIG. 25)) displayed in the reference video display region 55 may be displayed to be reduced by the control unit 106 according to a reduction display instruction (for example, a pinch-in operation) using the touch panel, a reduction display instruction using the mouse, and/or a reduction display instruction using the keyboard, or may be displayed to be enlarged by the control unit 106 according to an enlargement display instruction using the touch panel (for example, a pinch-out operation), an enlargement display instruction using the mouse, and/or an enlargement display instruction using the keyboard.

As shown in FIG. 24A as an example, the gaze point path PI may be set by the setting unit 108 for one of the four partial images. In the example shown in FIG. 24A, a gaze point path PI1 is set by the setting unit 108 on the partial image displayed on the upper left in front view of the virtual viewpoint designation screen 53B. The gaze point path PI1 set by the setting unit 108 is displayed by the control unit 106 in the reference video display region 55 as shown in FIG. 24B as an example.

The gaze point path PI1 set on the partial image displayed on the upper left in front view of the virtual viewpoint designation screen 53B is also applied to the virtual viewpoint paths P5, P6, and P7 set on the other partial images. That is, line-of-sight directions of the virtual viewpoint paths P4, P5, P6, and P7 are determined according to each virtual viewpoint position included in the virtual viewpoint paths P4, P5, P6, and P7 and gaze point path PI1 set on the partial image displayed on the upper left in front view.

Figure 25:
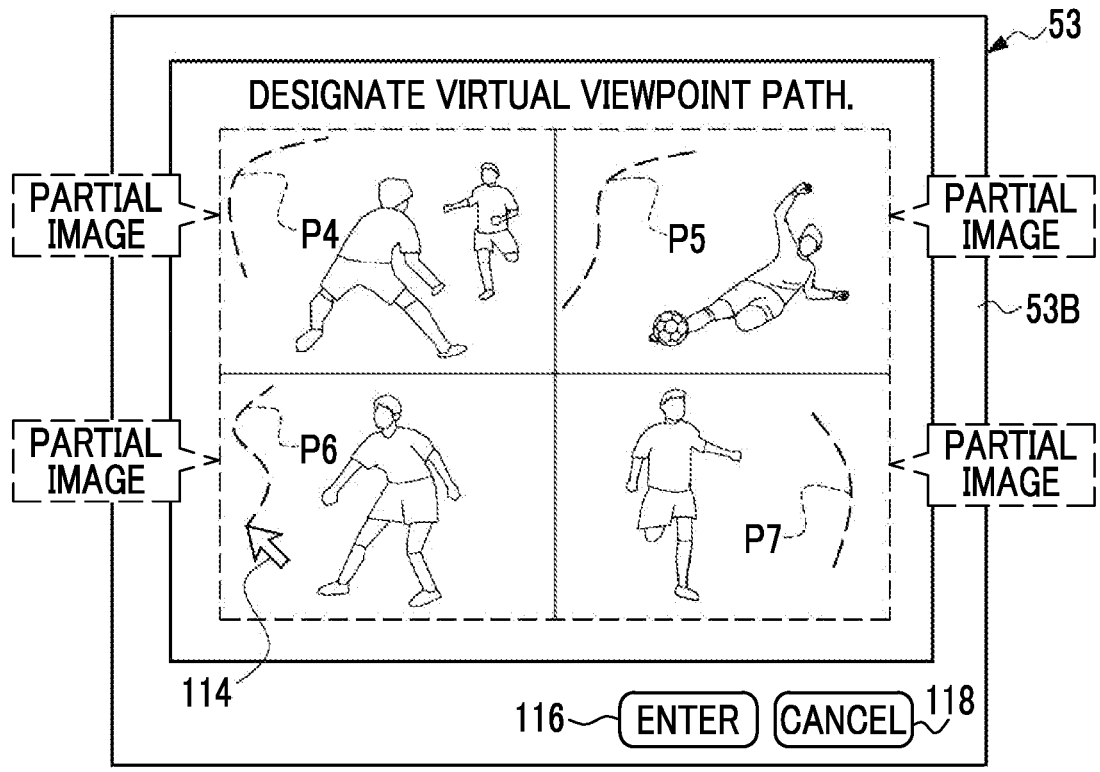
FIG. 25 is a conceptual diagram used to describe a second example of a method of setting a virtual viewpoint path and a gaze point path.
Figure 25:
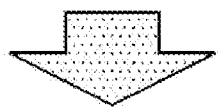
Figure 25:
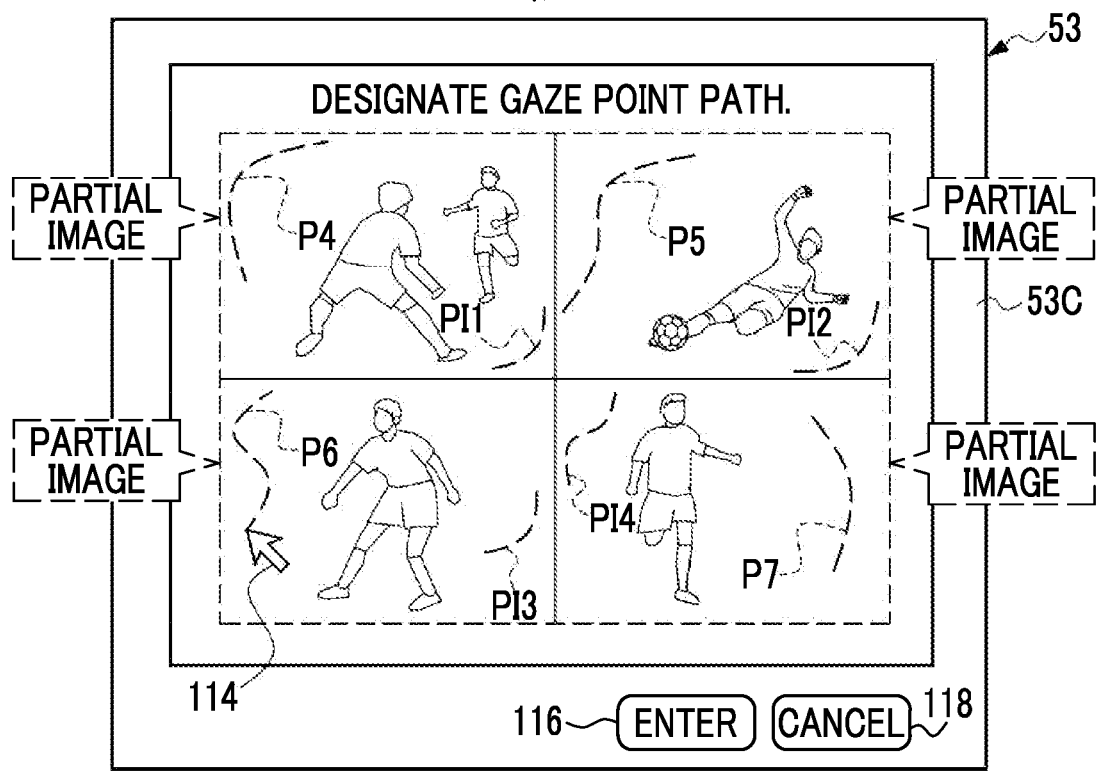

As shown in FIG. 25 as an example, the setting unit 108 may dispose the gaze point paths PI1, PI2, PI3, and PI4 in a standard image in response to a given instruction. Here, the standard image refers to four partial images. In the example shown in FIG. 25, the gaze point path PI1 is applied to the virtual viewpoint path P4, the gaze point path PI2 is applied to the virtual viewpoint path P5, the gaze point path PI3 is applied to the virtual viewpoint path P6, and the gaze point path PI4 is applied to the virtual viewpoint path P7.

In the example shown in FIG. 25, four partial images are shown as an example of the standard image, but this is only an example, and the bird's-eye view video 46A may be applied as a standard image in the same manner as in the embodiment, or the bird's-eye view video 46A and the partial image may be used in combination. As described above, since a plurality of gaze point paths are disposed in the standard image in response to a given instruction, the user can have a larger number of options of determining a line-of-sight direction compared with a case where only one gaze point path is disposed.

The CPU 58 may select one thumbnail image from a plurality of thumbnail images corresponding to the same reproduction position in response to a given instruction, set a gaze point corresponding to the selected one thumbnail image as a standard gaze point, and generate a thumbnail image based on a virtual viewpoint image showing an aspect of a case of gazing at the standard gaze point from the virtual viewpoint path P corresponding to the other non-selected thumbnail images that are other thumbnail images that are not selected. Hereinafter, a specific description will be made with reference to an example shown in FIG. 25.

As shown in FIG. 25 as an example, in a case where the virtual viewpoint paths P4, P5, P6, and P7 are set by the setting unit 108 on the virtual viewpoint designation screen 53B, and the gaze point paths PI1, PI2, PI3, and PI4 are determined by the setting unit 108 on the gaze point designation screen 53C, the control unit 106 displays the virtual viewpoint paths P4, P5, P6, and P7 in the reference video display region 55, and displays thumbnail images in the reference video display region 55 in association with the virtual viewpoint paths P4, P5, P6, and P7. The gaze point paths PI1, PI2, PI3, and PI4 may or may not be displayed in the reference video display region 55.

The thumbnail image displayed corresponding to the virtual viewpoint path P4, the thumbnail image displayed corresponding to the virtual viewpoint path P5, the thumbnail image displayed corresponding to the virtual viewpoint path P6, and the thumbnail image displayed corresponding to the virtual viewpoint path P7 are thumbnail images corresponding to the same reproduction position. In a case where any one of these thumbnail images is selected according to an instruction received by the reception device 52, a gaze point path corresponding to the selected thumbnail image is set by the setting unit 108 as a standard gaze point path. For example, in a case where the thumbnail image displayed corresponding to the virtual viewpoint path P4 is selected, the gaze point path PI1 is set by the setting unit 108 as a standard gaze point path. In this case, the execution unit 104 generates a thumbnail image based on a virtual viewpoint image showing an aspect of a case of gazing at the gaze point path PI1 from not only the virtual viewpoint path P4 but also the virtual viewpoint paths P5, P6, and P7, and the control unit 106 displays the thumbnail image in association with the virtual viewpoint paths P5, P6, and P7.

Therefore, according to the present configuration, it is possible to generate a thumbnail image based on a virtual viewpoint image by using a gaze point path intended by a user for each of the virtual viewpoint paths P4, P5, P6, and P7.

Here, a form example has been described in which the execution unit 104 generates a thumbnail image based on a virtual viewpoint image showing an aspect of a case of gazing at the gaze point path PI1 from not only the virtual viewpoint path P4 but also the virtual viewpoint paths P5, P6, and P7, but the technique of the present disclosure is not limited to this. For example, the execution unit 104 may generate a thumbnail image based on a virtual viewpoint image showing an aspect of a case of gazing at the gaze point path PI1 from not only the virtual viewpoint path P4 but also any one or two of the virtual viewpoint paths P5, P6, and P7. The execution unit 104 may generate a thumbnail image based on a virtual viewpoint image showing an aspect of a case of gazing at the gaze point path PI1 from any one or two of the virtual viewpoint paths P5, P6, and P7 Instead of the virtual viewpoint path P4.

In each of the virtual viewpoint paths P4, P5, P6, and P7, the control unit 106 may change a display aspect of a section including a virtual viewpoint in which a virtual viewpoint image obtained by gazing at a standard gaze point path (for example, the gaze point path PI1) cannot be generated (hereinafter, also referred to as "a section in which a virtual viewpoint image cannot be generated").

Figure 26:
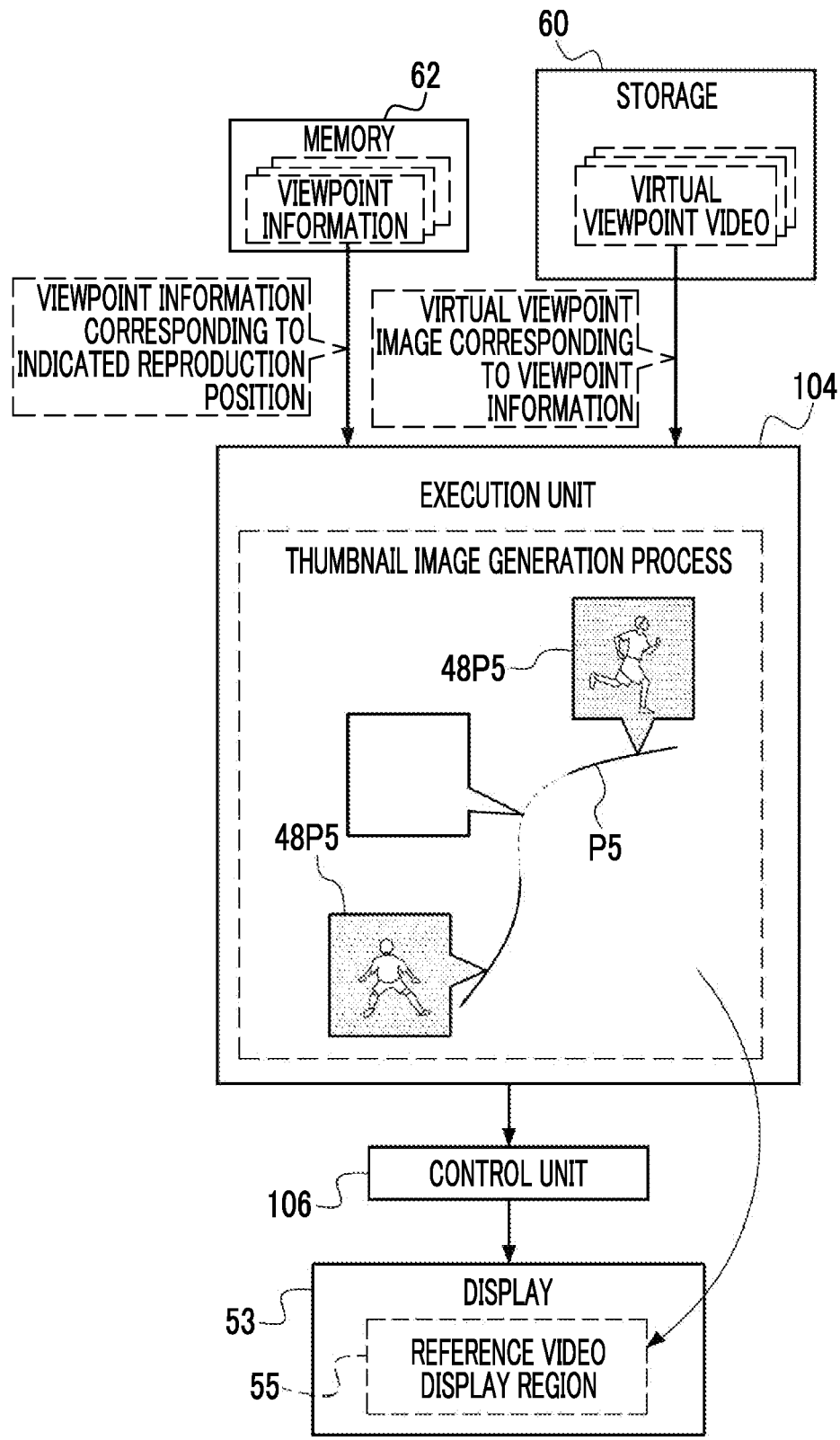
FIG. 26 is a conceptual diagram showing an example of a thumbnail image associated with a section in which a virtual viewpoint image cannot be generated, a section in which a virtual viewpoint image can be generated, and a virtual viewpoint path.

For example, in an example shown in FIG. 26, in the virtual viewpoint path P5, a section in which the virtual viewpoint image obtained by gazing at the standard gaze point path can be generated (hereinafter, also referred to as a "section in which a virtual viewpoint image can be generated") is represented by a solid line, and a section in which the virtual viewpoint image cannot be generated is represented by a dashed line. A display aspect of a section in which a virtual viewpoint image cannot be generated is not limited to this, and a section in the virtual viewpoint path P5 in which a virtual viewpoint image cannot be generated may be transparent (non-displayed) or may be blinked, or may be displayed to be distinguishable from a section in which a virtual viewpoint image can be generated.

The thumbnail image 48P5 is displayed in association with the section in which the virtual viewpoint image can be generated. The thumbnail image 48P5 is an image obtained by reducing a virtual viewpoint image generated on the basis of viewpoint information corresponding to an indicated reproduction position for the virtual viewpoint path P5. Since the thumbnail image 48P5 is not generated in the section in which the virtual viewpoint image cannot be generated, only a frame in which the thumbnail image 48P5 fits is displayed. The thumbnail image (the thumbnail image 48P5 in the example shown in FIG. 26) and the virtual viewpoint path (the virtual viewpoint path P5 in the example shown in FIG. 26) obtained by the execution unit 104 executing the thumbnail image generation process are displayed on the display 53 (in the example shown in FIG. 26, the reference video display region 55 in the display 53) by the control unit 106.

As described above, in each of the virtual viewpoint paths P4, P5, P6, and P7, by changing a display aspect of the section in which a virtual viewpoint image cannot be generated, the section in which a virtual viewpoint image can be generated and the section in which a virtual viewpoint image cannot be generated can be visually ascertained.

In the above embodiment, the generation of a distribution video has been exemplified, but the technique of the present disclosure is not limited to this, and can be applied to generation of videos other than the distribution video. For example, the technique of the present disclosure can also be used for generating a video for personal enjoyment without distribution. The technique of the present disclosure can be used in addition to the editing work of combining a plurality of virtual viewpoint videos. For example, the technique of the present disclosure can also be used for an application of only checking a plurality of virtual viewpoint images by setting a plurality of virtual viewpoint paths. In other words, the technique of the present disclosure can be used for any application such as checking of a virtual viewpoint image, setting of a virtual viewpoint path, and/or editing.

In the above embodiment, the soccer stadium 22 has been exemplified, but this is only an example, and any place may be used as long as a plurality of physical cameras can be installed, such as a baseball field, a rugby field, a curling field, an athletic field, a swimming pool, a concert hall, an outdoor music field, and a theatrical play venue.

In the above embodiment, the computer 50 has been exemplified, but the technique of the present disclosure is not limited to this. For example, instead of the computer 50, devices including ASICs, FPGAs, and/or PLDs may be applied. Instead of the computer 50, a combination of hardware configuration and software configuration may be used.

In the above embodiment, a form example in which the information processing is executed by the CPU 58 of the information processing apparatus 12 has been described, but the technique of the present disclosure is not limited to this. A GPU may be employed instead of the CPU 58, or a plurality of CPUs may be employed. Various processes may be executed by one processor or a plurality of physically separated processors.

Figure 27:
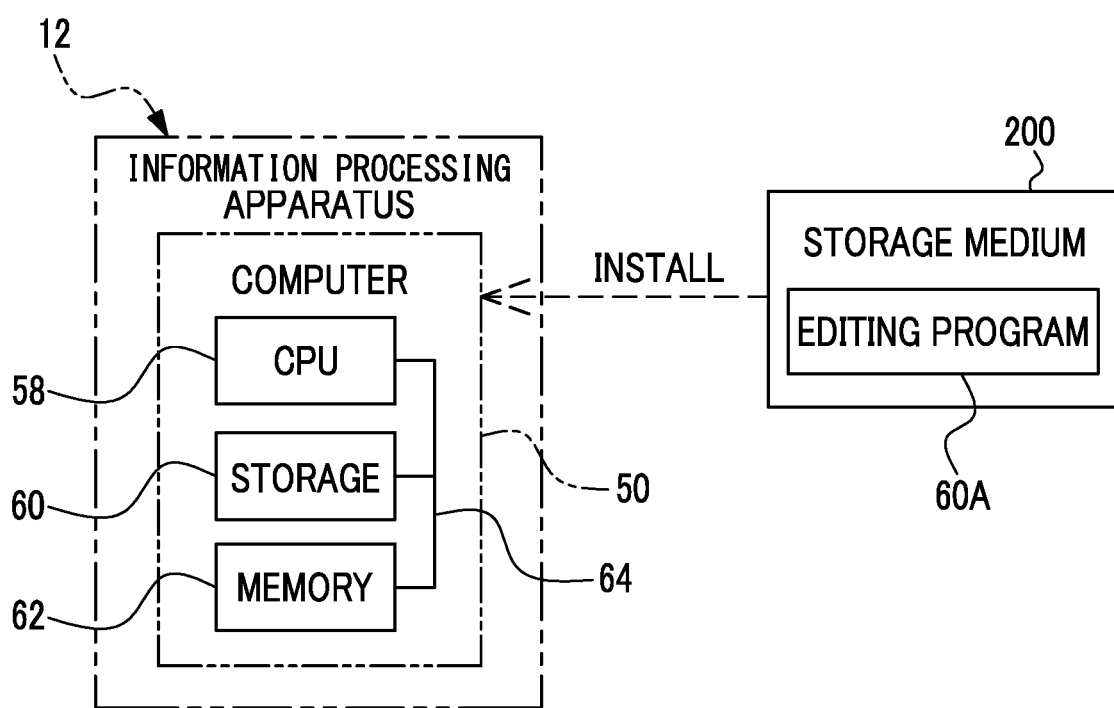
FIG. 27 is a block diagram showing an example of an aspect in which an editing program is installed from a storage medium to a computer of the information processing apparatus.

In the above embodiment, the editing program 60A is stored in the storage 60, but the technique of the present disclosure is not limited to this, and as shown in FIG. 27 as an example, and the editing program 60A may be stored in any portable storage medium 200. The storage medium 200 is a non-transitory storage medium. Examples of the storage medium 200 include an SSD and a USB memory. The editing program 60A stored in the storage medium 200 is installed in the computer 50, and the CPU 58 executes information processing according to the editing program 60A.

The editing program 60A may be stored in a program memory of another computer, a server device, or the like connected to the computer 50 via a communication network (not shown), and the editing program 60A may be downloaded to the information processing apparatus 12 in response to a request from the information processing apparatus 12. In this case, the information processing based on the downloaded editing program 60A is executed by the CPU 58 of the computer 50.

As a hardware resource for executing the information processing, the following various processors may be used. Examples of the processor include, as described above, a CPU that is a general-purpose processor that functions as a hardware resource that executes the information processing according to software, that is, a program.

As another processor, for example, a dedicated electric circuit which is a processor such as an FPGA, a PLD, or an ASIC having a circuit configuration specially designed for executing a specific process may be used. A memory is built in or connected to each processor, and each processor executes the output control process by using the memory.

The hardware resource that executes the output control process may be configured with one of these various processors, or a combination of two or more processors of the same type or different types (for example, a combination of a plurality of FPGAs, or a combination of a CPU and an FPGA). The hardware resource that executes the information processing may be one processor.

As an example of configuring a hardware resource with one processor, first, there is a form in which one processor is configured by a combination of one or more CPUs and software, as typified by a computer used for a client or a server, and this processor functions as the hardware resource that executes the information processing. Second, as typified by system on chip (SoC), there is a form in which a processor that realizes functions of the entire system including a plurality of hardware resources that execute the information processing with one integrated circuit (IC) chip is used. As described above, the information processing is realized by using one or more of the above various processors as hardware resources.

As a hardware structure of these various processors, more specifically, an electric circuit in which circuit elements such as semiconductor elements are combined may be used.

The above-described information processing is only an example. Therefore, needless to say, unnecessary steps may be deleted, new steps may be added, or the processing order may be changed within the scope without departing from the spirit.

The content described and exemplified above are detailed descriptions of the portions related to the technique of the present disclosure, and are only an example of the technique of the present disclosure. For example, the above description of the configuration, the function, the operation, and the effect is an example of the configuration, the function, the operation, and the effect of the portions of the technique of the present disclosure. Therefore, needless to say, unnecessary portions may be deleted, new elements may be added, or replacements may be made to the described content and exemplified content shown above within the scope without departing from the spirit of the technique of the present disclosure. In order to avoid complications and facilitate understanding of the portions related to the technique of the present disclosure, in the description content and the exemplified content shown above require special description, description of common technical knowledge or the like that does not require particular description in order to enable the implementation of the technique of the present disclosure is omitted.

In the present specification, "A and/or B" is synonymous with "at least one of A or B". That is, "A and/or B" means that it may be only A, only B, or a combination of A and B. In the present specification, in a case where three or more matters are connected and expressed by "and/or", the same concept as "A and/or B" is applied.

All the documents, the patent applications, and the technical standards disclosed in the present specification are incorporated by reference in the present specification to the same extent as in a case where the individual documents, patent applications, and technical standards are specifically and individually stated to be incorporated by reference.

What is claimed is:

1. An information processing apparatus that generates a virtual viewpoint video based on a virtual viewpoint by using a motion picture obtained by imaging an imaging region with a plurality of imaging devices, the information processing apparatus comprising:
   a processor; and
   a memory built in or connected to the processor,
   wherein the processor displays, on a display,
   a standard image corresponding to the imaging region,
   a plurality of virtual viewpoint paths disposed in the standard image and representing a trajectory of movement of the virtual viewpoint,
   an indicator indicating a reproduction position of the virtual viewpoint video, and
   a reference image based on a virtual viewpoint image viewed from the virtual viewpoint corresponding to the reproduction position of the virtual viewpoint path among a plurality of virtual viewpoint images configuring the virtual viewpoint video,
   wherein the processor generates gaze point information representing a gaze point at which the virtual viewpoint included in the virtual viewpoint path gazes in response to a given instruction,
   wherein the processor
      selects one reference image from among a plurality of the reference images corresponding to the same reproduction position in response to a given instruction,
      sets the gaze point corresponding to the one selected reference image as a standard gaze point, and
      generates, as other reference images that are not selected, an image based on a virtual viewpoint image showing an aspect of a case of gazing at the standard gaze point from the virtual viewpoint path corresponding to the non-selected other reference images.

2. The information processing apparatus according to claim 1,
   wherein the processor disposes at least one of the plurality of virtual viewpoint paths at an indicated position in the standard image.

3. The information processing apparatus according to claim 1,
   wherein the processor changes the reproduction position indicated by the indicator in response to a given instruction.

4. The information processing apparatus according to claim 1,
   wherein, in a case where the reproduction position is changed, the processor displays the reference image corresponding to the reproduction position after being changed on the display.

5. The information processing apparatus according to claim 4,
   wherein, in a case where the reproduction position is changed, the processor displays the reference image corresponding to the reproduction position after being changed at a position different from a position of the reference image corresponding to the reproduction position before being changed.

6. The information processing apparatus according to claim 1,
   wherein the processor displays only one reference image for one virtual viewpoint path.

7. The information processing apparatus according to claim 1,
   wherein the processor changes the reproduction position in response to an operation of moving the reference image on the standard image.

8. The information processing apparatus according to claim 1,
   wherein the processor displays two reference images for two adjacent virtual viewpoint paths according to relative positions of the two virtual viewpoint paths.

9. The information processing apparatus according to claim 1,
   wherein the processor changes at least one of a position, a length, or a shape of the virtual viewpoint path in response to a given instruction.

10. The information processing apparatus according to claim 1,
    wherein the processor displays at least one of the indicator or the virtual viewpoint path in different aspects before and after the reproduction position.

11. The information processing apparatus according to claim 1,
    wherein the gaze point information is a gaze point path representing a trajectory of movement of the gaze point, and
    the processor disposes a plurality of the gaze point paths in the standard image in response to a given instruction.

12. The information processing apparatus according to claim 1,
    wherein the processor changes a display aspect of a section including the virtual viewpoint in which a virtual viewpoint image obtained by gazing at the standard gaze point is not generatable in the virtual viewpoint path.

13. The information processing apparatus according to claim 1,
    wherein the processor displays the plurality of virtual viewpoint paths and the reference image in the single standard image.

14. The information processing apparatus according to claim 1,
    wherein the processor displays the virtual viewpoint path and the reference image in a plurality of the standard images representing at least a part of the imaging region.

15. The information processing apparatus according to claim 1,
    wherein the processor displays the reference image corresponding to the virtual viewpoint along the virtual viewpoint path for the plurality of virtual viewpoint paths.

16. The information processing apparatus according to claim 1,
    wherein the processor
       performs a selection combining process of cutting out parts of the plurality of virtual viewpoint paths and combining the cut-out parts in response to a given instruction, and
       generates the virtual viewpoint video on the basis of a path obtained by combining the cut-out parts in the selection combining process.

17. An information processing method of generating a virtual viewpoint video based on a virtual viewpoint by using a motion picture obtained by imaging an imaging region with a plurality of imaging devices, the information processing method comprising:

displaying, on a display,
- a standard image corresponding to the imaging region,
- a plurality of virtual viewpoint paths disposed in the standard image and representing a trajectory of movement of the virtual viewpoint,
- an indicator indicating a reproduction position of the virtual viewpoint video, and
- a reference image based on a virtual viewpoint image viewed from the virtual viewpoint corresponding to the reproduction position of the virtual viewpoint path among a plurality of virtual viewpoint images configuring the virtual viewpoint video;

generating gaze point information representing a gaze point at which the virtual viewpoint included in the virtual viewpoint path gazes in response to a given instruction;

selecting one reference image from among a plurality of the reference images corresponding to the same reproduction position in response to a given instruction;

setting the gaze point corresponding to the one selected reference image as a standard gaze point; and generating, as other reference images that are not selected, an image based on a virtual viewpoint image showing an aspect of a case of gazing at the standard gaze point from the virtual viewpoint path corresponding to the non-selected other reference images.

18. A non-transitory computer-readable storage medium storing a program executable by a computer to perform information processing to generate a virtual viewpoint video based on a virtual viewpoint by using a motion picture obtained by imaging an imaging region with a plurality of imaging devices, the information processing comprising:

displaying, on a display,
- a standard image showing the imaging region,
- a plurality of virtual viewpoint paths disposed in the standard image and representing a trajectory of movement of the virtual viewpoint,
- an indicator indicating a reproduction position of the virtual viewpoint video, and
- a reference image based on a virtual viewpoint image viewed from the virtual viewpoint corresponding to the reproduction position of the virtual viewpoint path among a plurality of virtual viewpoint images configuring the virtual viewpoint video;

generating gaze point information representing a gaze point at which the virtual viewpoint included in the virtual viewpoint path gazes in response to a given instruction;

selecting one reference image from among a plurality of the reference images corresponding to the same reproduction position in response to a given instruction;

setting the gaze point corresponding to the one selected reference image as a standard gaze point; and generating, as other reference images that are not selected, an image based on a virtual viewpoint image showing an aspect of a case of gazing at the standard gaze point from the virtual viewpoint path corresponding to the non-selected other reference images.

* * * * *